(12) United States Patent
Hasegawa et al.

(10) Patent No.: US 8,104,750 B2
(45) Date of Patent: Jan. 31, 2012

(54) FLUID FILLED VIBRATION DAMPING DEVICE AND ELECTRIC ACTUATOR FOR USE IN THE SAME

(75) Inventors: Koichi Hasegawa, Kasugai (JP); Hironori Koyama, Kasugai (JP); Satoshi Umemura, Kamo-gun (JP)

(73) Assignee: Tokai Rubber Industries, Ltd., Komaki-shi (JP)

( * ) Notice: Subject to any disclaimer, the term of this patent is extended or adjusted under 35 U.S.C. 154(b) by 532 days.

(21) Appl. No.: 12/289,079

(22) Filed: Oct. 20, 2008

(65) Prior Publication Data
US 2009/0102105 A1    Apr. 23, 2009

(30) Foreign Application Priority Data

| Oct. 22, 2007 | (JP) | 2007-274100 |
| Oct. 26, 2007 | (JP) | 2007-278910 |
| Nov. 2, 2007 | (JP) | 2007-286291 |
| Feb. 27, 2008 | (JP) | 2008-045677 |

(51) Int. Cl.
*F16F 9/10* (2006.01)
(52) U.S. Cl. ............................... 267/140.14
(58) Field of Classification Search . 267/140.13–140.15
See application file for complete search history.

(56) References Cited

U.S. PATENT DOCUMENTS

| 4,877,225 A * | 10/1989 | Noguchi et al. | 267/140.14 |
| 6,378,852 B1 | 4/2002 | Ticks et al. | |
| 2004/0188903 A1 * | 9/2004 | Goto et al. | 267/140.13 |
| 2007/0182077 A1 * | 8/2007 | Kon | 267/140.14 |
| 2011/0042873 A1 * | 2/2011 | Yamamoto et al. | 267/140.14 |

FOREIGN PATENT DOCUMENTS

| JP | A-3-149428 | 6/1991 |
| JP | A-2000-161457 | 6/2000 |
| JP | A-2004-150546 | 5/2004 |
| JP | A-2005-127519 | 5/2005 |
| JP | A-2005-331087 | 12/2005 |

OTHER PUBLICATIONS

Extended European Search Report dated Jul. 23, 2010 on European Patent Application No. 08018410.4.
European Search Report issued on Nov. 5, 2009 in European Patent Application No. 08018410.4.
Jun. 16, 2011 Office Action issued in Japanese Patent Application No. 2007-278910 (with partial translation).
Nov. 10, 2011 Office Action issued in Japanese Patent Application No. 2008-045677 (with partial translation).

* cited by examiner

*Primary Examiner* — Christopher Schwartz
(74) *Attorney, Agent, or Firm* — Oliff & Berridge, PLC

(57) ABSTRACT

A fluid filled vibration damping device including: a fluid passage interconnecting a pressure receiving chamber partially defined by a rubber elastic body connecting a first and second mounting members, and an equilibrium chamber partially defined by a flexible film; a movable valve body provided for switching the fluid passage between a communicating state and a blocked state through reciprocating operation; an electric motor employed for actuating the movable valve body; an actuating force converter mechanism provided on an actuating force transmission path from the electric motor to the movable valve body. A rotational actuating force of the electric motor is transmitted as reciprocating actuating force to the movable valve body by the actuating force converter mechanism.

19 Claims, 21 Drawing Sheets

FLUID FILLED VIBRATION DAMPING DEVICE AND ELECTRIC ACTUATOR FOR USE IN THE SAME

INCORPORATED BY REFERENCE

The disclosure of Japanese Patent Application Nos. 2007-274100, 2007-278910, 2007-286291 and 2008-045677 filed on Oct. 22, 2007, Oct. 26, 2007, Nov. 2, 2007 and Feb. 27, 2008, respectively, each including the specification, drawings and abstract is incorporated herein by reference in its entirety.

BACKGROUND OF THE INVENTION

1. Field of the Invention

The present invention relates in general to a vibration damping device adapted to be interposed between components to be linked in a vibration damped manner in order to provide vibration damped linkage or vibration damped support of these components, wherein the vibration damping device is a fluid filled vibration damping device that utilizes vibration damping action based on the flow action of a fluid filling the interior. The invention relates in particular to a fluid filled vibration damping device in which a fluid passage interconnecting a fluid filled pressure receiving chamber and equilibrium chamber is switchable between a communicating state and a blocked state.

2. Description of the Related Art

There are any number of known vibration damping devices proposed to date as devices for interposition between components that make up a vibration transmission system in order to provide vibration damped linkage or vibration damped support of the components to one another. One type of vibration damping device is a fluid filled vibration damping device having a construction provided in its interior with a pressure receiving chamber and an equilibrium chamber filled with a non-compressible fluid, which chambers communicate through a fluid passage. Such devices have been employed as automotive engine mounts or sub-frame mounts, for example.

With certain fluid filled vibration damping devices, switching control of vibration damping characteristics is possible where the fluid passage interconnecting the pressure receiving chamber and the equilibrium chamber is switchable between a communicating state and a blocked state by a movable valve body that is driven by pneumatic pressure or electromagnetic force. As one example, Japanese Unexamined Patent Publication No. JP-A-2004-150546 teaches a fluid filled vibration damping device having a construction in which a mover composed of a ferroelectric body undergoes actuated displacement under the action of a magnetic field that is produced by a stator having a coil, whereby the fluid passage can be switched between the communicating state and the blocked state by a movable valve body that is constituted by the mover.

Accordingly, in order to maintain the mover in the displaced state with respect to the stator in JP-A-2004-150546, it will be necessary to maintain energization of the coil so that retention force continues to act on the mover. However, maintaining continuous energization of the coil not only increases the amount of power consumed, but also poses a problem of diminished durability owing to high heat emission by the coil.

There has also been proposed a structure, shown in JP-A-2004-150546 as well, whereby a coil spring is employed to provide constant urging force that acts on the mover towards one side in the actuation direction, whereby the coil will be energized when the mover is to be actuated in the opposite direction from the urging direction, whereas energization will be needed when the mover is to be actuated in the urging direction.

However, such a construction utilizing the urging force of a coil spring will require to provide a coil spring as an additional separate component. This results in a number of drawbacks such as a greater number of parts and a commensurately more complicated structure, as well as lower productivity owing to the need for a coil spring assembly step.

SUMMARY OF THE INVENTION

It is therefore one object of this invention to provide a fluid filled vibration damping device of novel construction adapted to enable switching of the vibration damping characteristics, wherein the switched vibration damping characteristics of the device can be maintained without the need for energization, and the device can be realized through a simple structure and easy manufacturing process, avoiding an increase in the number of parts.

The above and/or optional objects of this invention may be attained according to at least one of the following modes of the invention. The following modes and/or elements employed in each mode of the invention may be adopted at any possible optional combinations. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

A first mode of the present invention provides a fluid filled vibration damping device including: a first mounting member and a second mounting member linked by a main rubber elastic body; a pressure receiving chamber whose wall is partially defined by the main rubber elastic body and filled with a non-compressible fluid; an equilibrium chamber whose wall is partly defined by a flexible film and filled with the non-compressible fluid; a fluid passage interconnecting the pressure receiving chamber and the equilibrium chamber; a movable valve body provided for switching the fluid passage between a communicating state and a blocked state through reciprocating operation; an electric motor employed for actuating the movable valve body; and a actuating force converter mechanism provided on an actuating force transmission path from the electric motor to the movable valve body, wherein rotational actuating force of the electric motor is transmitted as reciprocating actuating force to the movable valve body by the actuating force converter mechanism.

In the fluid filled vibration damping device of construction according to the present invention, by providing an actuating force converter mechanism on the actuating force transmission path from the electric motor to the movable valve body, in-line reciprocating operation of the movable valve body can be produced by an electric motor that generates rotational actuating force. A cam mechanism may be employed as the actuating force converter mechanism, for example.

Furthermore, by providing the cam mechanism on the actuating force transmission path from the electric motor to the movable valve body, with the electric motor in the nonenergized state, the movable valve body will be acted upon by retention force that functions to prevent displacement in the reciprocating operation direction. Thus, at times that the movable valve body is to be actuated, switching operation of the movable valve body can take place through energization of the electric motor; and when maintaining the switched state, retention force can be exerted effectively on the movable valve body in the absence of energization of the electric motor. Consequently, power consumption can be reduced, and heat emission resulting from continuous energization can be prevented, affording improved durability.

Moreover, retention force acting on the movable valve body can be produced without the need for any special parts through a cam mechanism that accomplishes reciprocating operation, so that effective retaining action can be achieved with a small number of parts and a simple construction.

The cam mechanism herein refers to a mechanism that includes a cam having a specific shape disposed on one of the movable valve body and the drive shaft to which the rotational actuating force of the electric motor is transmitted, and a sliding portion disposed on the other of the movable valve body and the drive shaft, with the rotational actuating force generated by the electric motor being converted to reciprocating actuating force of the movable valve body by the cam and sliding of the sliding portion.

In the fluid filled vibration damping device according to the present invention, the electric motor generates rotational actuating force in one direction.

Even where such an electric motor that generates rotational actuating force in one direction is employed, reciprocating action of the movable valve body can nevertheless be accomplished through the cam mechanism. Moreover, because of a construction whereby the electric motor generates rotational actuating force in one direction only, the electric motor can have a simpler construction.

In another preferred mode of the fluid filled vibration damping device according to the present invention, the movable valve body is provided with a rotation restricting mechanism that through engagement restricts rotation thereof about a center axis extending in the direction of reciprocating operation.

By providing a rotation restricting mechanism that through engagement restricts rotation of the movable valve body, it will be possible to prevent rotational actuating force that is produced by the electric motor from being transmitted to the movable valve body, causing the movable valve body to rotate. Reciprocating operation of the movable valve body with high accuracy can be achieved thereby, and the problem of diminished durability of the flexible film due to friction between the flexible film and the movable valve body can be avoided, for example.

In a preferred mode of the fluid filled vibration damping device having the rotation restricting mechanism described above, the movable valve body is formed with a hollow or solid valve stem portion that extends in the direction of reciprocating operation is provided, a guide member is disposed fitting internally within or externally about the valve stem portion, and the rotation restricting mechanism for restricting rotation about the valve stem portion is disposed between the guide member and the valve stem portion of the movable valve body.

By employing such a construction for the rotation restricting mechanism, rotational actuating force of the electric motor may be efficiently transmitted to the movable valve body, and reciprocating operation of the movable valve body may be controlled with high accuracy.

In a preferred mode of fluid filled vibration damping device according to the present invention, the cam mechanism includes a cam face disposed on one of the movable valve body and a drive shaft to which the rotational actuating force of the electric motor is transmitted, and a sliding portion disposed on another of the movable valve body and the drive shaft, and adapted to slide along the cam face; the cam face is defined by a cam slot that has been formed in a medial section viewed in a direction of reciprocating operation of the movable valve body, of either the movable valve body or the drive shaft of the electric motor; and the sliding portion is fitted into the cam slot.

In the present mode, the cam face which constitutes the cam mechanism is provided by a cam slot that is formed either on the movable valve body or on the drive shaft in the medial section thereof viewed in the direction of reciprocating operation, and wherein the sliding portion slides against the cam face by fitting into the cam slot. This makes it possible to prevent the movable valve body from becoming dislodged from the drive shaft through the engaging action of the sliding portion and the cam slot. Moreover, relative tilting of the movable valve body and the drive shaft can be limited through abutment of the sliding portion and the cam slot. Additionally, by adopting a construction whereby the sliding portion fits into the cam slot, the sliding portion can be positioned in abutment against the inside wall of the cam slot at either side in the direction of reciprocating operation. Consequently, regardless of to which side in the direction the movable valve body is actuated, actuating force will be brought to bear through abutment of the sliding portion and the walls of the cam slot so as to effectively realize reciprocating operation of the movable valve body.

In a preferred mode of the fluid filled vibration damping device having the cam slot as described above, for example, wherein the movable valve body has a tubular portion that extends in the direction of reciprocating operation, with the tubular portion positioned encircling an outside perimeter of the drive shaft; and the sliding portion disposed on the drive shaft fits into and slide through the cam slot formed opening onto an inside peripheral face of the tubular portion in an axially medial section of the tubular portion in order to constitute the cam mechanism.

In another mode of the fluid filled vibration damping device according to the present invention, the cam mechanism includes a cam face disposed on one of the movable valve body and the drive shaft to which the rotational actuating force of the electric motor is transmitted, and a sliding portion disposed on another of the movable valve body and the drive shaft and adapted to slide on the cam face; the cam face is formed on either the movable valve body or the drive shaft at one end face thereof in a direction of reciprocating operation; and the sliding portion, which is disposed on the other of the movable valve body and the drive shaft, is juxtaposed against the cam face in a state of abutment therewith.

The cam mechanism may be constituted by forming such a cam face on either the movable valve body or the drive shaft, at either end face in the direction of reciprocating operation; and juxtaposing the sliding portion in a state of abutment against the cam face. By employing the cam mechanism of this construction in which the cam face and the sliding portion are juxtaposed in the direction of reciprocating operation, the objective cam mechanism can be realized through an exceedingly simple design, namely, that of juxtaposing the movable valve body and the drive shaft in the direction of reciprocating operation of the movable valve body.

In another preferred mode of the fluid filled vibration damping device according to the present invention, the cam mechanism includes a cam face disposed on one of the movable valve body and the drive shaft to which the rotational actuating force of the electric motor is transmitted, and a sliding portion disposed on the other of the movable valve body and the drive shaft and adapted to slide on the cam face; and a retainer portion that extends at a right angle to the direction of reciprocating operation of the movable valve body is formed on at least one edge of the cam face in the direction of reciprocating operation of the movable valve body.

In this arrangement, the retainer portion has been formed in a portion of the cam face and that extends in the direction orthogonal to the direction of reciprocating operation of the movable valve body. Therefore, with the movable valve body positioned at the terminus in the direction of reciprocating operation, the sliding portion will be positioned over the retainer portion, thus producing secure engaging action whereby more effective action of retention force on the movable valve body can be achieved. Consequently, the fluid passage may be maintained more stably in the communicating state or the blocked state by the movable valve body.

In another possible mode of the fluid filled vibration damping device according to the present invention, the cam mechanism includes a cam face disposed on one of the movable valve body and the drive shaft to which the rotational actuating force of the electric motor is transmitted, and a sliding portion disposed on another of the movable valve body and the drive shaft and adapted to slide on the cam face; and is provided with urging member for urging the cam face towards a direction of abutment against the sliding portion.

By employing such urging member, separation of the cam face and the sliding portion can be prevented, and consistently accurate reciprocating operation of the movable valve body through sliding of the cam face and the sliding portion can be achieved.

In a preferred mode of the fluid filled vibration damping device having urging member as described above, the urging member is composed of a coil spring fitting externally onto an outside peripheral face of the movable valve body. More preferably, in the movable valve body, a valve stem portion will be disposed projecting out towards the drive shaft and constituting the cam face and the sliding portion between the drive shaft. The coil spring will then be fitted externally onto the outside peripheral face of this valve stem portion.

By employing a coil spring as the urging member, it will be possible to elastically support the movable valve body stably and efficiently by a simple construction, making it easy to achieve improved stability and accuracy of reciprocating operation of the movable valve body by the cam mechanism.

In another possible mode of the fluid filled vibration damping device according to the present invention, the pressure receiving chamber and the equilibrium chamber are defined to either side of a partition member that is supported by the second mounting member; the fluid passage includes a first orifice passage that is formed in the partition member and a second orifice passage that is formed in the partition member and that is tuned to a higher frequency than the first orifice passage; and the second orifice passage is switchable between the communicating state and the blocked state by the movable valve body.

In a fluid filled vibration damping device of double orifice construction having first and second orifice passages as fluid passages, it is possible to switch the second orifice passage, which has been tuned to a higher frequency, between the communicating state and the blocked state through reciprocating operation of the movable valve body utilizing the cam mechanism. This makes it possible to effectively achieve both vibration damping action against vibration in the frequency range to which the first orifice passage has been tuned, and vibration damping action against vibration in the frequency range to which the second orifice passage has been tuned.

In a more preferred mode of the fluid filled vibration damping device according to the present invention furnished with a partition member and orifice passages as described above, an opening of the second orifice passage on an equilibrium chamber side thereof is formed in a center section of the partition member; the movable valve body and the opening of the second orifice passage on the equilibrium chamber side are situated in opposition to either side of the flexible film, with the movable valve body unattached to the flexible film; rotational actuating force of the electric motor is exerted on the movable valve body via the cam mechanism so as to induce the movable valve body to undergo reciprocating operation so that the movable valve body separates from the flexible film to place the second orifice passage in the communicating state; and the movable valve body is positioned in abutment against the flexible film so that the flexible film becomes pushed against the opening of the second orifice passage on the equilibrium chamber side, to place the second orifice passage in the blocked state.

By positioning the movable valve body and the opening on the equilibrium chamber side of the second orifice passage with the flexible film between them in this way, the opening of the second orifice passage on the equilibrium chamber side can be blocked off fluid tightly by the movable valve body when pressed against it via the flexible film, bringing about a blocked state of the second orifice passage in a more advantageous manner. Additionally, the movable valve body is unattached to the flexible film, and with the second orifice passage in communication, the movable valve body will separate from the flexible film. The flexible film can thus be imparted with considerable free length, and liquid pressure absorbing action based on elastic deformation of the flexible film can be achieved effectively.

In another preferred mode of the fluid filled vibration damping device according to the present invention, wherein the actuating force converter mechanism comprises at least one of a screw structure and a worm gear structure, and the rotational actuating force of the electric motor is transmitted as reciprocating actuating force to the movable valve body by at least one of the screw structure and the worm gear structure.

In the fluid filled vibration damping device of construction according to the mode of the invention, the fluid passage can be switched between the communicating state and the blocked state through conversion of rotational actuating force of the electric motor to linear reciprocating actuating force by means of at least one of a screw structure and a worm gear structure; and transmitting this force to the movable valve body. Thus, switching of the vibration damping characteristics can be accomplished utilizing the rotational actuating force of the electric motor.

Furthermore, the screw structure and/or worm gear structure that converts rotational actuating force to reciprocating actuating force is disposed on the transmission path for the rotational actuating force generated by the electric motor to the movable valve body. Thus, even in the non-energized state in which power is not supplied to the electric motor, retention force will act on the movable valve body through meshing of the teeth in the screw structure or worm gear structure. Consequently, with the electric motor in the non-energized state, even if the movable valve body is acted upon by an outside force (e.g. liquid pressure inside the pressure receiving chamber) the movable valve body can be maintained in a prescribed operational status so that the objective vibration damping characteristics can be consistently maintained.

Moreover, since it is possible for such retention force to act on the movable valve body in the absence of energization of the electric motor, running costs can be reduced due to the lower power consumption, and improved durability can be achieved based on reduced heat emission resulting from energization.

In a preferred mode of the fluid filled vibration damping device according to the present invention, the movable valve body will be provided with a rotation restricting mechanism that through engagement restricts rotation thereof about a center axis extending in the direction of reciprocating operation.

By providing such a rotation restricting mechanism, it will be possible to prevent rotational actuating force that is produced by the electric motor from being transmitted to the movable valve body by friction of the screw structure or worm gear structure etc. and thereby actuate rotation of the movable valve body. The stroke of the movable valve body in the direction of reciprocating operation produced rotational actuating force from the electric motor can thus be made substantially unchanging, and switching control of the fluid passage can be carried out with a high degree of accuracy.

In another possible mode, the fluid filled vibration damping device according to the present invention is provided with a drive shaft furnished with a screw portion that undergoes rotational actuation by the electric motor; a threadable contact portion disposed in threadable contact with the screw portion is formed on the movable valve body; and at least one of the screw structure and the worm gear structure is constituted to include the screw portion and the threadable contact portion.

By forming on the movable valve body a threadable contact portion that constitutes part of the screw structure or the worm gear structure in this way, the fluid filled vibration damping device according to the present invention can be attained through a relatively simple construction.

In another possible mode of the fluid filled vibration damping device according to the present invention, the pressure receiving chamber and the equilibrium chamber are defined to either side of a partition member that is supported by the second mounting member; the fluid passage includes a first orifice passage that is formed in the partition member and a second orifice passage that is formed in the partition member and that is tuned to a higher frequency than the first orifice passage; and the second orifice passage is switchable between the communicating state and the blocked state by the movable valve body.

In a fluid filled vibration damping device of double orifice construction having first and second orifice passages as fluid passages, by switching the second orifice passage (which has been tuned to higher frequency) between the communicating state and the blocked state through reciprocating operation of the movable valve body utilizing the screw structure or the worm gear structure, it will be possible to selectively achieve both vibration damping action against vibration in the frequency range to which the first orifice passage has been tuned, and vibration damping action against vibration in the frequency range to which the second orifice passage has been tuned, so as to effectively produce vibration damping action against either kind of vibration.

In another possible mode of the fluid filled vibration damping device according to the present invention having a partition member and first and second orifice passages as described above, an opening of the second orifice passage on an equilibrium chamber side thereof is formed in a center section of the partition member; the movable valve body and the opening of the second orifice passage on the equilibrium chamber side are situated in opposition to either side of the flexible film, with the movable valve, body unattached to the flexible film; rotational actuating force of the electric motor is exerted on the movable valve body via at least one of the screw structure and the worm gear structure so as to induce the movable valve body to undergo reciprocating operation so that the movable valve body separates from the flexible film to place the second orifice passage in the communicating state; and the movable valve body is positioned in abutment against the flexible film so that the flexible film becomes pushed against the opening of the second orifice passage on the equilibrium chamber side, to place the second orifice passage in the blocked state.

By positioning the movable valve body and the opening on the equilibrium chamber side of the second orifice passage with the flexible film between them in this way, the opening of the second orifice passage on the equilibrium chamber side can be blocked off fluid tightly by the movable valve body when pressed against it via the flexible film, to bring about a blocked state of the second orifice passage in a more advantageous manner. Additionally, the movable valve body is unattached to the flexible film, and with the second orifice passage in communication, the movable valve body will separate from the flexible film. The flexible film can thus be imparted with considerable free length, and liquid pressure absorbing action based on elastic deformation of the flexible film can be effective achieved.

The present invention also provides an electric actuator for use in the fluid filled vibration damping device of the present invention, which utilizes rotational actuating force of an electric motor produced by energization the electric motor to actuate reciprocating operation of an output member.

Electric actuators that are adapted to actuate linear reciprocating operation of an output member through energization are known in the prior art and are employed, for example, as actuators for the purpose of switching the vibration damping characteristics of a fluid filled vibration damping device interposed between members that make up a vibration transmission system, in order to provide vibration damped linkage or vibration damping support of the components. One example of such an electric actuator for actuating reciprocating operation of an output member is that disclosed in Japanese Unexamined Patent Publication No. JP-A-2000-161457, for example.

In some instances, the ability to control the position of the output member with high accuracy will be required of such an electric actuator used to actuate linear reciprocating operation of an output member. For example, in a fluid filled vibration damping device constructed such that the reciprocating operation of the output member of the electric actuator is utilized to switch a fluid passage between the communicating state and the blocked state, it will be preferable for the electric actuator to be capable of accurate position control of the output member, in order to achieve effective switching of the electric actuator.

In the past, a number of methods there have been employed by way of member for controlling output member position; for example, one in which a position sensor such as a photo cell or a limit switch is used to directly sense the position of the output member, and the operation of the electric actuator is controlled on the basis of the sensor results.

However, with position controlling member that employ such position sensors, there will be an unavoidable increase in the number of parts and a more complicated structure, as well as the problem of the device tending to be larger. There is also a possibility of higher costs resulting from the use of expensive position sensors.

Meanwhile, another currently employed approach to controlling position of the output member is to measure or estimate in advance the time interval required for the output member to reach a displacement terminus in the direction of reciprocating operation, and to control the position of the output member by controlling energization according to this time interval.

However, particularly in instances such as where an electric motor is employed as the actuating power supply of the output member under conditions in which errors in the supply current may occur, the amount of displacement of the output member per a given unit of time may differ depending on the power being supplied to the electric motor, making it exceedingly difficult to accurately and consistently control the position of the output member in the direction of reciprocating operation.

It is accordingly another object of the present invention to provide an electric actuator of novel structure that despite simplicity of structure is capable of accurate control of the position of the output member in the direction of reciprocating operation, for use in the fluid filled vibration damping device of the present invention.

Specifically, the present invention provides an electric actuator including a output member that undergoes linear reciprocating actuation through conversion of rotational actuating force of an electric motor that is driven by DC power, into linear actuating force by an actuating force converter mechanism, wherein a switching member is provided for switching a polarity of the DC power that is supplied to the electric motor, and through switching operation of the switching member a rotation direction of the electric motor is changed to switch an actuation direction of an output member between an outbound direction and a return direction, on a first power supply path for supplying the electric motor with DC power of polarity that actuates the output member in the outbound direction, a first switching member is disposed and has a first electrode and a first brush that undergo relative displacement in a state of contact in association with displacement of the output member, with the first brush separating from the first electrode to break the state of contact and cut off the first power supply path, for regulating a displacement terminus of the output member in the outbound direction, on a second power supply path for supplying the electric motor with DC power of polarity that actuates the output member in the return direction, a second switching member is disposed and has a second electrode and a second brush that undergo relative displacement in a state of contact in association with displacement of the output member, with the second brush separating from the second electrode to break the state of contact and cut off the second power supply path, for regulating a displacement terminus of the output member in the return direction, and the second switching member is maintained in a state of contact at the cutoff position of the first switching member, while the first switching member is maintained in a state of contact at the cutoff position of the second switching member.

In the electric actuator constructed according to the present invention, by switching the electrode and the brush disposed on power supply paths between the contact state and the noncontact state, the first and second power supply paths that each supply the electric motor with DC power of one polarity can be selectively cut off so as to regulate the displacement terminus of the output member. With this arrangement, the stroke of the reciprocating operation of the output member can be regulated consistently, with a simple construction.

Where the output member has been positioned at a displacement terminus, one of the switching member will be cut off while the other switching member will be maintained in the contact state. Thus, the output member can be brought to a stop at the displacement terminus through cutoff of the one switching member. Since the other switching member is maintained in the contact state, it will be possible for the electric motor to be quickly supplied with DC power of polarity driving the output member from the one displacement terminus towards the other displacement terminus. Consequently, during reciprocating operation of the output member, the amount of displacement can set with high accuracy, and the working components can quickly transition from the stopped state to the actuated state.

Additionally, in a preferred mode of the electric actuator according to the present invention, the first power supply path is provided with first commutating member disposed thereon for allowing DC power of polarity driving the output member in the outbound direction to be supplied to the electric motor and for preventing DC power of polarity driving the output member in the return direction from being supplied to the electric motor; the second power supply path is provided with second commutating member disposed thereon for allowing DC power of polarity driving the output member in the return direction to be supplied to the electric motor and for preventing DC power of polarity driving the output member in the outbound direction from being supplied to the electric motor; and the switching member is constituted to include the first commutating member and the second commutating member.

By utilizing the commutating action provided by such first and second commutating member, the first power supply path for supplying the electric motor with DC power of polarity that actuates the output member in the outbound direction, and the second power supply path for supplying the electric motor with DC power of polarity that actuates the output member in the return direction, can be realized with simplicity of construction.

In another preferred mode of the electric actuator according to the present invention, the actuating force converter mechanism includes a actuating force transmitting mechanism, the actuating force transmitting mechanism being provided with either the first electrode and the second electrode, or the first brush and the second brush; the first electrode and the second electrode are arranged so as to extend in the operating direction of the actuating force transmitting mechanism with respect to reciprocating operation of the output member, with the ends of the first electrode and the ends of the second electrode offset from one another in the operating direction of the actuating force transmitting mechanism; and the first brush and the second brush are disposed at identical locations to one another in the operating direction of the actuating force transmitting mechanism.

By thusly disposing either the first electrode and the second electrode, or the first brush and the second brush, on the actuating force transmitting mechanism, and positioning the first electrode and the second electrode offset from one another in the direction of their extension while positioning the first brush and the second brush at locations aligned with one another in the direction of extension of the electrodes, the switching member which is composed of the electrode and the brush can be switched between the connected state and the cutoff state in association with operation of the actuating force transmitting mechanism, so that the output member consistently undergoes reciprocating operation with a prescribed stroke.

In another possible mode of the electric actuator according to the present invention, either the first electrode and the second electrode, or the first brush and the second brush, are provided to the output member, the first electrode and the second electrode being disposed so as to extend linearly in the direction of reciprocating operation of the output member, and with the ends of the first electrode and the second electrode offset from one another in the direction of reciprocating operation of the output member.

By thusly disposing either the electrodes or the brushes on the output member, accurate switching of the switching member in response to displacement of the output member can be achieved. In particular, by arranging the first and second electrodes so as to extend linearly in the direction of reciprocating operation of the output member, and arranging the ends of the first electrode and the second electrode offset from one another in the direction of extension of the electrodes, with the output member positioned at a displacement terminus, either the first switching member or the second switching member can be effectively placed in the connected state, while placing the other in the cutoff state.

In another preferred mode of the electric actuator according to the present invention, at least one of a screw structure and a worm gear structure is provided on the transmission path of actuating force from the electric motor to the output member; and the actuating force converter mechanism that transmits rotational actuating force of the electric motor to the output member as reciprocating actuating force includes at least one of the screw structure and the worm gear structure.

By providing such a screw structure and/or a worm gear structure on the transmission path of actuating force from the electric motor to the movable valve body, the rotational actuating force of the electric motor can be converted to reciprocating actuating force for transmission to the output member. In addition, through meshing action of screw threads in the screw structure or the worm gear structure, retention force can be brought to bear on the output member, so that the output member can be stably retained in a state of switched displacement with the electric motor the non-energized state. Since retention force of the output member can be effectively obtained in this way without energizing the electric motor, it will not be necessary to continuously supply current to the electric motor in order to maintain the output member in a state of switched displacement, so that the problems of heat emission and increased energy consumption associated with continuously energizing the electric motor can be avoided.

The present invention in another aspect thereof provides a fluid filled vibration damping device having a first mounting member and a second mounting member linked by a main rubber elastic body; a non-compressible fluid filled pressure receiving chamber whose wall is partly defined by the main rubber elastic body; a non-compressible fluid filled equilibrium chamber whose wall is partly defined by a flexible film; and a fluid passage interconnecting the pressure receiving chamber and the equilibrium chamber; wherein the fluid passage is switched between the communicating state and the blocked state through reciprocating operation of the output member of the electric actuator according to the present invention.

Utilizing the output member of the electric actuator according to the present invention as valve member for switching the fluid passage between the communicating state and the blocked state, switching control of the fluid chamber can be implemented with a high degree of accuracy, and switching of the objective vibration damping capabilities can be consistently achieved.

BRIEF DESCRIPTION OF THE DRAWINGS

The foregoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
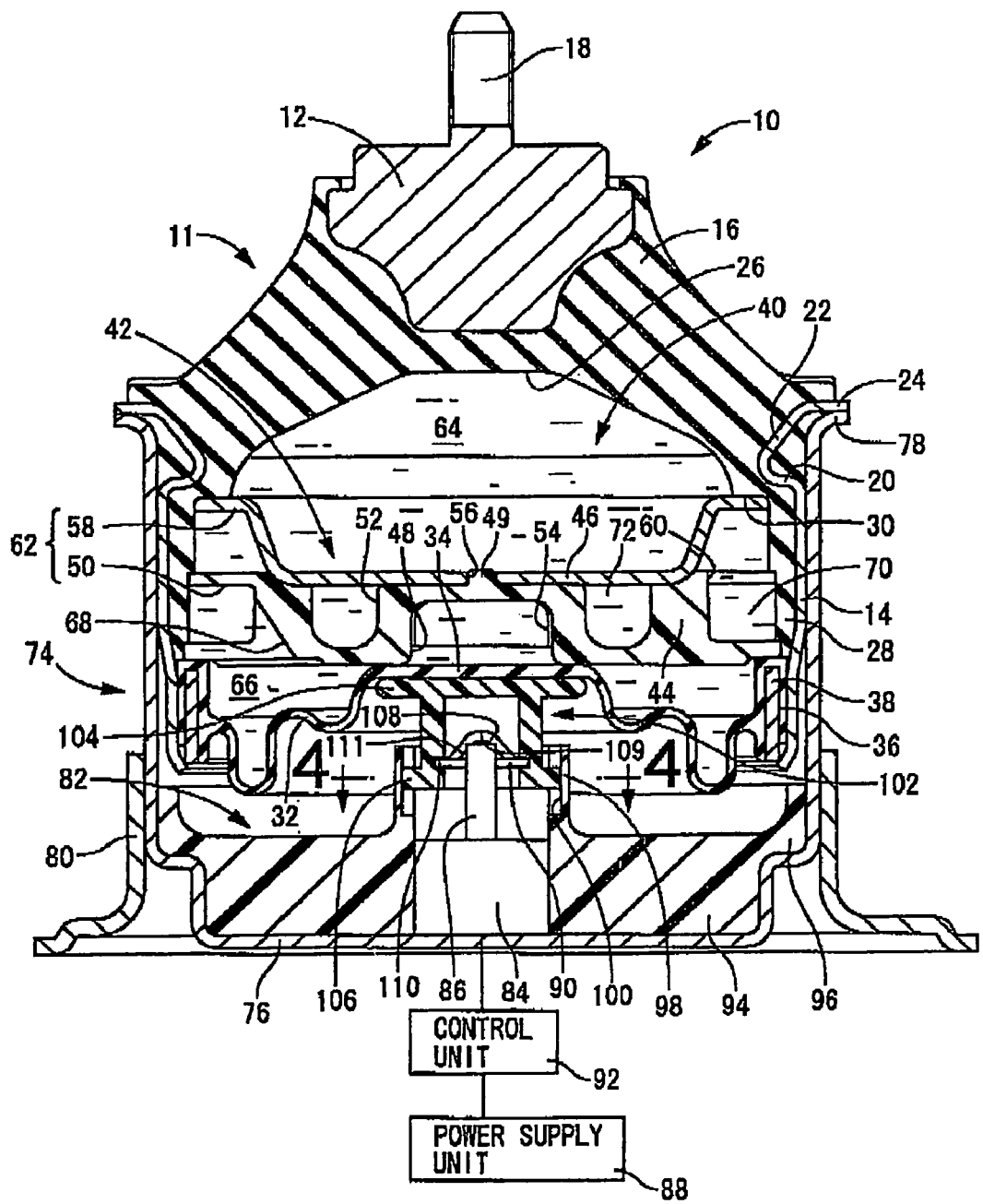
FIG. 1 is a vertical cross sectional view of a fluid filled vibration damping device in the form of an automotive engine mount according to a first embodiment of the present invention.
Figure 2:
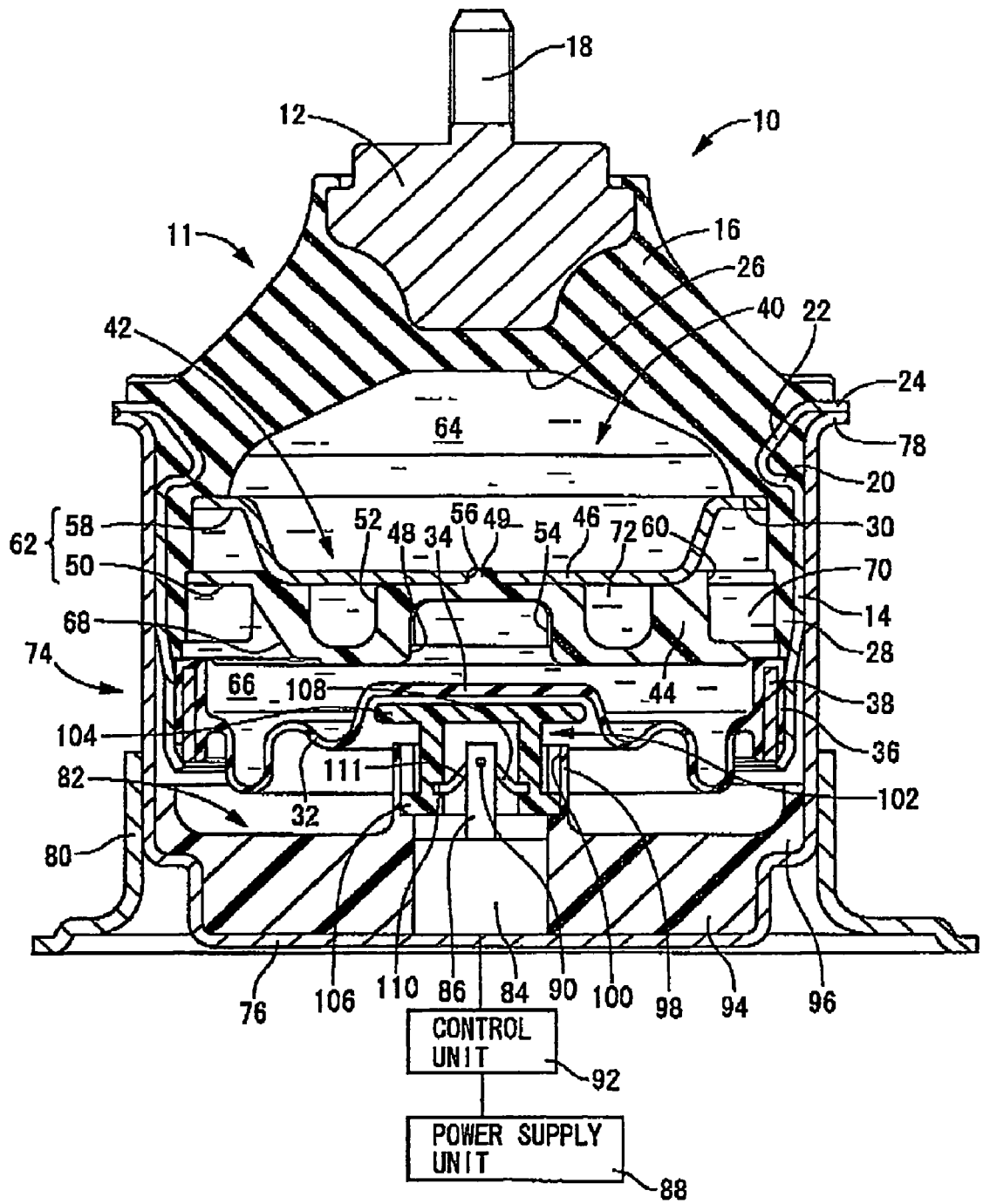
FIG. 2 is a cross sectional view of the engine mount of FIG. 1 where the second orifice passage is in an open state.

Referring first to FIGS. 1 and 2, there is depicted an automotive engine mount 10 as one embodiment of the fluid filled vibration damping device according to the present invention. This engine mount 10 includes a mount main body 11, and has a construction in which a first mounting member 12 provided as the first mounting member and a second mounting member 14 provided as the second mounting member are connected to one another by a main rubber elastic body 16. The first mounting member 12 is then mounted onto the power unit of the automobile, not shown, which is one of the components making up a vibration transmission system, while the second mounting member 14 is mounted onto the body of the automobile, not shown, which is the other component making up the vibration transmission system, thereby providing vibration damped linkage of the power unit and the car body via the engine mount 10.

To describe in greater detail, the first mounting member 12 is a block shaped member made of iron, aluminum alloy or the like. In this embodiment, the upper part has a round block shape, while the lower part has a round block shape of gradually increasing diameter going upward. An upwardly projecting mounting bolt 18 is integrally disposed at the upper end of the first mounting member 12.

Meanwhile, the second mounting member 14 is a high-rigidity component having a thin, large-diameter, generally round tube shape, and like the first mounting member 12 is made of iron, aluminum alloy or the like. At the upper end, an inwardly flanged shoulder portion 20 is provided, and a tapered portion 22 that flares out gradually in the upward direction is integrally formed with the inside peripheral edge of the shoulder portion 20. A flanged portion 24 that extends in the axial-perpendicular direction is formed at the upper edge of the tapered portion 22.

The first mounting member 12 and the second mounting member 14 are disposed spaced apart to the side of the opening of the second mounting member 14 on the side thereof where the flanged portion 24 is located, and situated on the same center axis. The main rubber elastic body 16 is interposed between the first mounting, member 12 and the second mounting member 14, with the first mounting member 12 and the second mounting member 14 linked to one another by the main rubber elastic body 16.

The main rubber elastic body 16 is formed from a rubber elastic body having thick, generally frustoconical shape with a large-diameter recess 26 of semispherical or bowl shape opening onto the end face formed at its large-diameter end. The lower end part of the first mounting member 12 has been inserted into and vulcanization bonded to the small-diameter end of the main rubber elastic body 16, while the upper end section of the second mounting member 14 inclusive of the tapered portion 22 has been juxtaposed against and vulcanization bonded to the outside peripheral face of the large-diameter end of the main rubber elastic body 16. The first mounting member 12 and the second mounting member 14 are thereby elastically linked by the main rubber elastic body 16, with one of the openings of the second mounting member 14 scaled off fluidtightly by the main rubber elastic body 16. By virtue of the above design, the main rubber elastic body 16 according to this embodiment is provided as an integrally vulcanization molded component that integrally incorporates the first mounting member 12 and the second mounting member 14.

A seal rubber layer 28 having thin-walled, large diameter tubular shape is integrally formed extending axially downward from the outside peripheral edge of the large diameter end of the main rubber elastic body 16. This seal rubber layer 28 sheathes the inside peripheral face of the second mounting member 14, with the inside peripheral face of the second mounting member 14 in the section thereof below the shoulder portion 20 being covered over substantially its entire face by the seal rubber layer 28. At the rim of the opening of the large-diameter recess 26, a shoulder face 30 of annular shape extending in the approximately axial-perpendicular direction is formed to the inside peripheral side of the seal rubber layer 28.

A diaphragm 32 serving as a flexible film is disposed in the other opening section of the second mounting member 14. The diaphragm 32 is a rubber film of thin, large-diameter, generally round disk shape endowed in its outside peripheral section with ample slack in the axial direction. The center section of the diaphragm 32 constitutes a center contact portion 34 of round disk shape thicker than the outside peripheral section. A fastener portion 36 of annular shape is integrally formed in the outside peripheral edge part of the diaphragm 32.

A fastener fitting 38 is bonded by vulcanization to the fastener portion 36 that is provided to the diaphragm 32. The fastener fitting 38 is a high-rigidity component made of iron or the like, having a large-diameter, generally annular shape and attached in embedded form to the fastener portion 36. In the above manner, the diaphragm 32 in this embodiment is provided as an integrally vulcanization molded component that integrally incorporates the fastener fitting 38.

The integrally vulcanization molded component of the diaphragm 32 is attached to the integrally vulcanization molded component of the main rubber elastic body 16 incorporating the first mounting member 12 and the second mounting member 14. Specifically, after inserting the diaphragm 32 into the opening of the second mounting member 14 on the side thereof opposite from the main rubber elastic body 16, the second mounting member 14 will be subjected to a diameter reduction process to secure the fastener fitting 38 positioned within the opening section of the second mounting member 14. The diaphragm 32 will thereby be attached in such a way as to fluidtightly cover the other opening section of the second mounting member 14.

With the diaphragm 32 thusly attached to the second mounting member 14, to the inside peripheral side of the second mounting member 14 there is defined between the axially opposed faces of the main rubber elastic body 16 and the diaphragm 32 a fluid filled zone 40 that is isolated from the outside and that is filled with a non-compressible fluid. While no particular limitation is imposed on the sealed non-compressible fluid filling the fluid filled zone 40, it would be favorable to use an alkylene glycol, a polyalkylene glycol, a silicone oil, a some mixture of these for example. In order to effectively achieve vibration damping effect based on flow action such of the fluid (discussed later) it will be preferable to use a low-viscosity fluid having viscosity of 0.1 Pa·s or lower.

A partition member 42 is disposed housed within the fluid filled zone 40, and is supported by the second mounting member 14. The partition member 42 includes a partition member main body 44 and a cover plate fitting 46.

The partition member main body 44 has a thick, generally round disk shape and is made of hard synthetic resin or metal such as aluminum alloy. A center recess 48 of round shape which opens downward is formed in the diametrical center section of the partition member main body 44. A small-diameter center projection 49 that projects upward is also integrally formed in the diametrical center section of the partition member main body 44.

A first circumferential groove 50 is formed on the outside peripheral edge of the partition member main body 44. The first circumferential groove 50 opens onto the outside peripheral face of the partition member main body 44, and extends continuously along the outside peripheral edge of the partition member main body 44 for a prescribed distance just short of a full circle. Additionally, a slot 52 is formed in the diametrically medial section of the partition member main body 44. The slot 52 opens onto the upper end face of the partition member main body 44 and extends continuously in the circumferential direction for a prescribed distance just short of a full circle, at a location situated diametrically between the center recess 41 and the first circumferential groove 50. The slot 52 communicates at one end with the center recess 48 through a connecting passage 54 that extends in the axial-perpendicular direction.

Meanwhile, the cover plate fitting 46 is a member made of metal having generally round disk shape. The cover plate fitting 46 of this embodiment is positioned with its outside peripheral section situated axially above its center section via a shoulder portion. A round through-hole 56 is formed in the center section of the cover plate fitting 46. The through-hole 56 is a hole of small diameter corresponding in shape to that of the center projection 49 that has been formed on the partition member main body 44.

The partition member 42 of this embodiment is constructed by assembling the partition member main body 44 and the cover plate fitting 46 together. Specifically, the cover plate fitting 46 is juxtaposed against the upper end face of the partition member main body 44, and the center projection 49 that projects up from the partition member main body 44 is inserted into the through-hole 56 that passes through the cover plate fitting 46 thereby securing the cover plate fitting 46 to the partition member main body 44, to construct the partition member 42.

In the partition member 42, the partition member main body 44 and the cover plate fitting 46 are juxtaposed with their diametrical center sections in intimate contact with one another, but with their outside peripheral sections positioned spaced apart by a prescribed distance in the axial direction. In these mutually spaced apart outside peripheral sections of the partition member main body 44 and the cover plate fitting 46, there is formed a second circumferential groove 58 that extends in the circumferential direction between the opposing faces of the partition member main body 44 and the cover plate fitting 46. While not always clear from the drawings, this second circumferential groove 58 extends continuously in the circumferential direction for a prescribed distance just short of a full circle. Between the circumferential ends of the second circumferential groove 58, there is provided a divider wall (not shown) that is integrally formed with the partition member main body 44, dividing the second circumferential groove 58 at a length just short of full circle in the circumferential direction.

With the partition member main body 44 and the cover plate fitting 46 in the assembled state, one end of the first circumferential groove 50 and one end of the second circumferential groove 58 interconnect through a connecting window 60 that opens onto the upper end face of the partition member main body 44 at one end of the first circumferential groove 50. The first circumferential groove 50 and the second circumferential groove 58 thereby form a circumferential groove 62 of helical shape that extends for a prescribed distance equal to just short of twice around the circumference.

The partition member 42 which in this tanner is composed of the partition member main body 44 and the cover plate fitting 46 will be disposed housed within the fluid filled zone 40. Specifically, prior to attaching the diaphragm 32 to the second mounting member 14, the partition member 42 will be positioned fitting within the second mounting member 14 from the opening on the side thereof opposite that to which the main rubber elastic body 16 was vulcanization bonded. The diaphragm 32 will then be positioned fitting within the second mounting member 14 from this same opening, and the second mounting member 14 will then be subjected to a diameter reduction process such as 360-degree radial compression to secure the partition member 42 and the diaphragm 32 fitting within the second mounting member 14.

With the partition member 42 and the diaphragm 32 thusly installed, the outside peripheral section of the upper end face of the partition member 42 will be disposed in pressure contact against the shoulder face 30 of the main rubber elastic body 16, while the outside peripheral section of the lower end face of the partition member 42 will be disposed in pressure contact against the fastener fitting 38 via the fastener portion 36, providing each with a fluidtight seal. Additionally, the outside peripheral face of the partition member 42 will be juxtaposed fluidtightly against the second mounting member 14 via the seal rubber layer 28. The fluid filled zone 40 will thereby be bifurcated into upper and lower parts situated to either side of the partition member 42 in the axial direction, thereby forming to one side of the partition member 42 a pressure receiving chamber 64 whose wall is partly defined by the main rubber elastic body 16 and that gives rise to pressure fluctuations through elastic deformation, while forming to the other side of the partition member 42 an equilibrium chamber 66 whose wall is partly defined by the diaphragm 32 and that is adapted to change in volume through elastic deformation of the diaphragm 32. The non-compressible fluid which fills the fluid filled zone 40 also fills the pressure receiving chamber 64 and the equilibrium chamber 66, respectively.

The outside peripheral opening of the circumferential groove 62 which has been formed on the outside peripheral edge of the partition member 42 is closed off fluidtightly by the second mounting member 14. One end of the circumferential groove 62 communicates with the pressure receiving chamber 64 through a connecting window (not shown) that has been formed in the cover plate fitting 46, while the other end of the circumferential groove 62 communicates with the equilibrium chamber 66 through a connecting window 68 that has been formed in the partition member main body 44. Availing of this circumferential groove 62 of the partition member 42 there is thereby defined a first orifice passage 70 that extends for a prescribed length in the circumferential direction and that functions as a fluid passage interconnecting the pressure receiving chamber 64 and the equilibrium chamber 66.

In this embodiment, the resonance frequency of fluid flowing through the first orifice passage 70 is tuned so as to produce, on the basis of the resonance action of the fluid, effective vibration damping action (high attenuating action) against vibration in a low frequency range of about 10 Hz, corresponding to engine shake etc.

Additionally, the opening of the slot 52 that was formed in the partition member 42 is covered by the cover plate fitting 46, and one end of the slot 52 communicates with the pressure receiving chamber 64 through a connecting window (not shown) that has been formed in the cover plate fitting 46 while the other end of the slot 52 communicates with the equilibrium chamber 66 through the center recess 48. Availing of the slot 52 and the center recess 48 of the partition member 42 there is thereby defined a second orifice passage 72 that extends for a prescribed length in the circumferential direction and that functions as a fluid passage interconnecting the pressure receiving chamber 64 and the equilibrium chamber 66.

In this embodiment, the resonance frequency of fluid flowing through the second orifice passage 72 is tuned so as to produce, on the basis of the resonance action of the fluid, effective vibration damping action (low dynamic spring effect) against vibration in a medium to high frequency range of between about 20 and 40 Hz, corresponding to idling vibration etc.

It is possible for tuning of the orifice passages 70, 72 to be carried out, for example, through adjustment of the passage length and passage cross sectional area of the orifice passages 70, 72 with consideration to characteristic values based on the rigidity of the walls of the pressure receiving chamber 64 and the equilibrium chamber 66, specifically, on levels of elastic deformation of the main rubber elastic body 16 and of the diaphragm 32 that correspond to levels of pressure change needed to induce change by a unit of volume in the chambers 64, 66. Generally speaking, the tuning frequency of the orifice passages 70, 72 can be understood as the frequency at which the phase of pressure fluctuations transmitted via the orifice passages 70, 72 changes and assumes a generally resonant state.

The mount main body 11 according to this embodiment having the construction described above will be attached to a bracket fitting 74. The bracket fitting 74 is a high rigidity member made of iron or the like having a sleeve portion 76 into which the mount main body 11 fits. The sleeve portion 76 has a bottom, round tube shape overall, with a flange portion 78 at its upper end. An annular leg portion 80 secured by welding etc. to the outside peripheral face of the sleeve portion 76. This leg portion 80 has bolt holes (not shown) passing through it at multiple locations along the circumference. The leg portion 80 is screw-fastened to the car body with fastening bolts (not shown) that are passed through the bolt holes.

The mount main body 11 is then inserted into the sleeve portion 76 of the bracket fitting 74 from the opening on the upper side, and the second mounting member 14 is secured pressure-fit into the sleeve portion 76, thereby securing the mount main body 11 fitted within the sleeve portion 76. In this embodiment, the flanged portion 24 that has been provided at the upper end of the second mounting member 14 will be disposed in abutment from above against the flange portion 78 that has been provided at the upper end of the sleeve portion 76, thereby positioning the second mounting member 14 and the sleeve portion 76 relative to one another.

Here, an actuator 82 has been installed in the bracket fitting 74. The actuator 82 is situated below the mount main body 11, resting on the base wall of the sleeve portion 76. More specifically, the actuator 82 has an electric motor 84.

The electric motor 84 is an electric motor of known type having a rotating shaft 86 as its drive shaft. By virtue of electrical current supplied by an externally provided power supply unit 88, rotational force will act on the rotating shaft 86 causing the rotating shaft 86 to undergo actuated rotation about the center axis. In this embodiment in particular, the rotating shaft 86 will undergo actuated rotation in one direction through supply of the current to the electric motor 84. Any of various motors (electric motors) of known type, such as a separately-excited DC electric motor, can be employed as the electric motor 84.

The rotating shaft 86 of the electric motor 84 is perforated by a pin 90 that functions as the sliding portion. The pin 90 has a small-diameter round rod shape. It is passed through a small-diameter round hole that has been bored through the rotating shaft 86 in the diametrical direction, and is fastened to the rotating shaft 86 by adhesive or other member. The pin 90 extends in the diametrical direction of the rotating shaft 86, with its two end sections projecting diametrically outward beyond the outside peripheral face of the rotating shaft 86.

A control unit 92 is situated on the circuit that electrically connects the electric motor 84 with the power supply unit 88. The control unit 92 includes, for example, a sensor for detecting driving conditions of the automobile (e.g. a speed sensor of known type), and mechanical contact control unit that in response to results of detection by the sensor will switch the electric current to the electric motor 84 on and off in order to control starting and stopping of rotation of the rotating shaft 86. This control unit 92 controls the rotating shaft 86 so as to rotate in 90° increments. The control unit 92 that switches the electric current to the electric motor 84 on and off can be selected from known devices to date, so no description is required here.

The electric motor 84 is mounted onto a support member 94. The support member 94 has a thick annular shape, and in this embodiment is made of hard synthetic resin. An abutting portion 96 that flares out towards the outside peripheral side is provided at the upper end of the support member 94, and the outside peripheral edge of the abutting portion 96 projects upward.

Additionally, a retainer tube portion 98 is formed on the inside peripheral edge of the support member 94. The retainer tube portion 98 is of generally round tube shape and extends out upward from the inside peripheral edge of the support member 94. The retainer tube portion 98, in sections thereof situated in opposition along an axis in the diametrical direction, also has a pair of mating notches 100, 100 that open onto the inside peripheral side and the upper end face. The mating notch 100 is of groove form extending for predetermined length in the axial direction, and in this embodiment, its side faces in the circumferential direction extend parallel to one another.

The electric motor 84 is secured fitting within the center hole of the support member 94 in such a way that the rotating shaft 86 of the electric motor 84 extends coincident with the center line of the center hole of the support member 94. The rotating shaft 86 is thereby positioned a distance away from the inside peripheral side of the retainer tube portion 98.

The distal end section of the rotating shaft 86 is capped by a valve member 102 constituting a movable valve body. The valve member 102 has an inverted, generally bottom round tubular shape composed of a round disk shaped valve head and a downwardly projecting valve stem portion of tubular shape. In this embodiment, it is made of hard resin with a view to achieving lighter weight. A pusher flange portion 104 that flares towards the outside peripheral side is integrally formed at the upper end of the valve member 102. The pusher flange portion 104 in this embodiment is chamfered to give its outside peripheral edge a generally semispherical appearance in longitudinal cross section.

At the lower end of the valve member 102 there is formed a pair of mating projections 106, 106 that project towards the outside peripheral side from sections situated in opposition along an axis in the diametrical direction. The mating projection 106 is a projection of generally block shape whose end faces in the circumferential direction extend parallel to one another. The circumferential width dimension of the mating projections 106 is approximately equal to the circumferential width dimension of the mating notches 100 that were formed in the retainer tube portion 98, while the axial width dimension of the mating projections 106 is sufficiently smaller than the axial width dimension of the mating notches 100.

Figure 3:
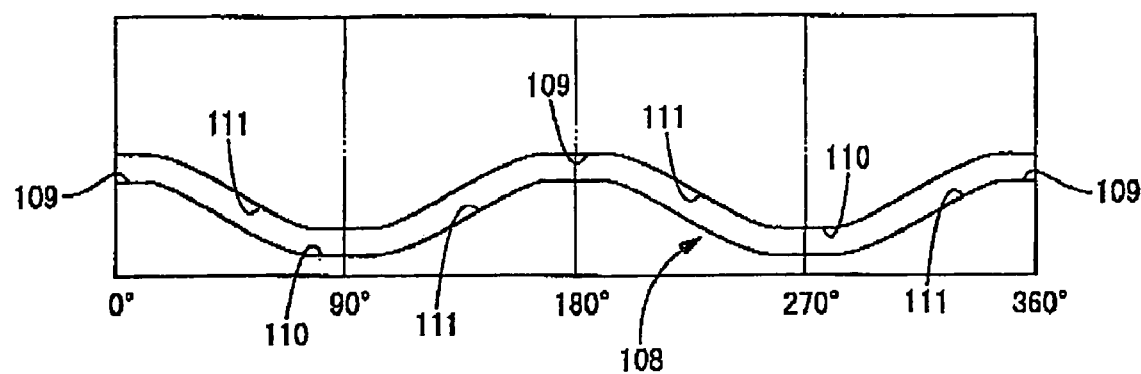
FIG. 3 is an exploded view of an inner surface of a peripheral wall portion of the valve member of the engine mount of FIG. 1.

Here, a cam slot 108 is formed in the valve member 102. The cam slot 108 is formed in the peripheral wall of the tubular valve member 102, specifically, in the medial section thereof in the direction of reciprocating operation (axial direction), discussed later. The cam slot 108 is a slot that opens to the inside peripheral side of the peripheral wall of the valve member 102 and extends about its entire circumference. As depicted in development view in FIG. 3, the location of the cam slot 108 in the vertical direction varies in cyclical fashion in the circumferential direction. A cam face in this embodiment is defined by the upper and lower faces (the widthwise side faces) of the cam slot 108. In the valve member 102, which has a bottomed round tubular shape, the peripheral wall of round tubular shape extending in the axial direction constitutes the tubular portion taught in the embodiment.

More specifically, in the cam slot 108, a pair of upper end retainer portions 109 are formed in sections situated in opposition along an axis in the diametrical direction. The lower end retainer portions 110 are formed in sections situated in opposition along an axis in the diametrical direction orthogonal to the axis in the diametrical direction on which the pair of upper end retainer portions 109 are situated. The upper end retainer portions 109 and the lower end retainer portions 110 are slots that extend for prescribed length in the circumferential direction on an axial-perpendicular plane, with the upper end retainer portions 109 situated above the lower end retainer portions 110.

Sloping guide portions 111 are formed between upper end retainer portions 109 and lower end retainer portions 110 that are adjacently situated in the circumferential direction, with the circumferential ends of the upper end retainer portions 109 and the circumferential ends of the lower end retainer portions 110 being interconnected by the sloping guide portions 111 so that the cam slot 108 which extends all the way around the circumference is defined by the upper and lower end retainer portions 109, 110 and the sloping guide portions 111 respectively. As will be appreciated from the above description, in this embodiment, the upper end retainer portions 109 and the lower end retainer portions 110 are respectively situated at the upper and lower ends of the cam slot 108. In this embodiment, the connecting sections of the upper end retainer portions 109 and the lower end retainer portions 110 with the sloping guide portions 111 connect smoothly so as to be devoid of broken lines. The sloping guide portions 111 curve slightly into an upwardly convex contour.

That is, in this embodiment, the cam slot 108 will be positioned at the same height in the axial direction at opposing locations in the diametrical direction (i.e. at locations offset by 180° in the circumferential direction). Where the upper end retainer portion 109 has been formed in the section labeled 0° in FIG. 3, another upper end retainer portion 109 will be formed in the section offset by 180° in the circumferential direction, and the lower end retainer portions 110 will be formed in sections offset by ±90° in the circumferential direction (90° and 270° in FIG. 3).

The valve member 102 having the cam slot 108 as described above will be attached to the rotating shaft 86 of the electric motor 84. Specifically, the valve member 102 will be positioned over the rotating shaft 86 from above, with the peripheral wall of the valve member 102 encircling the rotating shaft 86 a distance away to the outside peripheral side of the rotating shaft 86.

Additionally, the pin 90 that has been attached to the rotating shaft 86 fits slidably within the cam slot 108 that has been formed in the valve member 102. The linking sections of the rotating shaft 86 and the valve member 102 are thereby provided with a cam mechanism composed of the pin 90 and the cam slot 108. Since sections of the cam slot 108 that are situated in opposition in the diametrical direction are positioned at the same location (height) in the axial direction, by positioning the pin 90, which projects out to either side in the diametrical direction, within the cam slot 108 the valve member 102 will be positioned without tilt on the same center axis as the rotating shaft 86.

In this embodiment, the valve member 102 is bifurcated for example into an upper section situated above the cam slot 108 and a lower section that includes the cam slot. The valve member 102 is attached to the rotating shaft 86 by juxtaposing these upper and lower sections in the axial direction, then positioning the pin 90 within the cam slot 108 by sandwiching the pin between the upper section and the lower section, and bonding the juxtaposed sections of the upper section and the lower section together by ultrasonic welding or other member.

Figure 4:
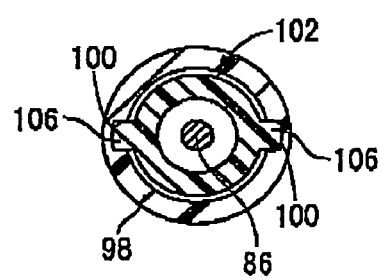
FIG. 4 is a cross sectional view taken along line 4-4 of FIG. 1.

By positioning the rotating shaft 86 of the electric motor 84 to the inside peripheral side of the retainer tube portion 98, the valve stem of the valve member 102 will insert within the retainer tube portion 98. As depicted in FIG. 4, the mating projections 106 that have been integrally formed at the lower end of the valve member 102 are aligned in the circumferential direction with the mating notches 100 that have been formed in the retainer tube portion 98, and the mating projections 106 are fitted into the mating notches 100. Through the intermeshing action of the mating projections 106 and the mating notches 100 in the circumferential direction, the valve member 102 will be detained in the circumferential direction with respect to the retainer tube portion 98, making relative rotation impossible. Specifically, in this embodiment, the retainer tube portion 98 that has been arranged fitting externally onto the valve stem of the valve member 102 constitutes a guide member. By virtue of the mating projections 106 of the valve member 102 detained by the mating notches 100 of the retainer tube portion 98, there is constituted between the retainer tube portion 98 and the valve member 102 a rotation restricting mechanism for restricting rotation of the valve member 102 about a center axis.

Thus, rotational actuating force generated by the energized electric motor 84 will be converted by the cam mechanism composed of the pin 90 and the cam slot 108 into reciprocating actuating force for transmission to the valve member 102. That is, in this embodiment, the cam mechanism serves as an actuating force converter mechanism. By controlling current to the electric motor 84, the valve member 102 can undergo actuated displacement to a prescribed location in the axial direction. Reciprocating operation of the valve member 102 in the axial direction will be discussed below.

First, with the pin 90 that has been provided to the rotating shaft 86 of the electric motor 84 positioned over the upper end retainer portions 109 of the cam slot 108, the valve member 102 will be positioned at the lower end in the actuation direction. In this state, the mating projections 106 that have been disposed at the lower end of the valve member 102 will be in contact against the axial lower end faces of the mating notches 100.

Next, rotation of the rotating shaft 86 of the electric motor 84 is actuated by supplying current to the electric motor 84 from the power supply unit 88. Here, the rotating shaft 86 of the electric motor 84 will be rotated in quarter-turn increments through control of current to the electric motor 84 by the control unit 92. Once the rotating shaft 86 has rotated by a quarter turn, the pin 90, which extends along an axis in the diametrical direction of the rotating shaft 86, will slide along the cam slot 108 in the circumferential direction and become positioned over the lower end retainer portions 110 of the cam slot 108. At this point, displacement of the rotating shaft 86 in the axial direction becomes impossible, so when the pin 90 which has been affixed to the rotating shaft 86 undergoes displacement axially downward relative to the valve member 102, the valve member 102 will undergo actuated displacement axially upward.

In this embodiment in particular, since engagement of the mating projections 106 with the mating notches 100 prevents the valve member 102 from rotating, actuated displacement in the axial direction will be brought about through actuated rotation of the rotating shaft 86, without the valve member 102 rotating.

Next, when current is again supplied to the electric motor 84 from the power supply unit 88, causing the rotating shaft 86 to rotate by a further quarter turn, the pin 90 will undergo displacement in the circumferential direction along the cam slot 108 and become positioned over the upper end retainer portions 109 of the cam slot 108. The valve member 102 will undergo actuated displacement axially downward thereby.

In this way, rotational actuating force produced by the electric motor 84 will be converted by the cam mechanism into linear actuating force in the axial direction, which will then be transmitted to the valve member 102. Through actuated rotation of the rotating shaft 86 of the electric motor 84 in 90° increments one way in the circumferential direction, the valve member 102 will undergo reciprocating operation up and down in the axial direction.

The actuator 82 constructed in the above manner will be fitted into the sleeve portion 76 of the bracket fitting 74 and secured resting on the base wall of the sleeve portion 76. Once thusly installed in the bracket fitting 74, the mount main body 11 will be attached to the bracket fitting 74 to make the engine mount 10 according to this embodiment.

In the engine mount 10, the actuator 82 will be positioned below the mount main body 11, and the valve member 102 will be positioned below the center contact portion 34 of the diaphragm 32, either spaced apart from it by a prescribed distance in the axial direction, or juxtaposed against it in a state of contact.

In other words, the actuator 82 will be situated to the opposite side of the diaphragm 32 from the partition member 42. To either side of the center contact portion 34 of the diaphragm 32, the valve member 102 of the actuator 82 will be situated in opposition to the center recess 48 which is the opening of the second orifice passage 72 on the equilibrium chamber 66 side.

Through actuated displacement in the axial direction, the valve member 102 will be urged into contact with or away from the center contact portion 34 of the diaphragm 32, and the center contact portion 34 will undergo up and down displacement according to the reciprocating operation of the valve member 102 in the axial direction. Thus, the valve member 102 will urge the center contact portion 34 of the diaphragm 32 relatively closer to or away from the center recess 48 of the partition member 42.

Specifically, when the valve member 102 is positioned at the lower end in the direction of reciprocating operation, the valve member 102 will urge the center contact portion 34 of the diaphragm 32 downward, whereupon the center contact portion 34 will be positioned below and away from the partition member 42, opening up the center recess 48 into the equilibrium chamber 66.

On the other hand, when the valve member 102 is positioned at the upper end in the direction of reciprocating operation, the center contact portion 34 will be pushed by the valve member 102 and pressed against the lower face of the partition member 42 so that the opening of the center recess 48 becomes blocked off by the valve member 102 via the center contact portion 34.

Through control of reciprocating operation of the valve member 102 as described above, the opening of the center recess 48 (which is the opening of the second orifice passage 72 on the equilibrium chamber 66 side) can be switched between the communicating state and the blocked state, and the second orifice passage 72 can accordingly be switched between the communicating state and the blocked state. As will be apparent from FIG. 2 as well, in this embodiment, the valve member 102 and the diaphragm 32 are separable from one another in an unattached state.

The automotive engine mount 10 constructed as above will be installed by attaching the first mounting member 12 of the mount main body 11 to the power unit (not shown) with mounting bolts 18, and attaching the second mounting member 14 to the car body (not shown) via the bracket fitting 74. By so doing, the engine mount 10 will be installed interposed between the power unit and the car body to provide vibration-damped support of the power unit on the car body.

With the automotive engine mount 10 constructed as above installed in an automobile, when engine shake or other vibration in the low-frequency range that can be a problem during driving is input, relatively large pressure fluctuations will be produced in the pressure receiving chamber 64. Due to a relative pressure fluctuation differential arising between the pressure receiving chamber 64 and the equilibrium chamber 66, a sufficient flow of fluid through the first orifice passage 70 will be effectively assured, and effective vibration damping action (high attenuating action) against engine shake and other vibration in a low frequency range will be produced based on flow action, e.g. the resonance action, of the fluid.

At this time, as depicted in FIG. 1 the valve member 102 will be positioned at the upper end of the direction of reciprocating operation and will be pressed against the opening of the second orifice passage 72 on the equilibrium chamber 66 side via the center contact portion 34 of the diaphragm 32. The opening of the second orifice passage 72 on the equilibrium chamber 66 side will thereby be blocked off fluidtightly, and the second orifice passage 72 will assumed the blocked state. Consequently, the fluid will be prevented from flowing between the pressure receiving chamber 64 and the equilibrium chamber 66 through the second orifice passage 72 so that liquid pressure inside the pressure receiving chamber 64 will not escape to the equilibrium chamber 66. Thus, fluid flow through the first orifice passage 70 can be produced efficiently, and vibration damping action based on flow action of the fluid can be effectively achieved.

Input of vibration in the medium- to high-frequency range (for example idling vibration that can be a problem with the car at a stop, or low-speed rumble which can be a problem during driving) will give rise to small-amplitude pressure fluctuations in the pressure receiving chamber 64. At times of input of such vibration, rotation of the rotating shaft 86 will be actuated through control of current to the electric motor 84, to actuate displacement of the valve member 102 to the lower end in the axial direction, as depicted in FIG. 2.

With this arrangement, the opening of the second orifice passage 72 on the equilibrium chamber 66 side can be switched to the communicating state so that the pressure receiving chamber 64 and the equilibrium chamber 66 communicate with one another through the second orifice passage 72. Due to a relative pressure fluctuation differential arising between the pressure receiving chamber 64 and the equilibrium chamber 66, a sufficient flow of fluid through the second orifice passage 72 can be effectively assured, and effective vibration damping action (low dynamic spring effect) against vibration in a medium to high frequency range such as vibration during idling will be produced based on flow action, e.g. the resonance action, of the fluid.

That is, in the fluid filled vibration damping device according to this embodiment, the second orifice passage 72 is adapted to be controlled between communicating and blocked states through reciprocating operation of the valve member 102 in order to switch the vibration damping characteristics. In FIGS. 1 and 2, in order to facilitate understanding, the stroke of the reciprocating operation of the valve member 102 is depicted in exaggerated form. In association therewith, the shape of the cam slot 108, specifically, the height of the upper end retainer portion 109 and the lower end retaining portion in the axial direction, and the associated slope angle of the sloping guide portions 111 for example, are also depicted in exaggerated form.

In the automotive engine mount 10 according to this embodiment, by providing a control unit 92 that controls energization status, as well as employing a cam mechanism that converts rotational actuating force of the rotating shaft 86 to axial actuating force of the valve member 102 in the linking sections of the valve member 102 and the rotating shaft 86, actuated displacement of the valve member 102 may be induced towards both sides in the axial direction through the agency of an ordinary electric motor 84 whose rotating shaft 86 rotates only one way in the circumferential direction. Consequently, actuated displacement of the valve member 102 up and down in the axial direction can be brought about, and switching control of the vibration damping characteristics can be accomplished, with an electric motor 84 of relatively simple structure.

Where the pin 90 is positioned at the upper end or at the lower end of the cam slot 108, the pin 90 will be retained in the axial direction through contact against a widthwise side wall of the cam slot 108. Accordingly, where the pin 90 is positioned at the upper end or at the lower end of the cam slot 108, in other words, with the valve member 102 situated at the upper end or the lower end in the direction of reciprocating operation, it will be retained such that actuated displacement in the axial direction is impossible due to the rotating shaft 86 being maintained in a stationary state. Through such retaining action resulting from engagement of the pin 90 with the cam slot 108 the valve member 102 can be retained in its axial position, and consistent vibration damping characteristics can be maintained, even in the absence of current to the electric motor 84.

In this embodiment in particular, retainer portions 109, 110 that extend in the axial-perpendicular direction have been formed at the upper end and lower end of the cam slot 108. Thus, with the pin 90 positioned over the upper end retainer portions 109 and the lower end retainer portions 110, retaining action through engagement between the pin 90 and the cam slot 108 can take place more effectively, and the valve member 102 can be retained at the upper and lower ends in the direction of reciprocating operation in a more reliable manner.

Moreover, as retention force can be exerted on the valve member 102 without the need to energize the electric motor 84, the power consumption needed to maintain the switched vibration damping characteristics can be kept to a minimum, and heat emission due to continuous sustained energization can be avoided, so that diminished durability due to heat can be prevented.

Particularly where the valve member 102 has been positioned at the upper end in the direction of reciprocating operation, the structure will be one whereby effective retention force can be obtained in the absence of energization so that the second orifice passage 72 can be reliably maintained in the substantially blocked state, and the objective vibration damping capabilities can be achieved at times of input of engine shake or other vibration in the low-frequency range.

Moreover, with the engine mount 10 constructed such that engaging action of the pin 90 and the cam slot 108 is utilized to exert retention force on the valve member 102, even if pressure inside the pressure receiving chamber 64 is exerted on the valve member 102 through the second orifice passage 72 it will be possible nevertheless to stably maintain the valve member 102 in the desired switched state in opposition to this pressure, and to more reliably maintain the second orifice passage 72 in the substantially blocked state, as compared to the case where the second orifice passage 72 must be maintained in the blocked state through continuous sustained energization.

Additionally, in this embodiment, the cam face making up the cam mechanism is realized through the agency of the cam slot 108. For this reason, when the pin 90 moves in the circumferential direction along the cam slot 108 by actuated rotation of the rotating shaft 86, the valve member 102 will be subjected not only axially upward force but also to axially downward force owing to the pin 90 being urged into contact against the widthwise side walls of the cam slot. Consequently, actuated displacement of the valve member 102 both to the upper and lower sides can be accomplished more effectively.

Moreover, owing to the construction whereby the pin 90 is inserted into the cam slot 108 of slotted contours, tilting of the valve member 102 relative to the rotating shaft 86 or dislodging of the valve member 102 from the rotating shaft 86 upward in the axial direction can be prevented through contact between the pin 90 and the side walls of the cam slot 108. Consequently, operation of the actuator 82 can be stabilized, and switching of vibration damping characteristics can take place consistently and with high accuracy.

Also, as compared to the case where the stroke of the valve member 102 in the actuation direction is controlled using a linear motor for example, it will be possible to minimize variability in the extent of actuated displacement of the valve member 102 in relation to fluctuations in voltage supplied to the electric Motor 84, so that switching of vibration damping characteristics can take with higher accuracy.

Furthermore, in this embodiment, the pusher flange portion 104 that flares towards the outside peripheral side is integrally formed at the upper end of the valve member 102. This will ensure ample surface area of the upper end face of the valve member 102 so that pressure per unit of surface area exerted on the center contact portion 34 of the diaphragm 32 can be kept to a minimum. Moreover, because the outside peripheral face of the pusher flange portion 104 is defined by a curving face of arcuate shape, when pushing force is exerted on the diaphragm 32 by the valve member 102, localized concentration of pushing force can be avoided, and durability of the diaphragm 32 can be improved.

Figure 5:
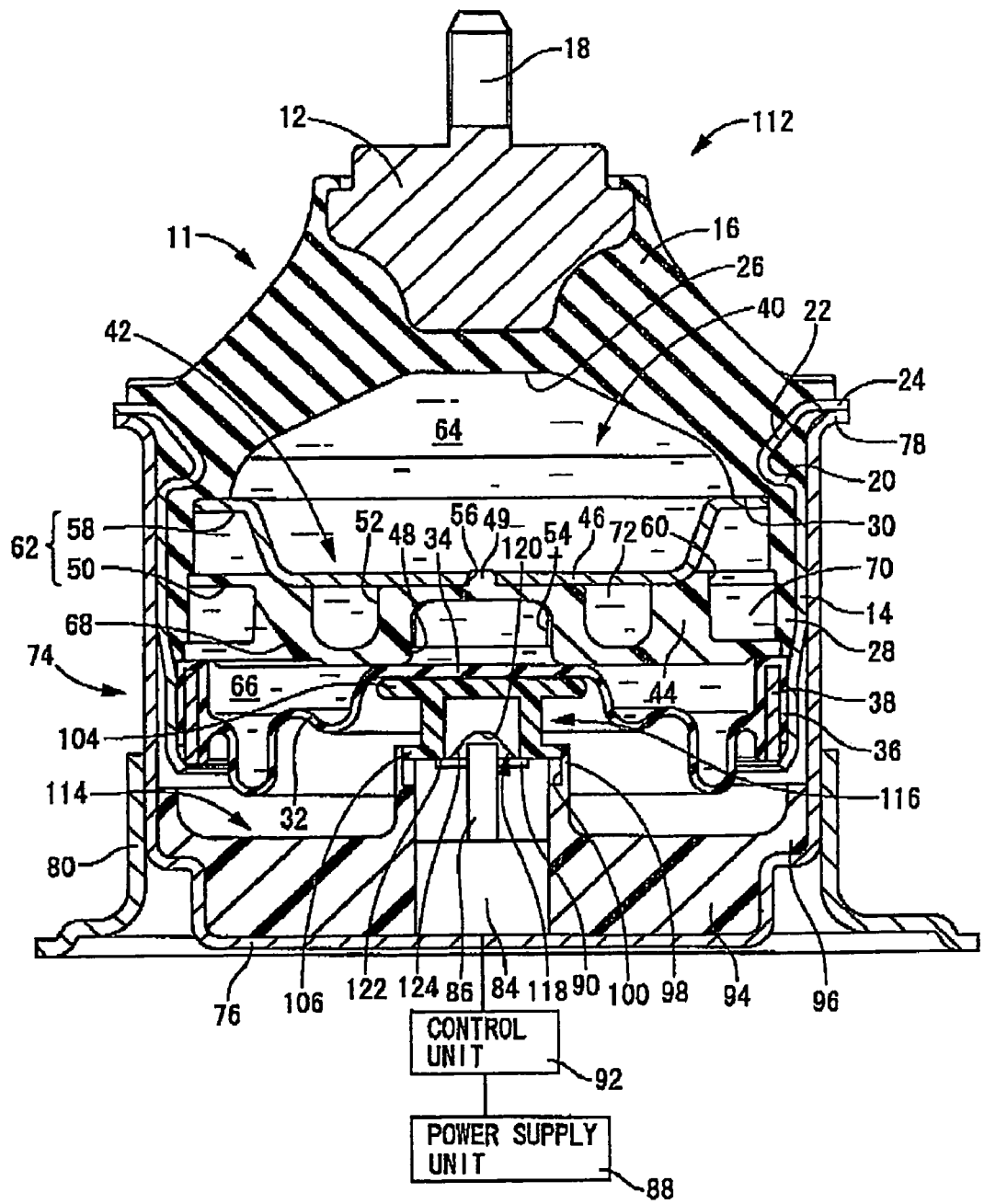
FIG. 5 is a vertical cross sectional view of an automotive engine mount according to a second embodiment of the present invention.
Figure 6:
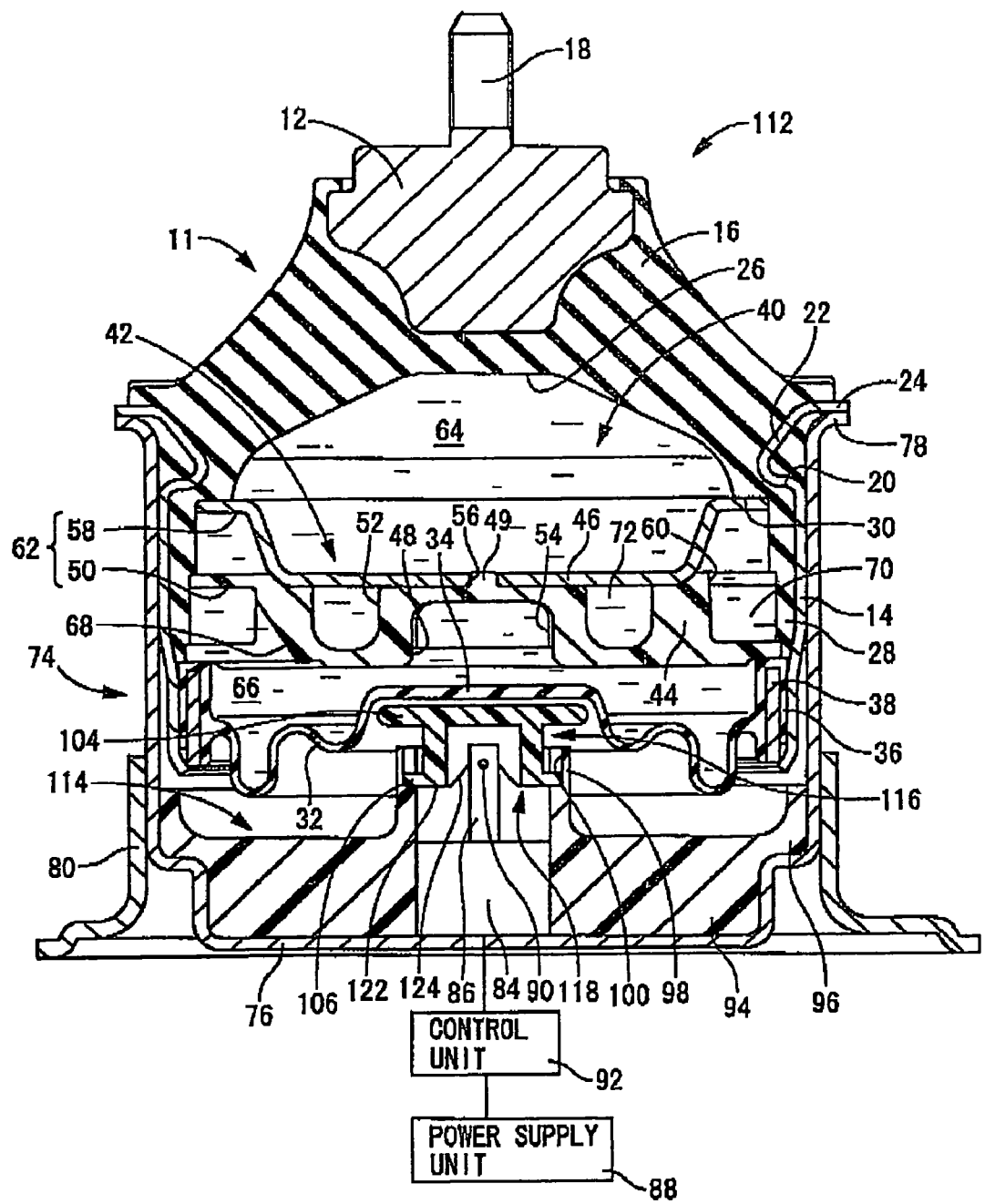
FIG. 6 is a cross sectional view of the engine mount of FIG. 5 where the second orifice passage is in an open state.

Next, an automotive engine mount 112 according to a second embodiment of the present invention will be described, making reference to FIGS. 5 and 6. This engine mount 112 is furnished with an actuator 114. In the following description, elements that are substantially the same as those in the preceding first embodiment will be assigned like symbols in the drawing, and will not be discussed at length.

To describe in more detail, the actuator 114 is further provided with a valve member 116 constituting the movable valve body. The lower end face of the valve member 116 is constituted by a cam face 118. The cam face 118 has a pair of upper end retainer portions 120 that are situated in opposition along an axis in the diametrical direction, and lower end retainer portions 122 that are situated in opposition along an axis in the diametrical direction that is orthogonal to the direction of opposition of the upper end retainer portions 120, and that are situated axially below the upper end retainer portions 120.

Upper end retainer portions 120 and lower end retainer portions 122 that are situated adjacently in the circumferential direction connect to one another through sloping guide portions 124. The cam face 118 extending all way around the circumference is constituted by these upper end retainer portions 120, lower end retainer portions 122, and sloping guide portions 124. In this embodiment, the upper end retainer portions 120, the lower end retainer portions 122, and the sloping guide portions 124 connect smoothly so as to be devoid of broken lines. The sloping guide portions 124 slope towards the axial-perpendicular direction and curve slightly.

That is, if the valve member 102 according to the first embodiment were cut along the upper edge of the cam slot 108, the upper section above the cut would resemble in shape the valve member 116 according to this embodiment.

The valve member 116 of this embodiment constructed as shown above will be attached to the rotating shaft 86. Specifically, the valve member 116 will be capped onto the rotating shaft 86 from axially above, and a pin 90 that extends orthogonal to the rotating shaft 86 will be positioned contacting the cam face 118 from below. The pin 90 thus serves as a bearing for the valve member 116.

When the rotating shaft 86 is rotated in 90° increments by supplying current to the electric motor 84, the valve member 116 will undergo actuated displacement up and down in the axial direction through the operation of the cam mechanism which is composed of the cam face 118 and the pin 90. The valve member 116 according to this embodiment undergoes up and down actuation comparable to the first embodiment and will not be described in detail here.

Like the actuator 82 in the first embodiment, the actuator 114 constructed as shown above will be attached to the bracket fitting 74 and installed below the mount main body 11, with the valve member 116 juxtaposed from below in an unattached state against the center contact portion 34 of the diaphragm 32. The engine mount 112 according to this embodiment is constructed by arranging this actuator 114 at a prescribed location. In this embodiment, as in the first embodiment described earlier, with at least the valve member 116 positioned at the axial lower end, the valve member 116 and the center contact portion 34 will be positioned at a distance. With the actuator 114 arranged in the above manner, through indirect contact of the valve member 116 with the partition member 42 the valve member 116 will be prevented from becoming detached upward in the axial direction.

Thus, like the engine mount 10 according to the first embodiment, in the engine mount 112 according to this embodiment, opening and closing of the opening on the equilibrium chamber 66 side of the second orifice passage 72 will be controlled, and vibration damping characteristics will be switched, through up and down actuation of the valve member 116. Effective vibration damping can thereby be achieved both in the case of low-frequency vibration corresponding to engine shake, and medium- to high-frequency vibration corresponding to idling vibration.

In the engine mount 112 according to this embodiment, a cam face is constituted by the lower end face of the valve member 116, and the valve member 116 is disposed resting from above on the pin 90 that is affixed to the rotating shaft 86, with the pin 90 contacting the cam face 118, in order to assemble the valve member 116 to the rotating shaft 86. With the structure according to this embodiment, the valve member 116 can be easily attached to the rotating shaft 86, and productivity can be improved.

While the present invention has been shown hereinabove in terms of certain preferred embodiments, these are merely illustrative and should in no wise be construed as limiting the invention to the specific disclosure herein.

For example, in the first and second embodiments, relative rotation of the valve member 102, 116 with respect to the partition member 42, and hence with respect to the second mounting member 14, is prevented by through intermeshing of the mating projections 106 and the mating notches 100, but this rotation limiting mechanism is not an essential element of the present invention. Specifically, where friction between the sliding projection and the cam face is sufficient to prevent rotation of the valve member 116, such as where the valve member has sufficient mass for example, the rotation limiting mechanism can be dispensed with.

Furthermore, while the rotation limiting mechanism in the first and second embodiments was composed of mating projections 106 provided to the valve member 102, 116 and mating notches 100 provided to the retainer tube portion 98, it would be acceptable to instead provide the movable valve body with mating notches that open onto the lower end and peripheral side wall, and to provide the retainer tube portion with mating projections that project peripherally inward, with the rotation limiting mechanism being constituted by intermeshing of these mating notches and mating projections. Additionally, while the rotation limiting mechanism in the first and second embodiments was formed on the outside peripheral side of the valve stem of either of the valve members 102, 116, it would also be acceptable for the rotation limiting mechanism to be constituted by designing the retainer tube portion to be slipped inside the valve stem of a valve member of hollow construction, and to form between the outside peripheral face of the retainer tube portion and the inside peripheral face of the valve stem a locking mechanism composed of mating projections and mating notches. Where the rotation limiting mechanism is formed to the outside peripheral side of the valve stem of either of the valve members 102, 116 as taught in the preceding the first and second embodiments, the valve stem of the valve member 102, 116 may be of solid construction. Where the rotation limiting mechanism is formed to the inside peripheral side of the valve stem a valve member 102, 116 adapted to a retainer tube portion being slipped inside, the retainer tube portion may be of solid rod shape.

In the preceding first and second embodiments, the cam slot 108 and the cam face 118 are constituted with a pair of upper end retainer portions 109 situated in opposition in the diametrical direction, and a pair of lower end retainer portions 110 situated in opposition in the diametrical direction along an axis orthogonal to the direction of opposition of the upper end retainer portions 109. The rotating shaft 86 of the electric motor 84 is controlled so as to rotate in 90° increments in order to bring about up and down displacement of the valve member 102, 116. However, this cam slot 108 and cam face 118 are merely one example of the cam face in the present invention, and the specific shape etc. of the cam face should not be construed as limited to the constructions taught in the above embodiments.

For example, a cam face could be constituted by forming two pairs of upper end retainer portions that extend in the axial-perpendicular direction and that are situated in opposition along different respective diametrical axes, and two pairs of lower end retainer portions that are situated in opposition along diametrical axes different from the axes of opposition of the upper end retainer portions, these portions being spaced apart in the circumferential direction with the upper end retainer portions and the lower end retainer portions situated adjacently in the circumferential direction, and with adjacently situated upper end retainer portions and lower end retainer portions being linked by sloping guide portions. Up and down displacement of the valve member may then be brought about through rotation of the drive shaft of the electric motor in 45° increments. That is, no particular limitation is imposed as to the extent of rotation of the rotating shaft 86 under the control of the control unit 92. The shape of the cam face may be determined appropriately with reference to the extent of rotation of the rotating shaft 86 etc.

Figure 7:
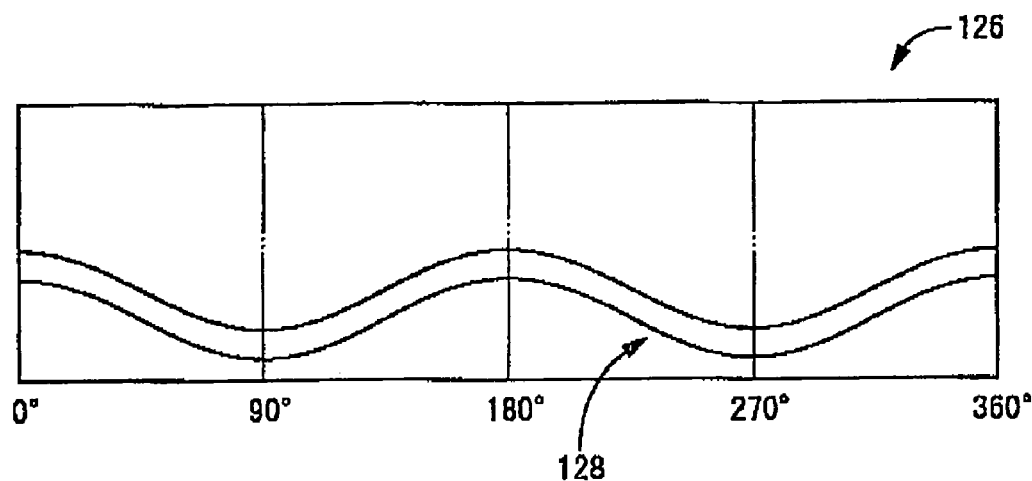
FIG. 7 is an exploded view of an inner surface of a peripheral wall portion of the valve member of the engine mount of FIG. 5.

Furthermore, while it will be preferable to form retainer portions as taught in the preceding first and second embodiments in order to effectively achieve retention of the movable valve body in a state of displacement, the retainer portions are not an essential element herein. Specifically, as shown for example by the development view of the peripheral wall of a valve member 126 constituting the movable valve body depicted in FIG. 7, the cam slot 128 may have sine wave contours that curve throughout, inclusive of the upper and lower ends of the cam slot 128. The cam slot 128 may be of either single-cycle sine wave shape or two or more cycles.

Figure 8:
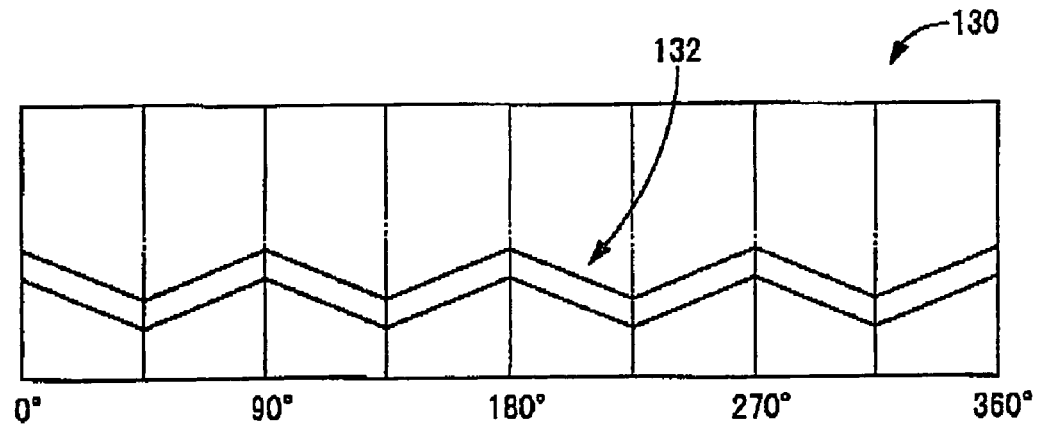
FIG. 8 is an exploded view of an inner surface of a peripheral wall portion of another valve member employed in the present engine mount.

Alternatively, as shown for example in the development view of the peripheral wall of a valve member 130 constituting the movable valve body depicted in FIG. 8, it would be possible to employ a cam slot 132 defined by a continuous series of connecting sloping faces that extend in straight lines. In this case, the sloping faces will connect at the upper and lower ends of the cam slot 132, and as depicted in FIG. 8, sloping faces connecting with one another will be situated to either side in the circumferential direction (i.e. to left and right in FIG. 8) of lines that extend in the axial direction and pass though apical sections of the cam slot 132 (shown by double-dot and dash lines in FIG. 8). Any number of apical sections (upper and lower ends) of the cam slot 132 may be formed.

The cam mechanism that was shown in the first and second embodiments hereinabove is merely exemplary, and any number of other known cam mechanisms (mechanisms for converting rotational movement of a cam and a follower to linear movement) could be employed. Specific structures of cam mechanisms are described below by way of example. The cam mechanism should not be construed as limited to the embodiments and the following examples however.

One specific example is a plate cam wherein a flat plate that rotates about the drive shaft is attached to the drive shaft of the electric motor, with the distance between the drive shaft and the outside peripheral face of the flat plate varying in the circumferential direction so that a cam face is defined by the outside peripheral face of the flat plate. A sliding portion provided to the movable valve body is positioned in contact against the outside peripheral face of the flat plate so as to slide thereagainst in order to bring about reciprocating operation of the movable valve body in a direction approximately orthogonal to the drive shaft.

Another example is a sloping cam wherein a sloping plate is attached at a prescribed slope angle to the drive shaft of the electric motor and is rotated through the rotational actuating force of the electric motor transmitted to it. A sliding portion that has been provided to the movable valve body is positioned in contact against one face of the sloping plate so that the movable valve body will undergo reciprocating operation in the axial direction of the drive shaft, in association with rotation of the sloping plate which is positioned at an incline with respect to the drive shaft.

It is not always necessary for the cam face to be disposed on the movable valve body side. Specifically, it would be possible, for example, to produce a cam portion of round post shape or round tube shape in the distal end section of the drive shaft, and to form a cam face of specific shape on the distal end face of the cam portion or to form a cam slot on the outside peripheral face of the cam portion in order to provide a cam face on the drive shaft side. Furthermore, where the cam face is provided on the drive shaft side, the sliding portion could be provided on the movable valve body side. Specifically, a cam mechanism could be produced by providing at one end of the movable valve body in the direction of reciprocating operation a sliding portion such as a pin that extends orthogonal to the direction of reciprocating operation; and then positioning the sliding portion in sliding contact against the cam face or cam slot that was formed on the cam portion. Furthermore, it would be acceptable to form a cam face of specific shape on the distal end face of the drive shaft, and to then form on the movable valve body, on the face thereof that will contact the drive shaft, a cam face that will mate with the cam face of the drive shaft at a specific rotation angle. Where the cam face and the sliding portion are formed on the entirety of the contact face of the drive shaft and the movable valve body in this way, durability of the ca mechanism can be improved.

In the first and second embodiments, the electric motor 84 was constructed such that the rotating shaft 86 undergoes actuated rotation in one direction only. A control unit 92 composed of a mechanical contact control unit etc. was provided, with the control unit 92 controlling supply of current to the electric motor 84 to bring about reciprocating operation of the valve member 102, 116. However, a servo motor or a step motor (an electric motor controlled so as to rotate the drive in prescribed rotation angle increments) could also be employed as the electric motor. Where a servo motor is used, since the extent of rotation of the electric motor, and hence the actuation position of the movable valve body, can be controlled by pulses from an external control device without the need for a mechanical contact control unit, it will be possible to make the control unit smaller.

In the second embodiment in particular, the cam face 118 and the pin 90 are maintained in a state of contact through the action of gravity on the valve member 116. However the cam face and the sliding portion could advantageously be maintained in a state of contact by providing urging member for actively urging the cam face and the sliding portion towards the direction of contact.

As a specific example, a compressed coil spring could be interposed between the opposing faces of the partition member 42 and the center contact portion 34, with the repulsion force of the compressed coil spring urging the valve member 116 downward, which is the direction further away from the partition member 42, so that the cam face 118 and the pin 90 are held in a state of stable contact. As an alternative example, a tensioned coil spring could be installed between the electric motor 84 and the valve member 116, with the valve member 116 being urged towards the electric motor 84 through the elastic force of the tensioned coil spring, thereby pressing the cam face 118 against the pin 90 so that the cam face 118 and the pin 90 are held in a state of stable contact.

Figure 9:
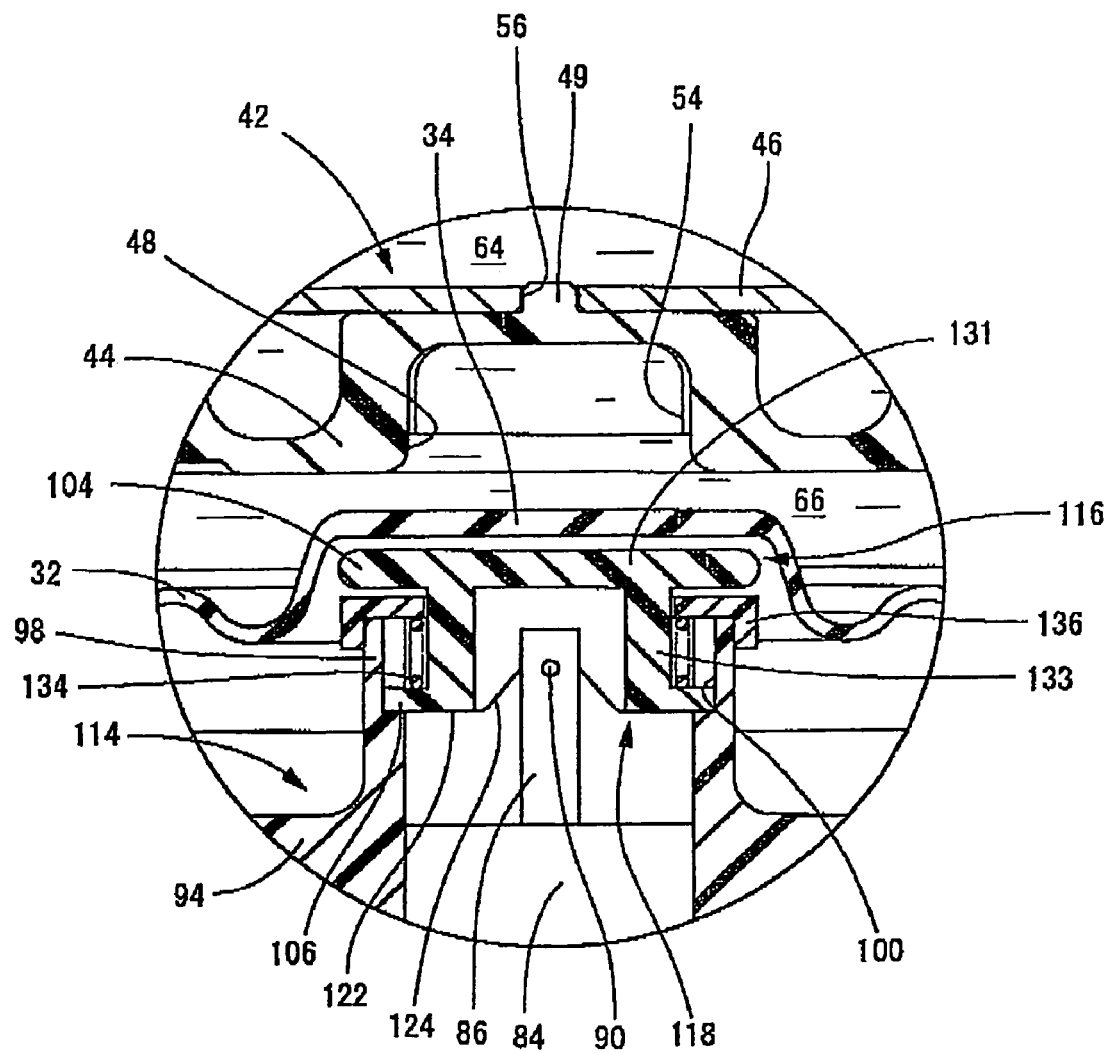
FIG. 9 is an enlarged fragmental view of an engine mount according to a third embodiment of the present invention.

A third embodiment of the present invention is depicted in FIG. 9 as yet another specific example employing such urging member. The valve member 116 of this embodiment has a valve head 131 of round disk shape and a valve stem 133 of round tubular shape. A compressed coil spring 134 serving as the urging member is slipped onto the outside peripheral face of the valve stem 133, with the coil spring 134 being arranged between the axially opposing faces of the valve head 131 and the mating projections 106. Since the coil spring 134 is capable of expanding in diameter through elastic deformation, it will be possible to pass it over the mating projections 106 and install it fitting about the outside of the valve stem 133. The outside diameter dimension of the coil spring 134 is smaller than the inside diameter dimension of the retainer tube portion 98 of the support member 94, and with the valve stem 133 assembled through insertion into the retainer tube portion 98, the coil spring 134 will be arranged accommodated within the retainer tube portion 98 and between the diametrically opposing faces of the valve stem 133 and the retainer tube portion 98.

Additionally, a spring retainer member 136 of annular collar structure is affixed covering the distal end opening of the retainer tube portion 98 of the support member 94. This spring retainer member 136 is affixed at its outside peripheral edge to the retainer tube portion 98 through welding etc., and its inside peripheral section projects diametrically inward with a flanged contour at the opening of the retainer tube portion 98. The inside diameter dimension of the spring retainer member 136 is slightly larger than the outside diameter dimension of the valve stem 133 of the valve member 116, thus allowing axial displacement of the valve member 116.

With the valve member 116 in the assembled state, the coil spring 134 will be positioned with one axial end thereof (the lower end in FIG. 9) abutting the mating projections 106, and with the other end retained in abutment by the spring retainer member 136 which has been fastened like a cap fitting onto the outside of the projecting distal end of the retainer tube portion 98. The coil spring 134 is thereby retained in a compressed state between the flanged portion of the spring retainer member 136 and the mating projections 106 of the valve member 116, and as a result the valve member 116 will be urged towards the electric motor 84 end by the elastic force of the coil spring 134, pushing the cam face 118 of the valve member 116 against the pin 90. The cam face 118 and the pin 90 will thus held in state of more stable abutment, improving the responsiveness of the opening and closing operation of the valve member 116 to rotation control of the electric motor 84.

In this embodiment, the coil spring 134 is retained in a compressed state by the spring retainer member 136 which is separately attached to the retainer tube portion 98. However, instead of using a separate member, a retainer portion of the coil spring 134 could be integrally formed with the retainer tube portion 98.

The engine mounts 10, 112 etc. shown in the preceding embodiments are merely specific examples of the fluid filled vibration damping device according to the present invention, and the scope of the invention should not be construed as limited in any way by the specific constructions of the engine mounts 10, 112 etc. shown in these embodiments. For example, the present invention would also be applicable not only to fluid filled vibration damping devices of "bowl" design like those shown by way of example in the preceding embodiments, but also to fluid filled vibration damping devices of "tube" design having a structure whereby an inner shaft member and an outer tubular member are linked to one another by a main rubber elastic body, and having a number of fluid chambers spaced apart in the circumferential direction.

Figure 10:
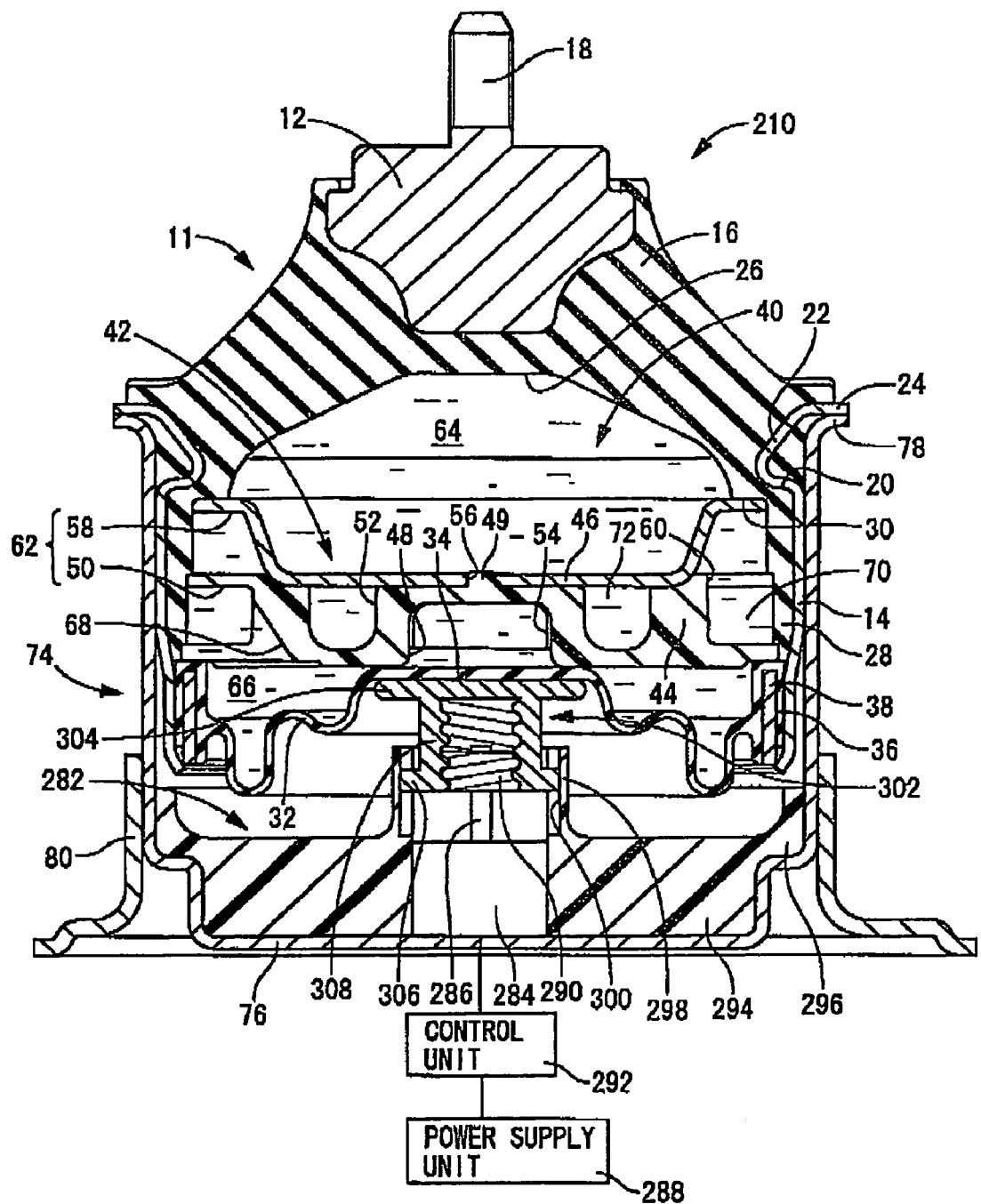
FIG. 10 is a vertical cross sectional view of an automotive engine mount according to a fourth embodiment of the present invention.
Figure 11:
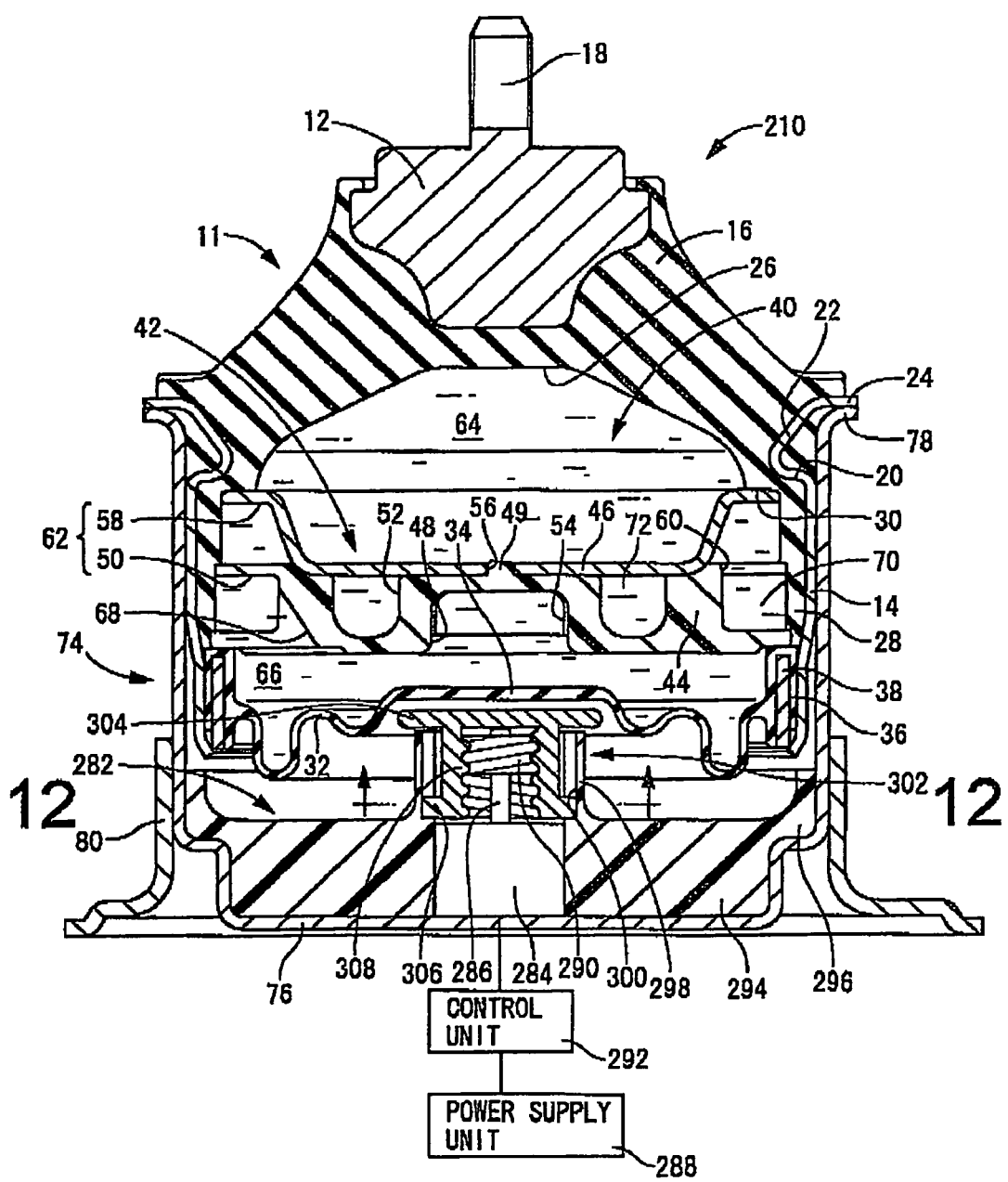
FIG. 11 is a cross sectional view of the engine mount of FIG. 10 where the second orifice passage is in an open state.
Figure 12:
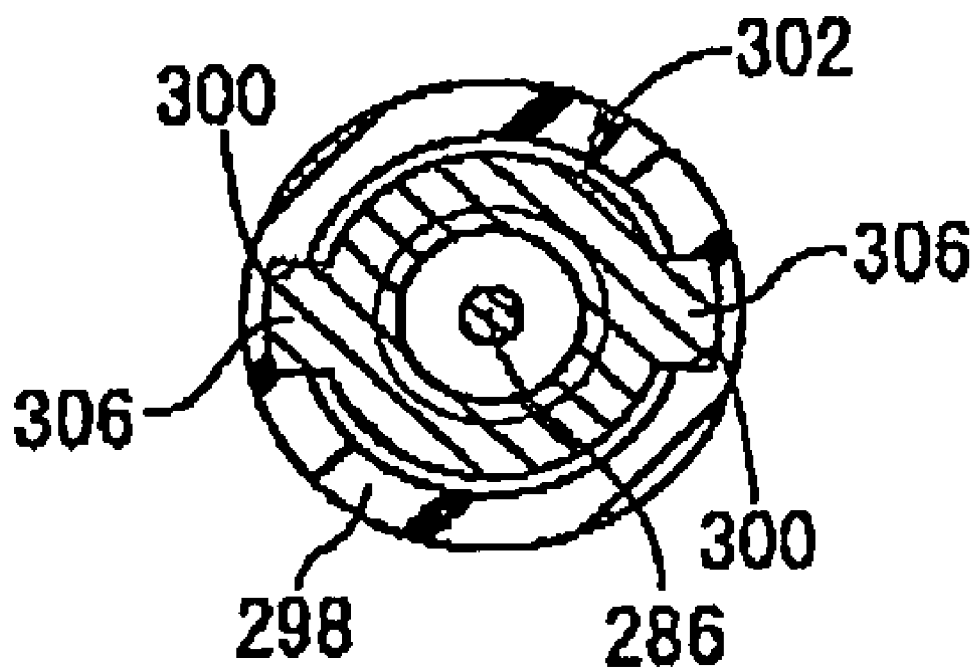
FIG. 12 is a cross sectional view taken along line 12-12 of FIG. 11.

Referring next to FIGS. 10-12, there is depicted an automotive engine mount 210 according to a fourth embodiment of the present invention. This engine mount 210 includes an actuator 282. In the following explanation, the same reference numerals as used in the previously illustrated embodiment are used for identifying structurally and functionally corresponding elements, to facilitate understanding of the instant embodiment, and the redundant explanation for those elements is eliminated.

The electric motor 284 is an electric motor of known type having a rotating shaft 286 as its drive shaft. By virtue of electrical current supplied by an externally provided power supply unit 288, rotational force will act on the rotating shaft 286 causing the rotating shaft 286 to undergo actuated rotation about the center axis. In this embodiment in particular, the rotating shaft 286 will undergo actuated rotation in one direction through supply of the current to the electric motor 284. Any of various motors (electric motors) of known type, such as a separately-excited DC electric motor, can be employed as the electric motor 284.

The rotating shaft 286 of the electric motor 284 is provided with a male threaded member 290 that functions as a screw portion. The male threaded member 290 is a generally cylindrical member formed with threads on its outer peripheral face. The rotating shaft 286 is inserted to the male threaded member 290 so as to extend coaxially and affixed to the male treaded member 290. Thus, the male threaded member 290 rotates along with the rotation of the rotating shaft 286.

A control unit 292 is situated on the circuit that electrically connects the electric motor 284 with the power supply unit 288. The control unit 292 includes, for example, a sensor for detecting driving conditions of the automobile (e.g. a speed sensor of known type), and mechanical contact control unit that in response to results of detection by the sensor will switch the electric current to the electric motor 284 on and off in order to control starting and stopping of rotation of the rotating shaft 286. This control unit 292 controls the rotating shaft 286 so as to rotate in 90° increments. The control unit 292 that switches the electric current to the electric motor 284 on and off can be selected from known devices to date, so no description is required here.

The electric motor 284 is mounted onto a support member 294. The support member 294 has a thick annular shape, and in this embodiment is made of hard synthetic resin. An abutting portion 296 that flares out towards the outside peripheral side is provided at the upper end of the support member 294, and the outside peripheral edge of the abutting portion 296 projects upward.

Additionally, a retainer tube portion 298 is formed on the inside peripheral edge of the support member 294. The retainer tube portion 298 is of generally round tube shape and extends out upward from the inside peripheral edge of the support member 294. The retainer tube portion 298, in sections thereof situated in opposition along an axis in the diametrical direction, also has a pair of mating notches 300, 300 that open onto the inside peripheral side and the upper end face. The mating notch 300 is of groove form extending for predetermined length in the axial direction, and in this embodiment, its side faces in the circumferential direction extend parallel to one another.

The electric motor 284 is secured fitting within the center hole of the support member 294 in such a way that the rotating shaft 286 of the electric motor 284 extends coincident with the center line of the center hole of the support member 294. The rotating shaft 286 is thereby positioned a distance away from the inside peripheral side of the retainer tube portion 298.

The distal end section of the rotating shaft 286 is capped by a valve member 302 constituting the movable valve body. The valve member 302 has an inverted, generally bottom round tubular shape composed of a round disk shaped valve head and a downwardly projecting valve stem portion of tubular shape. In this embodiment, it is made of hard resin with a view to achieving lighter weight. A pusher flange portion 304 that flares towards the outside peripheral side is integrally formed at the upper end of the valve member 302. The pusher flange portion 304 in this embodiment is chamfered to give its outside peripheral edge a generally semispherical appearance in longitudinal cross section.

At the lower end of the valve member 302 there is formed a pair of mating projections 306, 306 that project towards the outside peripheral side from sections situated in opposition along an axis in the diametrical direction. The mating projection 306 is a projection of generally block shape whose end faces in the circumferential direction extend parallel to one another. The circumferential width dimension of the mating projections 306 is approximately equal to the circumferential width dimension of the mating notches 300 that were formed in the retainer tube portion 298, while the axial width dimension of the mating projections 306 is sufficiently smaller than the axial width dimension of the mating notches 300.

Here, the valve member 302 is furnished with a female thread portion 308 as the threadable contact portion. The female thread portion 308 is formed utilizing the peripheral wall of the valve member 302, which has an inverted, generally bottomed round tube shape with a screw thread formed over the entirely of its inside peripheral face. The screw thread constituting the female thread portion 308 has a structure that corresponds to the screw thread formed on the outside peripheral face of the male thread portion 290 that has been attached to the rotating shaft 286.

The valve member 302 having the female thread portion 308 will be attached to the rotating shaft 286 of the electric motor 284. Specifically, the valve member 302 will be positioned covering the rotating shaft 286 from above, with the peripheral wall of the valve member 302 encircling the rotating shaft 286 a distance away to the outside peripheral side of the rotating shaft 286. In this embodiment, the rotating shaft 286 of the electric motor 284 is disposed so as to extend in the direction of reciprocating operation of the valve member 302, discussed later.

The male thread portion 290 that has been attached to the rotating shaft 286 is inserted to the inside peripheral side of the peripheral wall of the valve member 302, and the screw thread formed on the outside peripheral face of the male thread member 290 engages with the screw thread formed on the female thread portion 308. In other words, the male thread member 290' that has been attached to the rotating shaft 286 is threaded into the female thread portion 308 of the valve member 302 from its bottom opening. The valve member 302 is thereby attached to the rotating shaft 286, and in the linking sections of the rotating shaft 286 and the valve member 302 there is provided a screw mechanism composed of the male thread member 290 and the female thread portion 308.

The valve member 302 is then inserted into the retainer tube portion 298 by positioning the rotating shaft 286 of the electric motor 284 to the inside peripheral side of the retainer tube portion 298. As depicted in FIG. 12, the mating projections 306 that have been integrally formed at the lower end of the valve member 302 are aligned in the circumferential direction with the mating notches 300 that have been formed in the retainer tube portion 298, and the mating projections 306 are fitted into the mating notches 300. Through the intermeshing action of the mating projections 306 and the mating notches 300 in the circumferential direction, the valve member 302 will be detained in the circumferential direction with respect to the retainer tube portion 298, making relative rotation impossible. The rotation restricting mechanism of the valve member 302 in this embodiment is realized on the basis of this engagement between the valve member 302 and the retainer tube portion 298.

Thus, rotational actuating force generated by the energized electric motor 284 will be converted by the screw structure that is composed of the male thread member 290 and the female thread portion 368 to reciprocating actuating force for transmission to the valve member 302. That is, in this embodiment, the screw structure serves as an actuating force converter mechanism. By controlling the direction of rotation of the rotating shaft 286 of the electric motor 284, the valve member 302 can undergo actuated displacement to a prescribed location in the axial direction. Reciprocating operation of the valve member 302 in the axial direction will be discussed below.

First, where the male thread member 290 that has been installed on the rotating shaft 286 of the electric motor 284 is positioned at the lower end of the female thread portion 308 formed in the valve member 302, i.e. at the lower end opening in the peripheral wall of the valve member 302, the valve member 302 will be positioned at the upper end in the actuation direction. Even with the valve member 302 positioned at the upper end in the actuation direction in this way, the mating projections 306 will be positioned within the mating notches 300, and intermeshing action will be produced thereby.

Next, when the electric motor 284 is supplied with current from the power supply unit 288 causing the rotating shaft 286 to rotate to one side in the circumferential direction, the male thread member 290 will undergo relative rotation with respect to the female thread portion 308 and the male thread member 290 will screw into the female thread portion 308. Thus, the valve member 302 in which the female thread portion 308 has been formed will experience relative displacement downward in the axial direction with respect to the rotating shaft 286 to which the male thread member 290 has been attached, and hence with respect to the electric motor 284; and will be moved to the lower end in the direction of reciprocating operation. In this embodiment, when the valve member 302 undergoes actuated displacement in the axial direction to become positioned at the end in the direction of operation, supply of current to the electric motor 284 will halt so that the valve member 302 will be retained in a stationary state at the end in the actuation direction.

In this embodiment in particular, since engagement of the mating projections 306 with the mating notches 300 prevents the valve member 302 from rotating, actuated displacement of the valve member 302 in the axial direction can be brought about efficiently while preventing the valve member 302 from rotating through transmission of rotational actuating force of the rotating shaft 286 through friction etc. between the male thread member 290 and the female thread portion 308.

Next, when under the control of the control unit 292 the electric motor 284 is supplied with current from the power supply unit 88, causing the rotating shaft 286 to rotate in reverse in the circumferential direction, the male thread member 290 will undergo relative rotation with respect to the female thread portion 308, causing the male thread member 290 to turn in the unscrewing direction with respect to the female thread portion 308. Thus, the valve member 302 in which the female thread portion 308 has been formed will experience relative displacement upward in the axial direction with respect to the rotating shaft 286 to which the male thread member 290 has been attached, and hence with respect to the electric motor 284; and will be moved to the upper end in the direction of reciprocating operation. In this embodiment, the rotating shaft 286 is designed to rotate in reverse when the electric motor 284 is energized in reverse. Once the valve member 302 has been moved to the upper end in the direction of operation, supply of current to the electric motor 284 will halt so that the valve member 302 will be retained in a stationary state at the end in the direction of reciprocating operation.

In this way, rotational actuating force produced by the electric motor 284 will be converted into linear actuating force in the axial direction by the screw mechanism that has been disposed in the linking sections of the rotating shaft 286 and the valve member 302, and will then be transmitted to the valve member 302. Through switching control of the direction of energization to the electric motor 284, the valve member 302 will undergo reciprocating operation up and down in the axial direction. Then, when the valve member 302 is positioned at an end in the direction of reciprocating operation, supply of current to the electric motor 284 will halt so that the reciprocating valve member 302 is retained in a stationary state at that end in the axial direction.

The actuator 282 constructed in the above manner will be fitted into the sleeve portion 76 of the bracket fitting 74 and secured resting on the base wall of the sleeve portion 76. Once thusly installed in the bracket fitting 74, the mount main body 11 will be attached to the bracket fitting 74 to make the engine mount 210 according to this embodiment.

In the engine mount 210, the actuator 282 will be positioned below the mount main body 11, and the valve member 302 will be positioned below the center contact portion 34 of the diaphragm 32, either spaced apart from it by a prescribed distance in the axial direction, or juxtaposed against it in a state of contact.

In other words, the actuator 282 will be situated to the opposite side of the diaphragm 32 from the partition member 42. To either side of the center contact portion 34 of the diaphragm 32, the valve member 302 of the actuator 282 will be situated in opposition to the center recess 48 which is the opening of the second orifice passage 72 on the equilibrium chamber 66 side.

Through actuated displacement in the axial direction, the valve member 302 will be urged into contact with or away from the center contact portion 34 of the diaphragm 32, and the center contact portion 34 will undergo up and down displacement according to the reciprocating operation of the valve member 302 in the axial direction. Thus, the valve member 302 will urge the center contact portion 34 of the diaphragm 32 relatively closer to or away from the center recess 48 of the partition member 42.

Specifically, when the valve member 302 is positioned at the lower end in the direction of reciprocating operation, the valve member 302 will urge the center contact portion 34 of the diaphragm 32 downward, whereupon the center contact portion 34 will be positioned below and away from the partition member 42, opening up the center recess 48 into the equilibrium chamber 66.

On the other hand, when the valve member 302 is positioned at the upper end in the direction of reciprocating operation, the center contact portion 34 will be pushed by the valve member 302 and pressed against the lower face of the partition member 42 so that the opening of the center recess 48 becomes blocked off by the valve member 102 via the center contact portion 34.

Through control of reciprocating operation of the valve member 302 as described above, the opening of the center recess 48 (which is the opening of the second orifice passage 72 on the equilibrium chamber 66 side) can be switched between the communicating state and the blocked state, and the second orifice passage 72 can accordingly be switched between the communicating state and the blocked state. As will be apparent from FIG. 11 as well, in this embodiment, the valve member 302 and the diaphragm 32 are separable from one another in an unattached state.

The automotive engine mount 210 constructed as above will be installed by attaching the first mounting member 12 of the mount main body 11 to the power unit (not shown) with mounting bolts 18, and attaching the second mounting member 14 to the car body (not shown) via the bracket fitting 74.

By so doing, the engine mount 210 will be installed interposed between the power unit and the car body to provide vibration-damped support of the power unit on the car body.

With the automotive engine mount 210 constructed as above installed in an automobile, when engine shake or other vibration in the low-frequency range that can be a problem during driving is input, relatively large pressure fluctuations will be produced in the pressure receiving chamber 64. Due to a relative pressure fluctuation differential arising between the pressure receiving chamber 64 and the equilibrium chamber 66, a sufficient flow of fluid through the first orifice passage 70 will be effectively assured, and effective vibration damping action (high attenuating action) against engine shake and other vibration in a low frequency range will be produced based on flow action, e.g. the resonance action, of the fluid.

At this time, as depicted in FIG. 10 the valve member 302 will be positioned at the upper end of the direction of reciprocating operation and will be pressed against the opening of the second orifice passage 72 on the equilibrium chamber 66 side via the center contact portion 34 of the diaphragm 32. The opening of the second orifice passage 72 on the equilibrium chamber 66 side will thereby be blocked off fluidtightly, and the second orifice passage 72 will assumed the blocked state. Consequently, the fluid will be prevented from flowing between the pressure receiving chamber 64 and the equilibrium chamber 66 through the second orifice passage 72 so that liquid pressure inside the pressure receiving chamber 64 will not escape to the equilibrium chamber 66. Thus, fluid flow through the first orifice passage 70 can be produced efficiently, and vibration damping action based on flow action of the fluid can be effectively achieved.

Input of vibration in the medium- to high-frequency range (for example idling vibration that can be a problem with the car at a stop, or low-speed rumble which can be a problem during driving) will give rise to small-amplitude pressure fluctuations in the pressure receiving chamber 64. At times of input of such vibration, rotation of the rotating shaft 286 will be actuated through control of current to the electric motor 284, to actuate displacement of the valve member 302 to the lower end in the axial direction, as depicted in FIG. 11.

With this arrangement, the opening of the second orifice passage 72 on the equilibrium chamber 66 side can be switched to the communicating state so that the pressure receiving chamber 64 and the equilibrium chamber 66 communicate with one another through the second orifice passage 72. Due to a relative pressure fluctuation differential arising between the pressure receiving chamber 64 and the equilibrium chamber 66, a sufficient flow of fluid through the second orifice passage 72 can be effectively assured, and effective vibration damping action (low dynamic spring effect) against vibration in a medium to high frequency range such as vibration during idling will be produced based on flow action, e.g. the resonance action, of the fluid.

That is, in the fluid filled vibration damping device according to this embodiment, the second orifice passage 72 is adapted to be controlled between communicating and blocked states through reciprocating operation of the valve member 302 in order to switch the vibration damping characteristics. In FIGS. 10 and 11 in order to facilitate understanding, the stroke of the reciprocating operation of the valve member 302 is depicted in exaggerated form. In association therewith, the shape of the male thread member 290, e.g., the slope angle, size and so on of the thread portions 290, 308 are also depicted in exaggerated form.

In the automotive engine mount 210 according to this embodiment, by providing a control unit 292 that controls energization status to the electric motor 284, as well as employing the screw mechanism that converts rotational actuating force of the rotating shaft 286 to axial actuating force of the valve member 302 in the linking sections of the valve member 302 and the rotating shaft 286, actuated displacement of the valve member 302 may be induced towards both sides in the axial direction through the agency of an ordinary electric motor 284 whose rotating shaft 286 rotates only one way in the circumferential direction. Consequently, actuated displacement of the valve member 302 up and down in the axial direction can be brought about, and switching control of the vibration damping characteristics can be accomplished, with an electric motor 284 of relatively simple structure.

With the electric motor 284 in the non-energized state, the valve member 302 will be retained in a non-operating state positioned in the direction of reciprocating operation, through frictional force, engagement of the screw threads, etc. between the male thread member 290 and the female thread portion 308. Through the retaining action provided by such engagement, friction etc. between the thread portions 290, 308, the valve member 302 can be retained at a desired axial position even with the electric motor 284 in the non-energized state, and the switched vibration damping characteristics can be consistently maintained.

Since this structure is such that effective retention force in the absence of energization can be easily achieved particularly where the valve member 302 has been positioned at the upper end of the direction of reciprocating operation, the second orifice passage 72 can be reliably maintained in a substantially blocked off state, and the objective vibration damping characteristics can be attained at times of input of low-frequency vibration corresponding to engine shake etc.

Moreover, in the engine mount 210 constructed such that friction, engagement etc. between the thread portions 290, 308 is utilized to exert retention force on the valve member 302, as compared to the case where the second orifice passage 72 is maintained in the blocked state by maintaining a continuous state of energization, even if the valve member 302 is acted upon by pressure within the pressure receiving chamber 64 through the second orifice passage 72 the valve member 302 will be maintained more stably in the objective switched state in opposition to this pressure so that the second orifice passage 72 can be more reliably kept in the substantially blocked state.

Furthermore, since retention force can be exerted on the valve member 302 without the need to energize the electric motor 284, the power consumed when maintaining switched vibration damping characteristics can be reduced, the heat emission occurring when maintaining a continuous state of energization can be reduced, and heat-induced decline in durability can be prevented.

Since the valve member 302 is attached to the rotating shaft 286 by threading the male thread member 290 that has been fastened to the rotating shaft 286 into the female thread portion 308 that has been formed utilizing the center hole of the valve member 302, relative tilting between or detachment of the valve member 302 and the rotating shaft 286 can be prevented. Consequently, stable operation of the valve member 302, can be attained, and the vibration damping characteristics can be switched with consistently high accuracy.

Moreover, as compared with the case where, for example, the stroke of the valve member 302 in the actuation direction is controlled using a linear motor or the like, variability in the extent of actuated displacement of the valve member 302 in relation to fluctuations in voltage supplied to the electric motor 284 can be kept to a minimum, so that switching of vibration damping characteristics can take with higher accuracy.

Furthermore, in this embodiment, the pusher flange portion 304 that flares towards the outside peripheral side is integrally formed at the upper end of the valve member 302. This will assure ample surface area of the upper end face of the valve member 302 so that pressure per unit of surface area exerted on the center contact portion 34 of the diaphragm 32 can be kept to a minimum. Moreover, because the outside peripheral face of the pusher flange portion 304 is defined by a curving face of arcuate shape, when pushing force is exerted on the diaphragm 32 by the valve member 302, localized concentration of pushing force can be avoided and durability of the diaphragm 32 can be improved.

Figure 13:
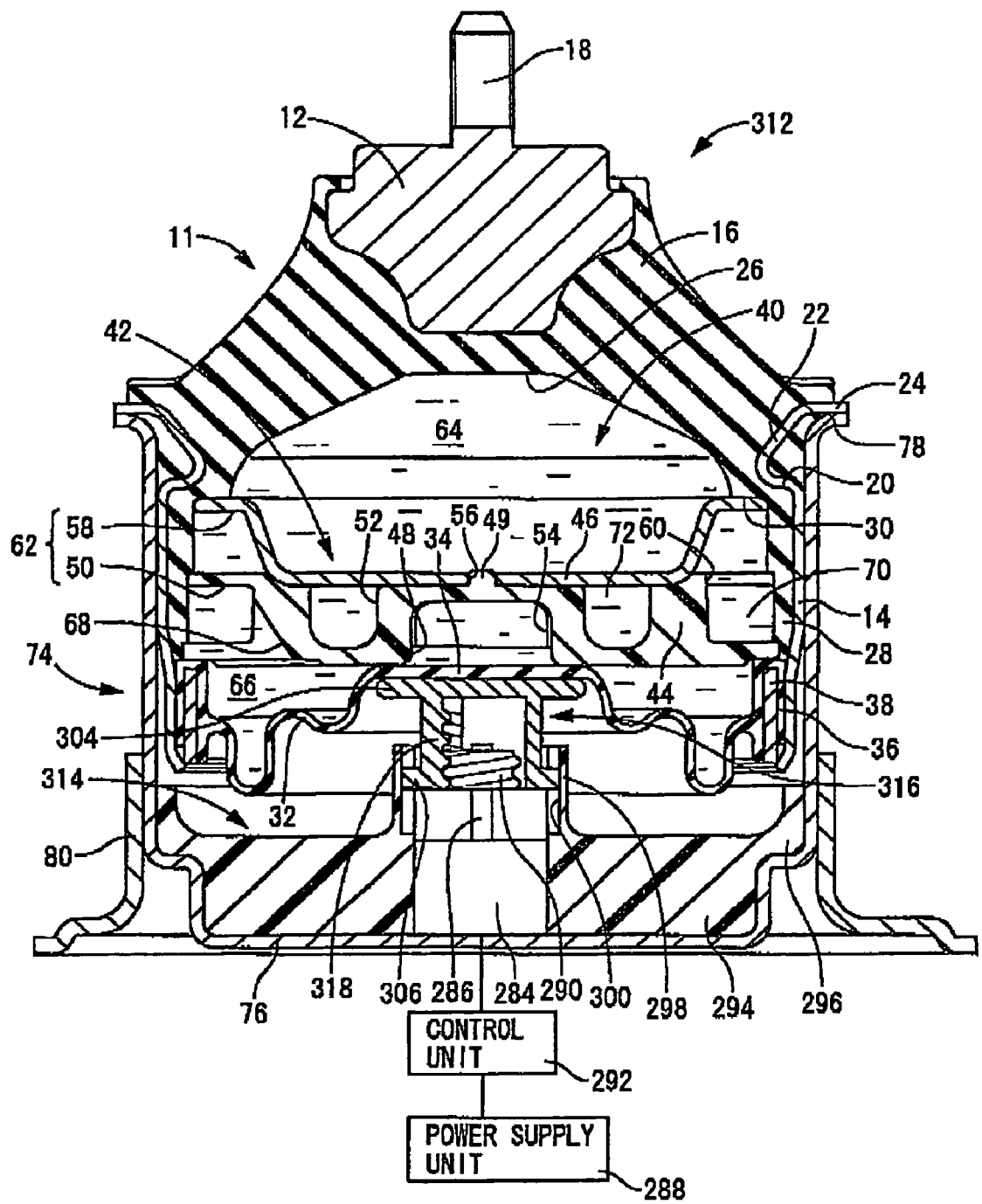
FIG. 13 is a vertical cross sectional view of an automotive engine mount according to a fifth embodiment of the present invention.

Next, an automotive engine mount 312 according to a fifth embodiment of the present invention is depicted in FIG. 13. This engine mount 312 is furnished with an actuator 314. In the following description, elements that are substantially the same as those in the preceding first embodiment will be assigned like symbols in the drawing, and will not be discussed in detail.

To describe in more detail, the actuator 314 is further provided with a valve member 316 constituting the movable valve body. This valve member 316 has an inverted, generally bottomed round tube shape overall. The peripheral wall of the valve member 316 has small inside diameter in part of its circumference, with a screw thread formed on the inside peripheral face of this small diameter section, thus defining a gear portion 318 which serves as the threadable contact portion.

Meanwhile, the male thread member 290 is fastened to the rotating shaft 286 of the electric motor 284. The screw thread of the male thread member 290 is of construction corresponding to the screw thread of the gear portion 318 that has been formed on the valve member 316. The outside diameter of the male thread member 290 is approximately equal to the inside diameter of the gear portion 318, but smaller than the inside diameter of the section of the valve member 316 situated away from the gear portion 318.

The valve member 316 of this embodiment having the above construction will be attached to the rotating shaft 286. Specifically, the valve member 316 will be disposed over the rotating shaft 286 from axially above, and the male thread member 290 that has been fastened to the rotating shaft 286 will be inserted into the center hole of the valve member 316, as well as being screwed into the gear portion 318 formed on the valve member 316. By so doing, a worm gear structure composed of the male thread member 290 and the gear portion 318 is provided in the linking sections of the rotating shaft 86 and the valve member 316. That is, in this embodiment, the worm gear structure serves as an actuating force converter mechanism.

The worm gear structure herein refers to a structure including a worm (the male thread member 290) that is attached to the rotating shaft 286 subjected to rotational actuating force, and that has a helical screw thread formed on the outside peripheral face, and a threadable contact portion (the gear portion 318) that comes into contact in a portion of its circumference against the worm and that has a screw thread adapted to mesh with the worm at the contact location; whereby the threadable contact portion experiences linear actuation through rotation of the worm. The specific construction of the threadable contact portion is not limited in any way and the valve member 316 in this embodiment is merely one example thereof. The worm gear structure may be constructed in other ways as well, for example, by providing the movable valve body with a flat plate section that extends in the axial-perpendicular direction, positioning the flat plate section in abutment against the center contact portion 34 of the diaphragm 32, and providing a planar gear portion that extends downward from the flat plate section, with a screw thread formed on the gear portion adapted to mesh with the screw thread of the worm.

Then, when the rotating shaft 286 is rotated through energization of the electric motor 284, linear actuating force will be exerted on the valve member 316 by the worm gear structure which is devised of threadable contact between the male thread member 290 and the gear portion 318, whereby the valve member 316 will undergo up and down reciprocating operation in the axial direction through control of the rotation direction of the rotating shaft 286. The valve member 316 according to this embodiment undergoes up and down actuation comparable to the valve member 302 shown in the first embodiment, and for this reason will not be discussed in detail here.

Like the actuator 282 in the first embodiment, the actuator 314 constructed as shown above will be attached to the bracket fitting 74 and installed below the mount main body 11, with the valve member 316 juxtaposed from below in an unattached state against the center contact portion 34 of the diaphragm 32. The engine mount 312 according to this embodiment is constructed by arranging this actuator 314 at a prescribed location. In this embodiment, as in the first embodiment described earlier, with at least the valve member 316 positioned at the axial lower end, the valve member 316 and the center contact portion 34 will be positioned at a distance. With the actuator 314 arranged in the above manner, the valve member 316, through indirect contact of the valve member 316 with the partition member 42, will be prevented from becoming detached upward in the axial direction.

Thus, like the engine mount 210 according to the first embodiment, in the engine mount 312 constructed according to this embodiment, opening and closing of the opening on the equilibrium chamber 66 side of the second orifice passage 72 will be controlled and vibration damping characteristics will be switched through up and down actuation of the valve member 316. Effective vibration damping effect can thereby be achieved both in the case of low-frequency vibration corresponding to engine shake, and medium- to high-frequency vibration corresponding to idling vibration.

As shown above, a worm gear structure may be provided in place of a screw structure on the transmission path by which the rotational actuating force of the electric motor 284 is transmitted to the valve member 316. Even where such a worm gear structure is employed, as in the first embodiment, it will be possible to effectively achieve both reciprocating operation of the valve member 316 at times of energization, and positioning of the valve member 316 at times of non-energization.

Figure 14:
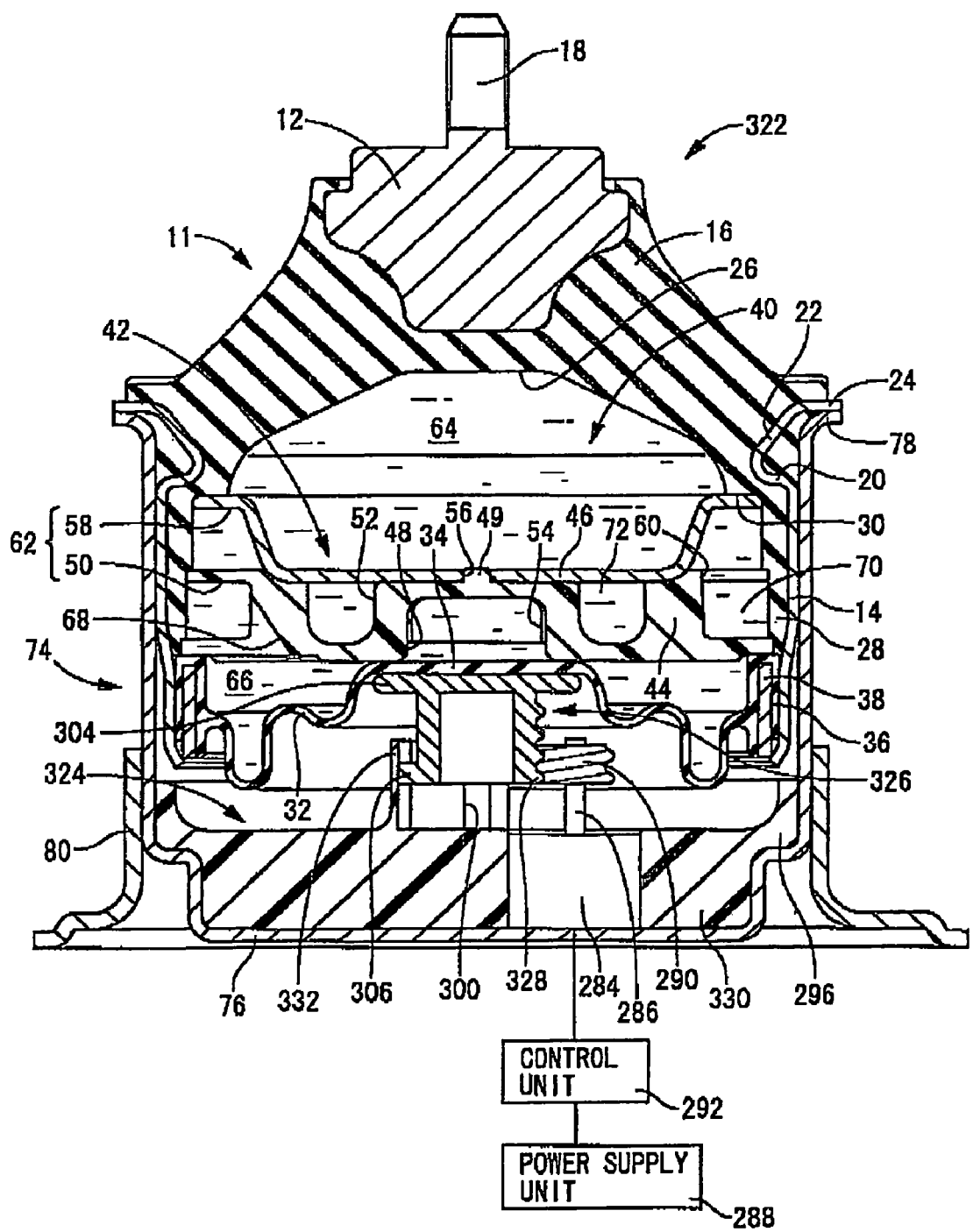
FIG. 14 is a vertical cross sectional view of an automotive engine mount according to a sixth embodiment of the present invention.

An automotive engine mount 322 according to a sixth embodiment of the present invention is depicted in FIG. 14. This engine mount 322 is furnished with an actuator 324. In the following description, elements that are substantially the same as those in the preceding embodiments will be assigned like symbols in the drawing, and will not be discussed at length.

To describe in more detail, the actuator 324 has a valve member 326 constituting the movable valve body. This valve member 326 has an inverted, generally bottomed round tube shape, with a pusher flange portion 304 that flares towards the outside peripheral side integrally formed at the outside peripheral edge of the upper base wall. Mating projections 306 that project diametrically outward are formed at the lower end of the peripheral wall of the valve member 326. In this embodiment, they are formed at three sites along the circumference, at locations spaced apart in the circumferential direction from a gear portion 328 (discussed later).

The valve member 326 has a gear portion 328 serving as the threadable contact portion. The gear portion 328 is defined by part of the peripheral wall of the valve member 326, and has a screw thread formed on its outside peripheral face for a prescribed length in the circumferential direction. In this embodiment, the screw thread is formed over the entire axial length of the peripheral wall of the valve member 326.

Meanwhile, a male thread member 290 is attached to the rotating shaft 286 of the electric motor 284. As in the preceding first embodiment, the male thread member 290 has a generally round tubular shape with a screw thread formed on the outside peripheral face, and a center hole through which the rotating shaft 286 is passed and fastened. The screw thread of the male thread member 290 corresponds to the screw thread formed on the gear portion 328, so that these will intermesh.

The electric motor 284 to whose rotating shaft 286 the male thread member 290 has been attached is fitted into a support member 330. This support member 330 has a circular through-hole extending in the axial direction and situated at a location away from the center. A retainer portion 332 that projects upward from its center section. The retainer portion 332 has a cross section of generally unchanging "C" shape, and extends in a straight line in the axial direction. Mating notches 300 that open onto the inside peripheral face and the upper end face are formed at several locations along the circumference of the retainer portion 332. These mating notches 300 generally correspond in shape to the mating projections 306 that are formed on the valve member 326, and in this embodiment are provided at three locations corresponding to the formation locations of the mating projections 306.

The electric motor 284 is fitted into the through-hole of the support member 330 and positioned with the rotating shaft 286 to which the male thread member 290 has been attached projecting upward. The valve member 326 is inserted to the inside peripheral side of the retainer portion 332, and the mating projections 306 are slipped into the mating notches 300 so that the mating projections 306 and the mating notches 300 engage one another, thereby constituting the rotation limiting mechanism of this embodiment.

Since the screw thread of the gear portion 328 that has been formed on the valve member 326 meshes with the screw thread that has been formed on the male thread member 290, when the electric motor 284 is energized from the outside actuating rotation of the male thread member 290, the valve member 326 having the gear portion 328 will experience actuated, displacement up and down. Since the valve member 326 according to this embodiment undergoes actuation up and down in the same way as the valve member 302, 316 in the first and second embodiment, a detailed discussion will not be provided here.

Like the actuator 282 in the first embodiment, the actuator 324 constructed as shown above will be attached to the bracket fitting 74 and installed below the mount main body 11, with the valve member 326 juxtaposed from below in an unattached state against the center contact portion 34 of the diaphragm 32. The engine mount 322 according to this embodiment is constructed by arranging this actuator 324 at a prescribed location. In this embodiment, as in the first embodiment described earlier, with at least the valve member 326 positioned at the axial lower end, the valve member 326 and the center contact portion 34 will be positioned at a distance. With the actuator 324 arranged in the above manner, through indirect contact of the valve member 326 with the partition member 42 the valve member 326 will be prevented from becoming detached upward in the axial direction.

Thus, in the engine mount 322 according to this embodiment, as in the preceding second embodiment, rotational actuating force of the electric motor 284 can be converted to linear actuating force by the worm gear structure and made to act on the valve member 326. Thus, by switching the second orifice passage 72 between the communicating state and the blocked state, effective vibration damping can be achieved both against low-frequency, large-amplitude vibration corresponding to engine shake, and medium- to high-frequency, small-amplitude vibration corresponding to idling vibration.

While the present invention has been shown hereinabove in terms of certain preferred embodiments, these are merely illustrative and should in no wise be construed as limiting the invention to the specific disclosure herein.

For example, whereas in the fourth to sixth embodiments the screw structure or the worm gear structure includes a screw thread formed directly on the movable valve body, the reciprocating actuating force which has been converted by the screw structure or the worm gear structure could instead be transmitted to the movable valve body indirectly via a reduction gear train that includes a rack and pinion, or the like. That is, it will be sufficient for the screw structure or the worm gear structure to be disposed on the transmission path for actuating force from the electric motor to the movable valve body, so as to afford retention force of the movable valve body in the non-energized state.

In the fourth to sixth embodiments, there is shown a construction provided selectively with either a screw structure or a worm gear structure, but a construction having both a screw structure and a worm gear structure on the transmission path for actuating force from the electric motor to the movable valve body could also be employed.

For example, in the first to third embodiments, rotation of the valve member 302, 316, 326 relative to the support member 94, and hence to the second mounting member 14, is prevented by engagement between the mating projections 306 and the mating notches 300, but this rotation limiting mechanism is not an essential element of the present invention. Specifically, in instances where for example the movable valve body cannot rotate about a center line extending in the direction of reciprocating operation, the rotation limiting mechanism can be dispensed with.

Furthermore, whereas in the fourth to sixth embodiments above the rotation limiting mechanism is composed of mating projections 306 provided to the valve member 302, 316, 326, and mating notches 300 provided to the retainer tube portion 298 or retainer portion 332, it would be acceptable to instead provide the movable valve body with mating notches that open onto the lower end and peripheral side wall, and to provide the retainer tube portion or retainer portion with mating projections that project peripherally inward, with the rotation limiting mechanism being devised of intermeshing between these mating notches and mating projections.

The engine mounts 210, 312, 322 shown in the fourth to sixth embodiments above are merely examples of the fluid filled vibration damping device according to the present invention, and the scope of the invention should not be construed as limited in any way by the specific constructions of the engine mounts shown in these embodiments. For example, the present invention would also be applicable not only to fluid filled vibration damping devices of "bowl" design like those shown by way of example in the preceding embodiments, but also to fluid filled vibration damping devices of "tube" design having a structure whereby an inner shaft member and an outer tubular member are linked to one another by a main rubber elastic body, and having a number of fluid chambers spaced apart in the circumferential direction.

Figure 15:
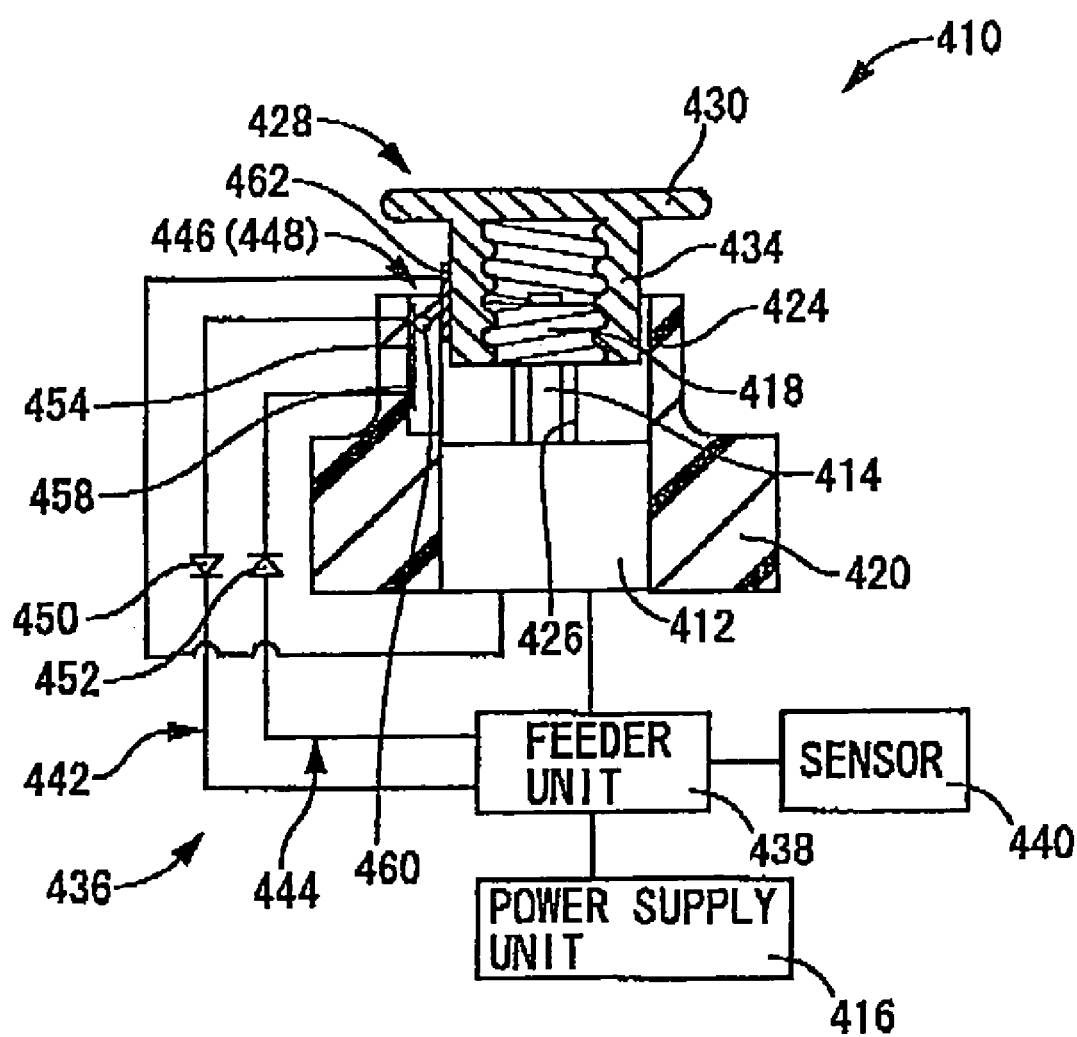
FIG. 15 is a vertical cross sectional view of an electric actuator for use in an automotive engine mount, according to a seventh embodiment of the present invention, taken along line 15-15 of FIG. 17.
Figure 16:
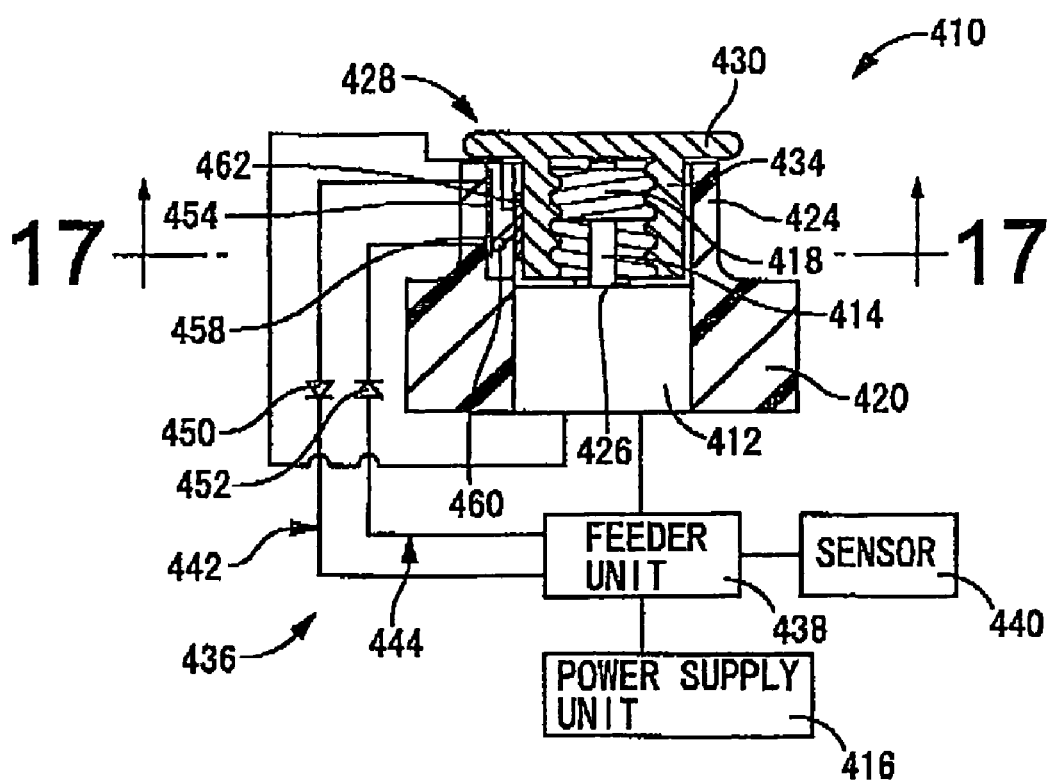
FIG. 16 is a cross sectional view taken along line 16-16 of FIG. 17 where a movable member is located at its upper end.

Referring next to FIGS. 15 and 16, there is depicted an electric actuator 410 for use in a fluid filled vibration damping device as one embodiment of the present invention. To describe in greater detail, the electric actuator 410 has an electric motor 412. In the following description, unless indicated otherwise, the vertical direction refers to the vertical direction in FIG. 15, which is also the direction of reciprocating operation of a movable member 42S, discussed later.

The electric motor 412 is an electric motor of known type having a rotating shaft 414 as its drive shaft. By virtue of electrical current supplied by a power supply unit 416, rotational force will be brought to bear on the rotating shaft 414, causing the rotating shaft 414 to undergo actuated rotation about the center axis. In this embodiment in particular, the direction of rotation of the rotating shaft 414 will change depending on the direction of electrical current to the electric motor 412. Any of various motors (electric motors) of known type, such as a separately-excited DC electric motor, could be employed as the electric motor 412. The power supply unit 416 employs a combination of any of various kinds of DC power supply, and commutator that converts the DC power supply and AC power to DC power. An on-board accumulator (battery) or the like would be suitable, for example.

As the screw portion, a male thread member 418 is attached to the rotating shaft 414 of the electric motor 412. The male thread member 418 is a component of generally round tubular shape with a screw thread formed on its outside peripheral face, and it is affixed with the rotating shaft 414 inserted so as to extend along the center axis. The male thread member 418 is designed to rotate in association with rotational actuation of the rotating shaft 414.

The electric motor 412 is mounted onto a support member 420. The support member 420 has a thick annular shape, and in this embodiment is made of hard synthetic resin.

Additionally, a retainer tube portion 424 is formed on the inside peripheral edge of the support member 420. The retainer tube portion 424 is of generally round tube shape and extends upward from the inside peripheral edge of the support member 420. The retainer tube portion 424, in sections thereof situated in opposition along an axis in the diametrical direction, also has a pair of mating notches 426, 426 that open onto the inside peripheral side and the upper end face. This mating notch 426 is of groove form extending for predetermined length in the axial direction with a generally unchanging circumferential width dimension, and in this embodiment, its side faces in the circumferential direction extend parallel to one another.

The electric motor 412 is secured fitting within the center hole of the support member 420 in such a way that the rotating shaft 414 of the electric motor 412 extends along the center line of the center hole of the support member 420. The rotating shaft 414 is thereby positioned a distance away to the inside peripheral side from the retainer tube portion 424.

The distal end section of the rotating shaft 414 is covered by a movable member 428 as the output member. The movable member 428 has an inverted, generally bottomed round tubular shape. In this embodiment, it is made of iron, aluminum alloy, or other metal with a view to improving durability against deformation and wear. Additionally, a pusher flange portion 430 that flares towards the outside peripheral side is integrally formed at the upper end of the movable member 428. The pusher flange portion 430 in this embodiment is chamfered so as to give its outside peripheral edge a generally semispherical appearance in longitudinal cross section.

At the lower end of the movable member 428 there is formed a pair of mating projections 432, 432 that project towards the outside peripheral side from sections situated in opposition along an axis in the diametrical direction. The mating projections 432 are generally block shaped projections whose end faces in the circumferential direction extend parallel to one another. The circumferential width dimension of the mating projections 432 is approximately equal to the circumferential width dimension of the mating notches 426 formed in the retainer tube portion 424, while the axial width dimension of the mating projections 432 is sufficiently smaller than the axial width dimension of the mating notches 426.

The movable member 428 is also furnished with a female thread portion 434 as the threadable contact portion. The female thread portion 434 is formed utilizing the peripheral wall of the movable member 428 of inverted, generally bottomed round tube shape, and has a screw thread formed along the entire length of its inside peripheral face. The screw thread constituting the female thread portion 434 has a structure that corresponds to the screw thread formed on the outside peripheral face of the male thread member 418 which has been attached to the rotating shaft 414.

The movable member 428 with this female thread portion 434 will be attached to the rotating shaft 414 of the electric motor 412. Specifically, the movable member 428 will be positioned covering the rotating shaft 414 from above, with the peripheral wall of the movable member 428 encircling the rotating shaft 414 a distance away towards the outside peripheral side from the rotating shaft 414. In this embodiment, the rotating shaft 414 of the electric motor 412 is disposed so as to extend in the direction of reciprocating operation of the movable member 428, discussed later.

The male thread member 418 that has been attached to the rotating shaft 414 is inserted to the inside peripheral side of the peripheral wall of the movable member 428, and the screw thread formed on the outside peripheral face of the male thread member 418 threadably engaged with the screw thread formed on the inside peripheral face of the female thread portion 434. In other words, the male thread member 418 that has been attached to the rotating shaft 414 is screwed into the female thread portion 434 of the movable member 428 from its bottom opening. The movable member 428 is thereby attached to the rotating shaft 414, and in the linking sections of the rotating shaft 414 and the movable member 428 there is provided a screw structure composed of the male thread member 418 and the female thread portion 434.

Figure 17:
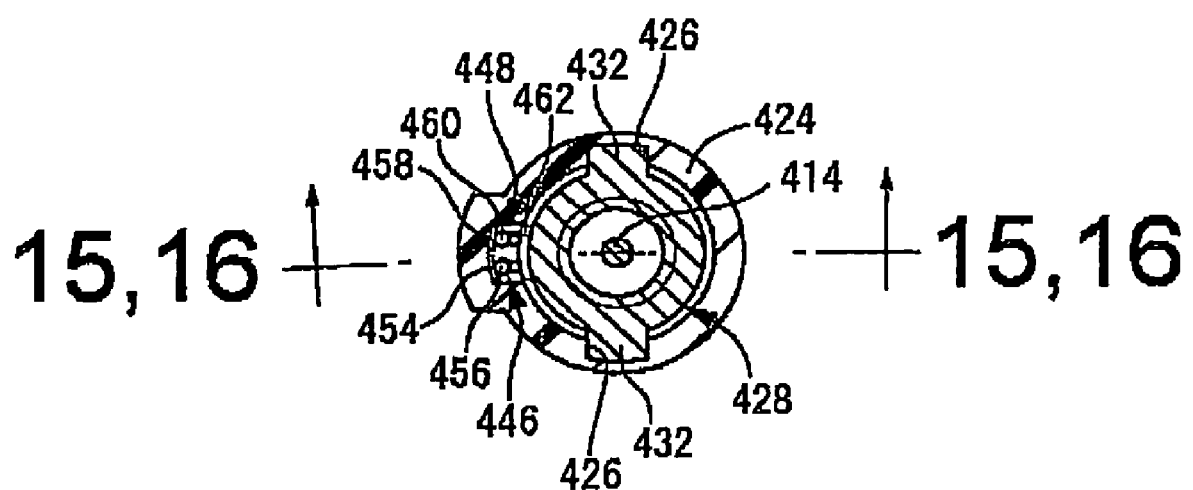
FIG. 17 is a cross sectional view taken along line 17-17 of FIG. 16.

The movable member 428 is then inserted into the retainer tube portion 424 by positioning the rotating shaft 414 of the electric motor 412 to the inside peripheral side of the retainer tube portion 424. As depicted in FIG. 17, the mating projections 432 that have been integrally formed at the lower end of the movable member 428 are aligned in the circumferential direction with the mating notches 426 that have been formed in the retainer tube portion 424, and the mating projections 432 are positioned fitting into the mating notches 426. Through the intermeshing action of the mating projections 432 and the mating notches 426 in the circumferential direction, the movable member 428 will be detained in the circumferential direction with respect to the retainer tube portion 424, making relative rotation impossible. The rotation restricting mechanism of the movable member 428 in this embodiment is realized on the basis of this engagement between the movable member 428 and the retainer tube portion 424.

Thus, the screw structure which is composed of the male thread member 418 and the female thread portion 434 will convert rotational actuating force generated by the energized electric motor 412 into reciprocating actuating force which acts on the movable member 428. That is, in this embodiment, the screw structure serves as an actuating force converter mechanism. By controlling the direction of rotation of the rotating shaft 414 of the electric motor 412, the movable member 428 can undergo actuated displacement to a prescribed location in the axial direction. Reciprocating operation of the movable member 428 in the axial direction will be discussed below.

First, where the male thread member 418 that has been installed on the rotating shaft 414 of the electric motor 412 is positioned at the lower end of the female thread portion 434 that has been formed in the movable member 428, i.e. at the lower end opening in the peripheral wall of the movable member 428, the movable member 428 will be positioned at the upper terminus of the actuation direction. Even with the movable member 428 positioned at the upper terminus of the actuation direction in this way, the mating projections 432 will be positioned within the mating notches 426, and intermeshing action will be produced thereby.

Next, when the electric motor 412 is energized from the power supply unit 416, causing the rotating shaft 414 to rotate to one side in the circumferential direction, the male thread member 418 will undergo relative rotation with respect to the female thread portion 434, and the male thread member 418 will screw into the female thread portion 434. Thus, the movable member 428 in which the female thread portion 434 has been formed will experience relative displacement downward in the axial direction with respect to the rotating shaft 414 to which the male thread member 418 has been attached, and hence with respect to the electric motor 412; and will move to the lower terminus of the direction of reciprocating operation.

In this embodiment in particular, since the movable member 428 is prevented from rotating through engagement of the mating projections 432 with the mating notches 426, actuated displacement of the movable member 428 in the axial direction can be brought about efficiently while preventing the movable member 428 from rotating due to rotational actuating force of the rotating shaft 414 transmitted to it through friction etc. between the male thread member 418 and the female thread portion 434.

Next, when the electric motor 412 is energized by the power supply unit 416, causing the rotating shaft 414 to rotate in reverse in the circumferential direction, the male thread member 418 will undergo relative rotation with respect to the female thread portion 434, causing the male thread member 418 to turn in the direction of disengagement from the female thread portion 434. Thus, the movable member 428 in which the female thread portion 434 has been formed will experience relative displacement upward in the axial direction with respect to the rotating shaft 414 to which the male thread member 418 has been attached, and hence with respect to the electric motor 412; and will move to the upper terminus of the direction of reciprocating operation. In this embodiment, the rotating shaft 414 is designed to rotate in reverse when the electric motor 412 is energized in reverse.

In this way, rotational actuating force produced by the electric motor 412 will be converted into linear actuating force in the axial direction by the screw structure that has been disposed in the linking sections of the rotating shaft 414 and the movable member 428, and will then be transmitted to the movable member 428. Then, by switching the direction of energization of the electric motor 412 to change the direction of rotation of the rotating shaft 414, the movable member 428 will undergo reciprocating operation up and down in the axial direction. As will be appreciated from the above, in this embodiment rotational actuating force produced by the electric motor 412 will be converted into linear actuating force in the axial direction by the screw structure that has been disposed between the rotating shaft 414 and the movable member 428.

The electric actuator 410 according to this embodiment is provided with a control circuit 436 for controlling reciprocating operation of the movable member 428. This control circuit 436 is disposed on the energization path from the power supply unit 416 to the electric motor 412, and additionally has a feeder unit 438.

The feeder unit 438 is a unit for switching the polarity of the DC power supplied to electric motor 412 from the power supply unit 416. In this embodiment, it controls the energization direction to the electric motor 412 on the basis of sensor results from a connected sensor 440. The sensor 440 in this embodiment is one that detects driving conditions of the automobile, e.g. vehicle speed, engine RPM, etc. A speed sensor of known construction could be employed.

The feeder unit 438 is also connected to the electric motor 412 through a first feed path 442 and a second feed path 444. Additionally, as the first switching member, a first switch 446 is disposed on the first feed path 442. As the second switching member, a second switch 448 is disposed on the second feed path 444. In this embodiment, the feeder unit 438 has terminals (not shown) that output the DC power that was input from the power supply unit 416. One of these terminals is connected to one of the feed terminals of the electric motor 412, while a lead wire connected to the other terminal is branched, with the branches connecting respectively to the first switch 446 and the second switch 448, thereby constituting the first feed path 442 and the second feed path 444.

As the first commutating member, a first diode 450 is situated on the first feed path 442. Through the commutating action of this first diode 450, on the first feed path 442, current will be allowed to flow in the direction going from the first switch 446 side towards the feeder unit 438 side while blocking it from flowing in the direction going from the feeder unit 438 side towards the first switch 446 side. Thus, on the first feed path 442, only DC power of polarity that will actuate downward displacement of the movable member 428 will be supplied to the electric motor 412.

Additionally, as the second commutating member, a second diode 452 is situated on the second feed path 444. Through the commutating action of this second diode 452, on the second feed path 444, current will be allowed to flow in the direction going from the feeder unit 438 side towards the second switch 448 side while blocking it from flowing in the direction going from the second switch 448 side towards the feeder unit 438 side. Thus, on the second feed path 444, only DC power of polarity that will actuate upward displacement of the movable member 428 will be supplied to the electric motor 412.

As the first and second diodes 450, 452 it would be possible to use diodes of known type (such as p-n diodes for example) having commutating action and made of materials such as silicon, germanium, selenium etc., with the use of silicon diodes being preferred.

By having the feeder unit 438 control the polarity of the DC power that is input from the power supply unit 416 and providing the first and second diodes 450, 452 on the first and second feed paths 442, 444, DC power of controlled polarity may be selectively supplied to the electric motor 412 through either of the feed paths 442, 444. As will be appreciated from the above, in this embodiment, the feeder unit 438 and the first and second diodes 450, 452 of constitute switching member for switching the polarity of the DC power that is supplied to the electric motor 412.

The actuation direction of the movable member 428 can be switched by controlling the polarity of DC power that is supplied to the electric motor 412, using switching member composed of the feeder unit 438 and the first and second diodes 450, 452.

The first switch 446 which has been provided on the first feed path 442 includes a first electrode 454, and a first contact fitting 456 serving as a first brush. The first electrode 454 is made of conductive metal material of thin elongated plate shape, and is connected by a lead wire to a terminal of the feeder unit 438. In this embodiment, the first electrode 454 is affixed to the inside peripheral face of the retainer tube portion 424, and extends in the axial direction, which is also the actuation direction of the movable member 428.

The first contact fitting 456 is made of conductive metal material of rod shape, and is attached to the movable member 428. The first contact fitting 456 is situated at a location that, with the movable member 428 fitted into the retainer tube portion 424, corresponds to the first electrode 454 in the circumferential direction. Furthermore, the distal end section of the first contact fitting 456 is designed so as to be positioned in contact with the first electrode 454 when the movable member 428 is positioned in a zone lying towards the upper terminus from the medial section in the operating direction.

The second switch 448 includes a second electrode 458, and a second contact fitting 460 serving as a second brush. The second electrode 458 is made of conductive metal material of thin elongated plate shape, and is connected by a lead wire to a terminal of the feeder unit 438. In this embodiment, the second electrode 458 is affixed to the inside peripheral face of the retainer tube portion 424, and extends in the axial direction, which is also the actuation direction of the movable member 428.

The second contact fitting 460 is made of conductive metal material of rod shape, and is attached to the movable member 428. The second contact fitting 460 is situated at a location that, with the movable member 428 fitted into the retainer tube portion 424, corresponds to the second electrode 458. Furthermore, the distal end section of the second contact fitting 460 is designed so as to be positioned in contact with the second electrode 458 when the movable member 428 is positioned in a zone lying towards the lower terminus from the medial section in the operating direction.

The first contact fitting 456 and the second contact fitting 460 are attached in this way to the movable member 428 by a fastener fitting 462. The fastener fitting 462 is a fitting of thin metal plate shape made of conductive material. Also, the fastener fitting 462 has a curving contour that corresponds in shape to contour of the outside peripheral face of the movable member 428, and is attached with one of its faces juxtaposed against the outside peripheral face of the movable member 428, and with the basal ends of the first contact fitting 456 and the second contact fitting 460 affixed to its other face so as to be spaced apart by a prescribed distance in the circumferential direction of the movable member 428. The first contact fitting 456 and the second contact fitting 460 will thereby be positioned spaced apart in the axial-perpendicular direction and projecting out towards the outside peripheral side from the peripheral wall of the movable member 428. In this embodiment, the first contact fitting 456 and the second contact fitting 460 will extend along a gradually downward slope towards their projecting distal ends.

The fastener fitting 462 is also connected through a lead wire to the other feed terminal of the electric motor 412. The other terminal of the feeder unit 438 is connected to the other feed terminal of the electric motor 412 via the first switch 446 and the second switch 448.

Here, since the first contact fitting 456 and the second contact fitting 460 are attached to the movable member 428, they will undergo relative displacement in the axial direction with respect to the first electrode 454 and the second electrode 458, depending on reciprocating operation of the movable member 428.

Figure 18:
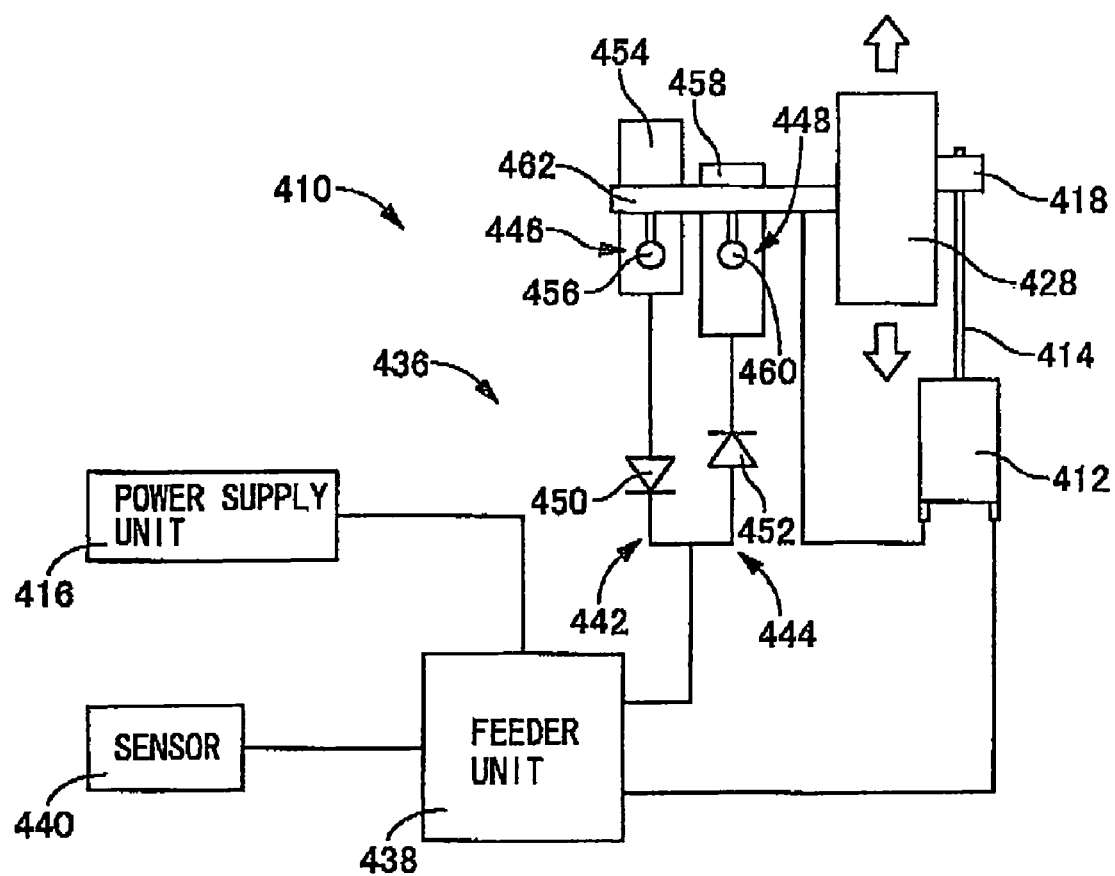
FIG. 18 is a schematic view of the electric actuator of the engine mount.
Figure 19:
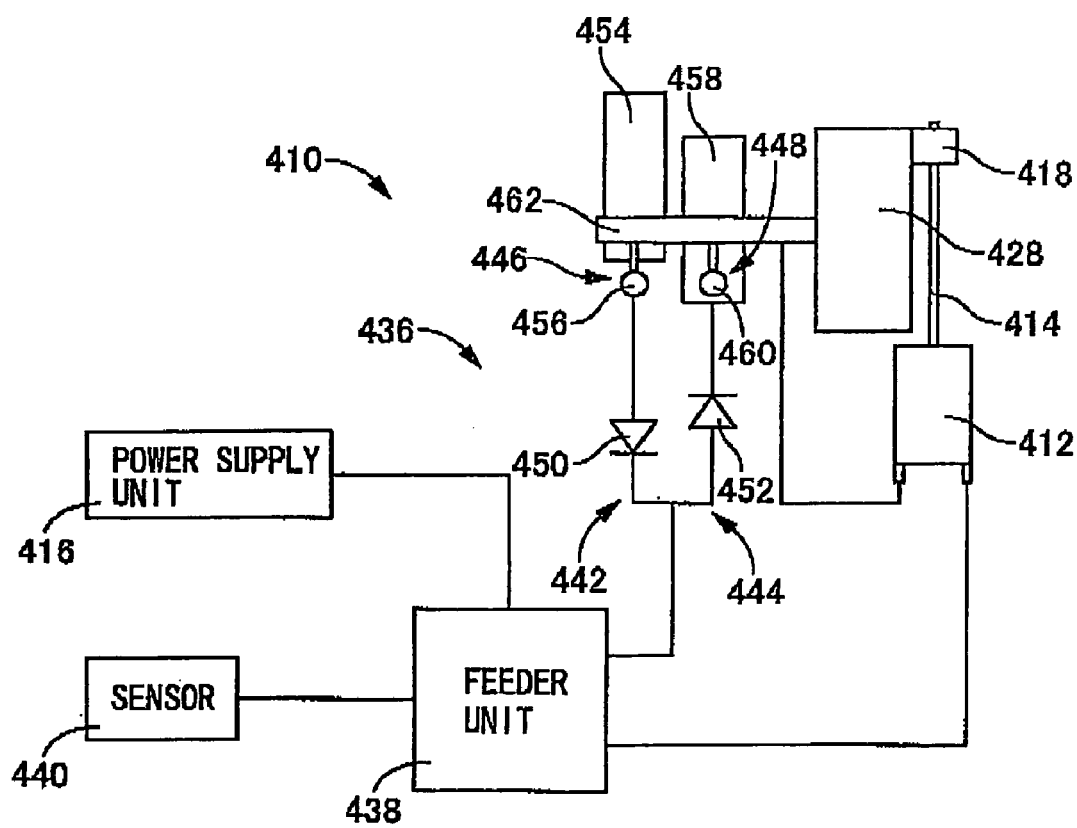
FIG. 19 is a cross sectional view of the electric actuator where a movable member is located at its lower end.
Figure 20:
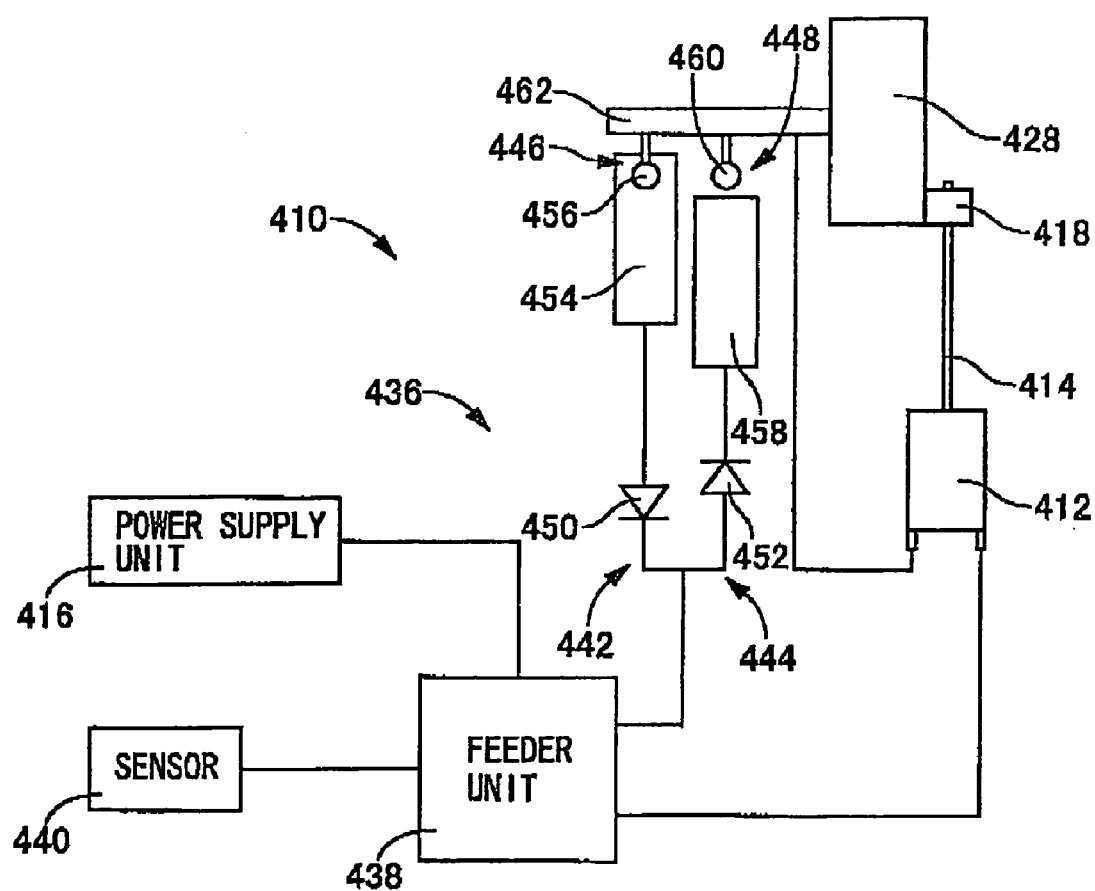
FIG. 20 is a cross sectional view of the electric actuator where a movable member is located at its upper end.

Furthermore, as depicted in FIGS. 18 to 20, in this embodiment the first electrode 454 and the second electrode 458 are positioned relatively offset in the axial direction, while the distal end sections of the first contact fitting 456 and the second contact fitting 460 are positioned at the same height in the axial direction. More specifically, the upper end section of the first electrode 454 is positioned above the upper end section of the second electrode 458 in the axial direction, while the lower end section of the second electrode 458 is positioned below the lower end section of the first electrode 454 in the axial direction. In this embodiment, the first electrode 454 and the second electrode 458 have equal length in the axial direction of the mount. The section of the first electrode 454 that projects upward past the second electrode 458 has length in the axial direction that is identical to that of the section of the second electrode 458 that projects downward past the first electrode 454.

The first switch 446 and the second switch 448 are thus designed to be switched between the connected and the disconnected state, depending on actuated displacement of the movable member 428.

Specifically, with the movable member 428 in a state of actuated displacement through the medial section of the operating direction as depicted in FIG. 18, the distal end section of the first contact fitting 456 will be maintained in contact with the first electrode 454, while the distal end section of the second contact fitting 460 will be maintained in contact with the second electrode 458. In other words, during actuated displacement of the movable member 428 through the medial section of the operating direction, the first and second contact fittings 456, 460 will be positioned in sliding contact with the first and second electrodes 454, 458. The first switch 446 and the second switch 448 will both be placed in the connected state thereby, and the first feed path 442 and the second feed path 444 will be maintained in the connected state.

Then, with the movable member 428 positioned at the lower terminus of the operating direction as depicted in FIG. 19, the projecting distal end of the first contact fitting 456 will be positioned below and away from the first electrode 454, so that the first electrode 454 and the first contact fitting 456 are no longer in contact. Additionally, since the second electrode 458 extends further below the first electrode 454, the second electrode 458 and the second contact fitting 460 will be maintained in a state of contact. Thus, the first switch 446 will assume the disconnected state, while the second switch 448 will be maintained in a state of contact, with the distal end section of the second contact fitting 460 positioned in contact with the lower end section of the second electrode 458. Consequently, the first feed path 442 which has the first switch 446 on its path will be cut off, while the second feed path 444 which has the second switch 448 on its path will be maintained in a state of contact.

Meanwhile, with the movable member 428 positioned at the upper terminus of the operating direction as depicted in FIG. 20, the projecting distal end of the second contact fitting 460 will be positioned above and away from the second electrode 458, so that the second electrode 458 and the second contact fitting 460 are no longer in a state of contact. Additionally, since the first electrode 454 extends further below the second electrode 458, the first electrode 454 and the first contact fitting 456 will be maintained in a state of contact. Thus, the second switch 448 will assume the disconnected state, while the distal end section of the first contact fitting 456 will be positioned contacting the upper end section of the first electrode 454, thus maintaining the first switch 446 in a state of contact. Consequently, the second feed path 444 which has the second switch 448 will be cut off, while the first feed path 442 which has the first switch 446 will be maintained in a state of contact.

In this embodiment in particular, sufficiently large offset in the axial direction will be established between the first electrode 454 and the second electrode 458. With the movable member 428 positioned at the lower terminus of the operating direction, the second electrode 458 will extend down to below the contact portions of the second electrode 458 and the second contact fitting 460. While with the movable member 428 positioned at the upper terminus of the operating direction, the first electrode 454 will extend down to below the contact portions of the first electrode 454 and the first contact fitting 456. Thus, it will be possible to effectively prevent a situation whereby both the first and second switches 446, 448 become disconnected due to an error in the extent of displacement of the movable member 428 caused by inertia etc.

In the event that the movable member 428 is positioned in the medial section of the operating direction so that both the first switch 446 and the second switch 448 are in the connected state, the electric motor 412 will be supplied with power through either the first feed path 442 or the second feed path 444. Specifically, this is because the first diode 450 is arranged on the first feed path 442 so that only DC power of polarity driving the movable member 428 downward is supplied to the electric motor 412 through the first feed path 442, and because the second diode 452 is arranged on the second feed path 444 so that only DC power of polarity driving the movable member 428 downward is supplied to the electric motor 412 through the second feed path 444.

When the movable member 428 is actuated downward and reaches the lower terminus of the operating direction, contact between the first electrode 454 and the first contact fitting 456 will be broken, thus cutting off the first switch 446. Thus, the supply of power to the electric motor 412 through the first feed path 442 will stop, and downward actuated displacement of the movable member 428 will stop.

On the other hand, with the movable member 428 positioned at the lower terminus of the operating direction in this way, the second electrode 458 and the second contact fitting 460 will be maintained in a state of contact, and DC power of polarity driving the movable member 428 upward will be supplied to the electric motor 412 through the second feed path 444.

Since the electric motor 412 is supplied by the feeder unit 438 through the second feed path 444 with DC power of polarity driving the movable member 428 upward, the movable member 428 will undergo actuated displacement upward.

Furthermore, when the movable member 428, by being supplied with power through the second feed path 444, undergoes actuated displacement upward so that the movable member 428 now reaches the upper terminus of the operating direction, contact between the second electrode 458 and the second contact fitting 460 will be broken, thus cutting off the second switch 448. Thus, the supply of power to the electric motor 412 through the first feed path 442 will stop, and downward actuated displacement of the movable member 428 will stop.

When the movable member 428 undergoes actuated displacement upward from the lower terminus of the operating direction, the first electrode 454 and the first contact fitting 456 which were previously separated will again be positioned in contact, connecting the first switch 446. Furthermore, with the movable member 428 positioned at the upper terminus of the operating direction, the first electrode 454 and the first contact fitting 456 will be maintained in a state of contact. Consequently, with the movable member 428 positioned at the upper terminus of the operating direction, the first switch 446 will be maintained in a state of contact, making it possible for power to be supplied to the electric motor 412 through the first feed path 442.

By supplying DC power of polarity driving the movable member 428 downward from the feeder unit 438, power will be supplied to the electric motor 412 through the first feed path 442, whereby the movable member 428 will undergo actuated displacement downward.

In this way, in the electric actuator 410 according to this embodiment, reciprocating operation at the desired stroke by the movable member 428 can be achieved. In particular, because physical contact between the first and second electrodes 454, 458 and the first and second contact fittings 456, 460 will be broken automatically through actuated displacement of the movable member 428, thus bringing the movable member 428 to a stop, the movable member 428 can be reliably brought to a stop at the prescribed location, making it possible to control the amount of displacement of the movable member 428 with high accuracy.

Moreover, in this embodiment, with the movable member 428 positioned at a terminus of the operating direction, either the first switch 446 or the second switch 448 will assume the cutoff state, while the other will assume the connected state. Consequently, when the polarity is reversed by the feeder unit 438, DC current can be supplied quickly to the electric motor 412 through the connection path on the side having the switch that is in the connected state, to operate the movable member 428 towards the opposite terminus. Consequently, both stopping of the movable member 428 at an actuation terminus, and actuation thereof from a stopped state, can take place in a stable manner.

Additionally, by affixing the first and second contact fittings 456, 460 to the movable member 428 so that they undergo relative displacement with respect to the first and second electrodes 454, 458 in association with actuated displacement of the movable member 428, the switches 446, 448 which are composed of these electrodes 454, 458 and contact fittings 456, 460 will be switched between the connected and disconnected state so as to regulate the actuation terminus of the movable member 428. Thus, as compared to the case where a sensor etc. for detecting the position of the movable member 428 is employed in order to regulate the actuation terminus of the movable member 428, such regulation of the actuation terminus of the movable member 428 can be accomplished with a simple construction and small number of parts, and inexpensively as well.

In this embodiment, a rotation restricting mechanism for preventing relative rotation of the movable member 428 and the retainer tube portion 424 about the center axis is provided. Thus, rotation of the movable member 428 in association with rotation of the rotating shaft 414 of the electric motor 412 can be prevented, and the movable member 428 can undergo actuated displacement in an efficient manner.

The electric actuator 410 constructed in the above manner may be employed, for example, in an automotive engine mount 464 as the fluid filled vibration damping device. In the following description, elements that are substantially the same as those in the preceding first to sixth embodiments will be assigned like symbols in the drawing, and will not be discussed at length.

Figure 21:
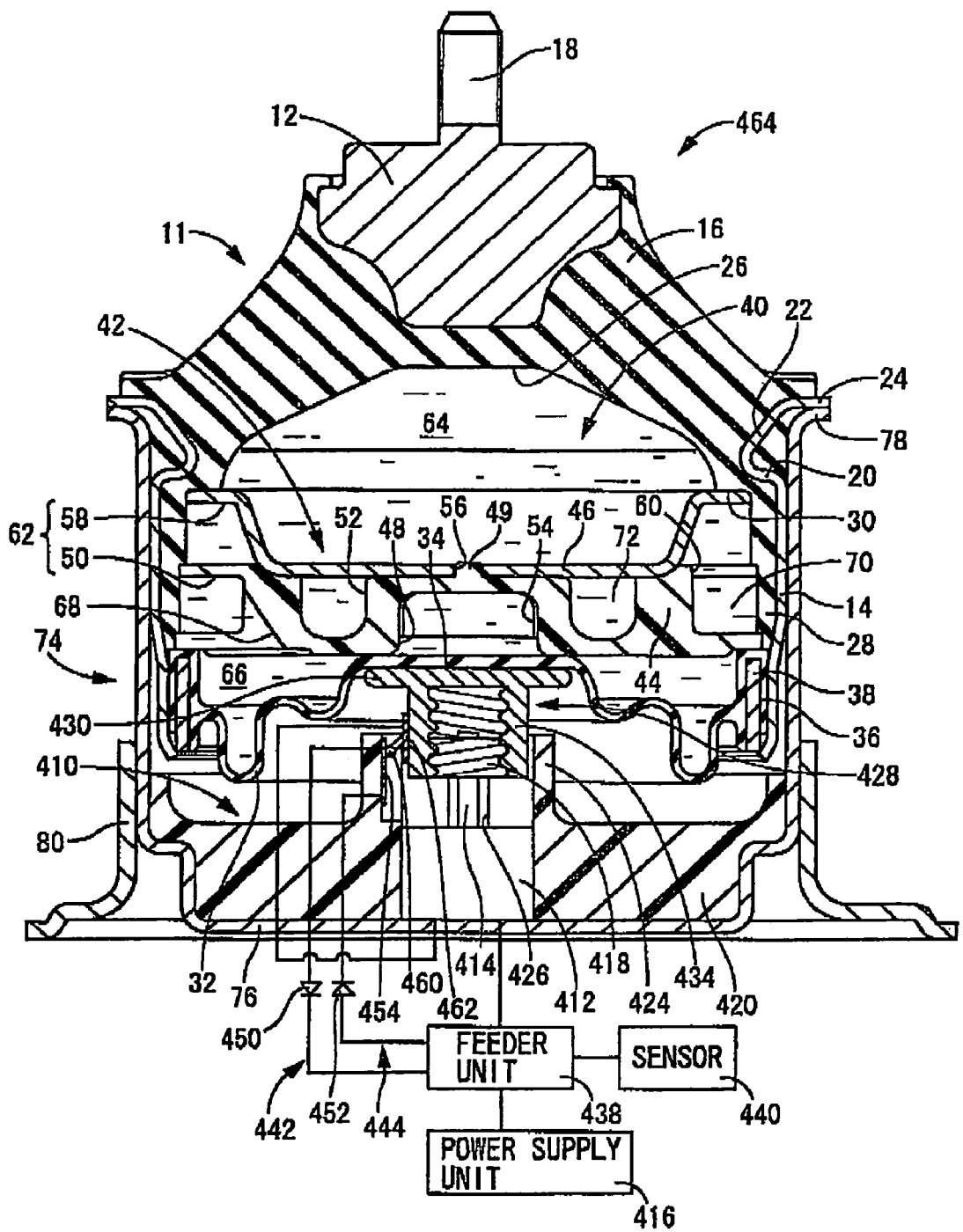
FIG. 21 is a cross sectional view of an engine mount equipped with the electric actuator.
Figure 22:
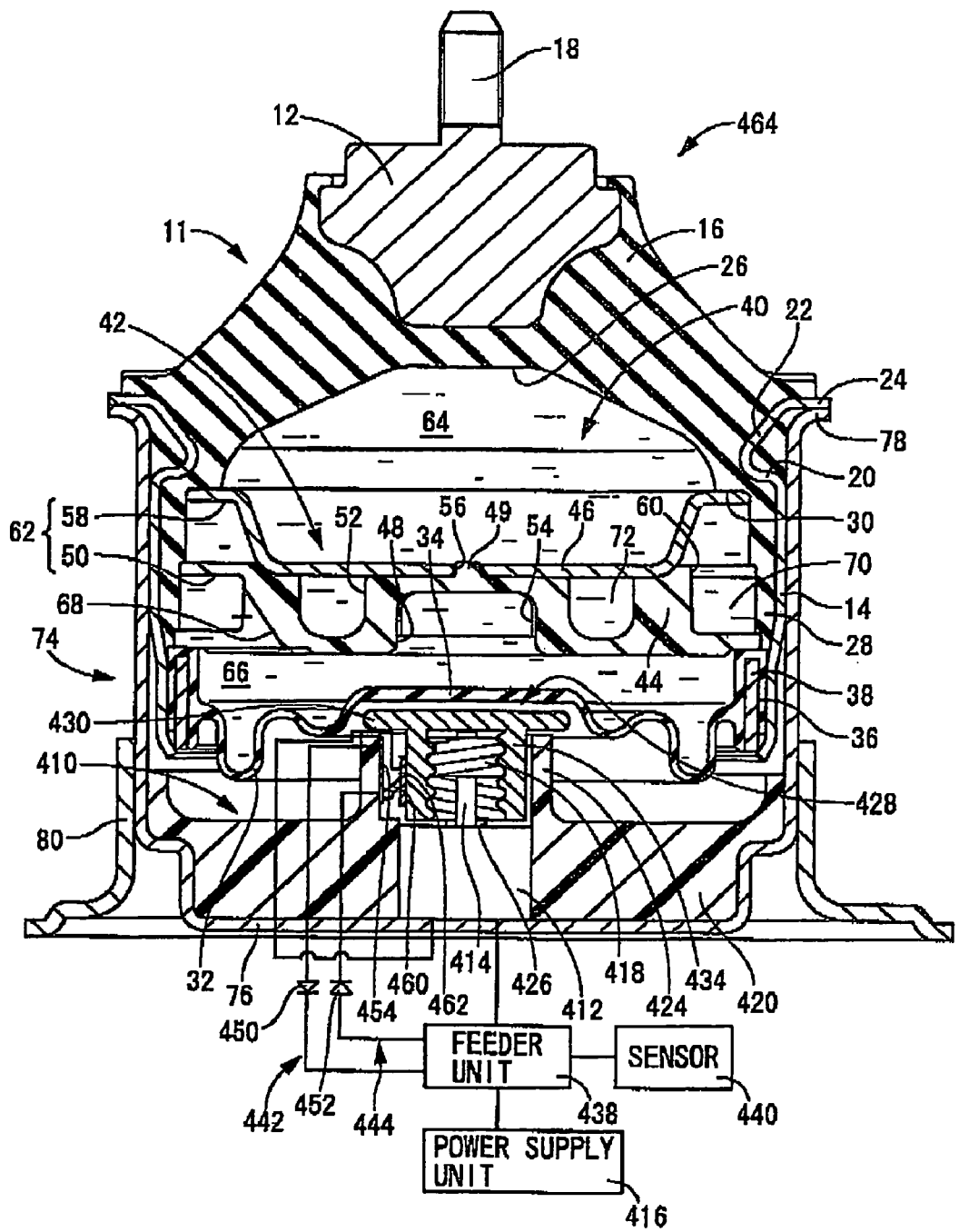
FIG. 22 is a cross sectional view of the engine mount of FIG. 21 where the second orifice passage is in an open state.

The electric actuator 410 constructed in the above manner will be fitted into the sleeve portion 76 of the bracket fitting 74 and secured resting on the base wall of the sleeve portion 76. Once thusly installed in the bracket fitting 74, the mount main body 11 will be attached to the bracket fitting 74 to make the engine mount 464 according to this embodiment. As illustrated in FIGS. 21 and 22, the support member 420 of the electric actuator 410 has a configuration corresponding to the bracket fitting 74, and the outer peripheral face and the bottom face of the support member 420 is held in contact with and affixed to the inner surface of the bracket fitting 74.

In the engine mount 464, the actuator 410 will be positioned below the mount main body 11, and the movable member 428 will be positioned below the center contact portion 34 of the diaphragm 32, either spaced apart from it by a prescribed distance in the axial direction, or juxtaposed against it in a state of contact.

In other words, the electric actuator 410 will be situated to the opposite side of the diaphragm 32 from the partition member 42. To either side of the center contact portion 34 of the diaphragm 32, the movable member 428 of the actuator 410 will be situated in opposition to the center recess 48 which is the opening of the second orifice passage 72 on the equilibrium chamber 66 side.

Through actuated displacement in the axial direction, the movable member 428 will be urged into contact with or away from the center contact portion 34 of the diaphragm 32, and the center contact portion 34 will undergo up and down displacement according to the reciprocating operation of the movable member 428 in the axial direction. Thus, the center contact portion 34 of the diaphragm 32 will urge the center contact portion 34 of the diaphragm 32 relatively closer to or away from the center recess 48 of the partition member 42.

Specifically, when the movable member 428 is positioned at the upper end in the direction of reciprocating operation, the center contact portion 34 will be pushed by the movable member 428 and pressed against the lower face of the partition member 42 so that the opening of the center recess 48 becomes blocked off by the movable member 428 via the center contact portion 34.

On the other hand, when the movable member 428 is positioned at the lower end in the direction of reciprocating operation, the center contact portion 34 will be positioned below and away from the partition member 42, opening up the center recess 48 into the equilibrium chamber 66.

Through control of reciprocating operation of the movable member 428 as described above, the opening of the center recess 48 (which is the opening of the second orifice passage 72 on the equilibrium chamber 66 side) can be switched between the communicating state and the blocked state, and the second orifice passage 72 can accordingly be switched between the communicating state and the blocked state. As will be apparent from FIG. 22 as well, in this embodiment, the movable member 428 and the diaphragm 32 are separable from one another in an unattached state. As will be apparent from the above description, the movable member 428 provides a movable valve body. That is the output member and the operating member is provided by the same member.

The automotive engine mount 464 constructed as above will be installed by attaching the first mounting member 12 of the mount main body 11 to the power unit (not shown) with mounting bolts 18, and attaching the second mounting member 14 to the car body (not shown) via the bracket fitting 74. By so doing, the engine mount 10 will be installed interposed between the power unit and the car body to provide vibration-damped support of the power unit on the car body.

With the automotive engine mount 464 constructed as above installed in an automobile, when engine shake or other vibration in the low-frequency range that can be a problem during driving is input, relatively large pressure fluctuations will be produced in the pressure receiving chamber 64. Due to a relative pressure fluctuation differential arising between the pressure receiving chamber 64 and the equilibrium chamber 66, a sufficient flow of fluid through the first orifice passage 70 will be effectively assured, and effective vibration damping action (high attenuating action) against engine shake and other vibration in a low frequency range will be produced based on flow action, e.g. the resonance action, of the fluid.

At this time, as depicted in FIG. 21, the movable member 428 will be positioned at the upper end of the direction of reciprocating operation and will be pressed against the opening of the second orifice passage 72 on the equilibrium chamber 66 side via the center contact portion 34 of the diaphragm 32. The opening of the second orifice passage 72 on the equilibrium chamber 66 side will thereby be blocked off fluidtightly, and the second orifice passage 72 will assumed the blocked state. Consequently, the fluid will be prevented from flowing between the pressure receiving chamber 64 and the equilibrium chamber 66 through the second orifice passage 72 so that liquid pressure inside the pressure receiving chamber 64 will not escape to the equilibrium chamber 66. Thus, fluid flow through the first orifice passage 70 can be produced efficiently, and vibration damping action based on flow action of the fluid can be effectively achieved.

Input of vibration in the medium- to high-frequency range (for example idling vibration that can be a problem with the car at a stop, or low-speed rumble which can be a problem during driving) will give rise to small-amplitude pressure fluctuations in the pressure receiving chamber 64. At times of input of such vibration, rotation of the rotating shaft 86 will be actuated through control of current to the electric motor 84, to actuate displacement of the valve member 102 to the lower end in the axial direction, as depicted in FIG. 22.

With this arrangement, the opening of the second orifice passage 72 on the equilibrium chamber 66 side can be switched to the communicating state so that the pressure receiving chamber 64 and the equilibrium chamber 66 communicate with one another through the second orifice passage 72. Due to a relative pressure fluctuation differential arising between the pressure receiving chamber 64 and the equilibrium chamber 66, a sufficient flow of fluid through the second orifice passage 72 can be effectively assured, and effective vibration damping action (low dynamic spring effect) against vibration in a medium to high frequency range such as vibration during idling will be produced based on flow action, e.g. the resonance action, of the fluid.

That is, in the fluid filled vibration damping device according to this embodiment, the second orifice passage 72 is adapted to be controlled between communicating and blocked states through reciprocating operation of the movable member 428 in order to switch the vibration damping characteristics. In FIGS. 21 and 22, in order to facilitate understanding, the stroke of the reciprocating operation of the movable member 428 is depicted in exaggerated form. In association therewith, the shape of the male thread member 418 and the female thread portion 434, more specifically, e.g. the slope angle and size of the thread are also depicted in exaggerated form.

In the automotive engine mount 464 according to this embodiment, since the electric actuator 410 of construction as described above is employed as an actuator for the movable member 428, the control of the open and closed states of the second orifice passage 72 will be realized in a highly precise manner. This makes it possible to change the vibration damping characteristics with stability.

Furthermore, the control circuit 436 for controlling reciprocating operation of the movable member 428 has a simple construction, thereby preventing increase in the number of the component and the manufacturing cost.

The screw structure is employed as the actuating force converter mechanism for transmitting rotational actuating force of the electric motor 412 to the movable member 428 as reciprocating actuating force in the axial direction, and the retention force is applied to the movable member 428 by means of the thread engagement between the male thread member 418 and the female thread portion 434 (mating force or friction force between threads. Thus, when the movable member 428 is placed at the operating end position where the electric motor 412 is not energized, the movable member 428 can be maintained at this operating end portion. Thus, the desired operating position of the second orifice passage 72 can be effectively maintained.

In particularly, when the movable member 428 is positioned at the upper end of the direction of reciprocating operation, the force for maintaining the position of the movable member 428 will be obtained readily without energizing the electric motor 412, thereby surely maintaining the substantially closed-off state of the second orifice passage 72. Thus, a desired vibration damping effect can be exhibited upon input of vibration corresponding to engine shakes or the like.

The engine mount 464 has the construction wherein the forth for maintaining the movable member 428 will be produced by utilizing the friction force or the mating force between the male thread member 418 and the female thread portion 434. In comparison with the case where the second orifice passage 72 will be maintained in its closed-off state by means of continuous energization of the electric motor, in this embodiment, the movable member 428 can be maintained at the desired operating position so that the second orifice passage 72 will be positioned in its closed-off state with high stability, even if the movable member 428 is exposed to the pressure in the pressure receiving chamber 64 via the second orifice passage 72, against the pressure of the pressure receiving chamber 64.

Since the force for maintaining the position of the movable member 428 can be obtained without needing to energize the electric motor 412, the required electric energy for maintaining the selected vibration damping characteristics can be reduced. Also, a heat generation upon energizing continuously the electric motor can be eliminated, whereby deterioration in stability due to the heat history can be prevented.

In addition, the female thread portion 434 is formed by utilizing the central recess of the movable member 428, and the male thread member 418 fixed to the rotating shaft 414 is brought into threaded engagement with the female thread portion 434, whereby the movable member 428 is attached to the rotating shaft 414. This arrangement makes it possible to prevent the relative slant between the movable member 423 and the rotating shaft 414, and the dislodgement from each other in the axial direction. Thus, the movable member 428 can be operated with high stability, and the switching operation of the vibration damping characteristics can be executed with high precision and stability.

In comparison with the case where a linear motor or the like is employed and a stroke of the movable member 428 is controlled, the present invention is able to minimize an effect on the amount of displacement of the movable member 428 by the variation of the supply voltage to the electric motor 412. Thus, the high precise change of vibration damping characteristics will be realized.

In the present embodiment, the pusher flange portion 430 that flares towards the outside peripheral side is integrally formed at the upper end of the movable member 428. Thus, the movable member 428 has a large surface area at its upper end face, thereby ensuring a reduced pressure per unit area applied to the center contact portion 34 of the diaphragm 32. In addition, the shoulder face 30 has a radius curved peripheral face, so that when the movable member 428 comes into pressed against the diaphragm 32, a local concentration of the pressing force will be prevented, thereby improving durability of the diaphragm 32.

While the seventh embodiment has been described in detail in its presently preferred embodiment, for illustrative purpose only, it is to be understood that the invention is by no means limited to the details of the illustrated embodiment For instance, in the seventh embodiment, the first electrode 454 and the second electrode 458 are fixed to the retainer tube portion 424, while the first contact fitting 456 and the second contact fitting 460 are attached to the movable member 428 side, so that during displacement of the movable member 428, the first contact fitting 456 and the second contact fitting 460 are displaced relative to the first electrode 454 and the second electrode 458. It is also possible to attach the first and second electrodes 454, 458 to the outer peripheral face of the movable member 428, and to attach the first and second contact fitting 456, 460 to the retainer tube portion 424, for example.

In the seventh embodiment, the end sections of the first electrode 454 and the second electrode 458 are positioned relatively offset in the axial direction, while the distal end sections of the first contact fitting 456 and the second contact fitting 460 are positioned at the same height in the axial direction. It is also possible to line up the end sections of the first electrode 454 and the second electrode 458 in the axial direction, while offsetting in the axial direction the distal end sections of the first contact fitting 456 and the second contact fitting 460. In this arrangement, with the movable member 428 positioned at its movable end in the operating direction, it may be possible to place one of the first and second switches 446, 448 in the closed state, and the other is placed in the open state.

It is not essential that either the first and second electrodes 454, 458 or the first and second contact fitting 456, 460 are attached to the movable member 428. For instance, another rotating member may be provided as an actuating force transmitting mechanism, which is rotated along with the rotation of the rotating shaft 414, with the rotation speed that is reduced in comparison with that of the rotating shaft 414 by using a line of reduction gears or the like. The first and second brushes are attached to this rotating member, and the first and second electrodes are provided so as to extend in the rotation direction of the rotating member at the positions corresponding to the distal end portions of the first and second brushes. In addition, the contact positions of the first and second brushes against the first and second electrodes are identical in the circumferential direction, and the end portions of the first and second electrodes are offset relative to each other in the direction of rotation of the rotating member. At times when the rotating member provides a given amount of rotation, one of the first and second switching member is placed in its closed state, while the other is placed in its open state, whereby the amount of displacement of the output member can be regulated.

As will be understood from the above mentioned, the relative displacement between the first and second electrodes, and the first and second brushes, is not limited to the displacement in the operating direction of the output member. For instance, the contact and non-contact states of the electrodes and brushes may be switched by the relative displacement in the rotation about the center axis of the reciprocating operation of the output member, or alternatively by the relative displacement in another linear direction different from the direction of the reciprocating operation of the movable member.

In the seventh embodiment, the switching member for switching the polarity of the DC power that is supplied to the electric motor 412 comprises the first and second diodes 450, 452, but the switching member does not necessarily comprise the first and second diodes 450, 452. It is necessary that the first feed path 442 and the second feed path 444 are arranged so as to supply different polarities of the DC power to the electric motor 412. For instance, a mechanical switch may be provided for switching either the first and second feed paths 442, 444 depending on the polarity of the DC power supplied to the electric motor 412. This makes it possible to eliminate the first and second diodes or other rectifiers.

In the seventh embodiment, as one type of the actuating force converter mechanism, there is disclosed the screw structure including the male thread member 418 attached to the rotating shaft 414 and the female thread portion 434 attached to the movable member 428. The actuating force converter mechanism is not limited to this screw structure, but may be composed of worm gear structure, for example.

Figure 23:
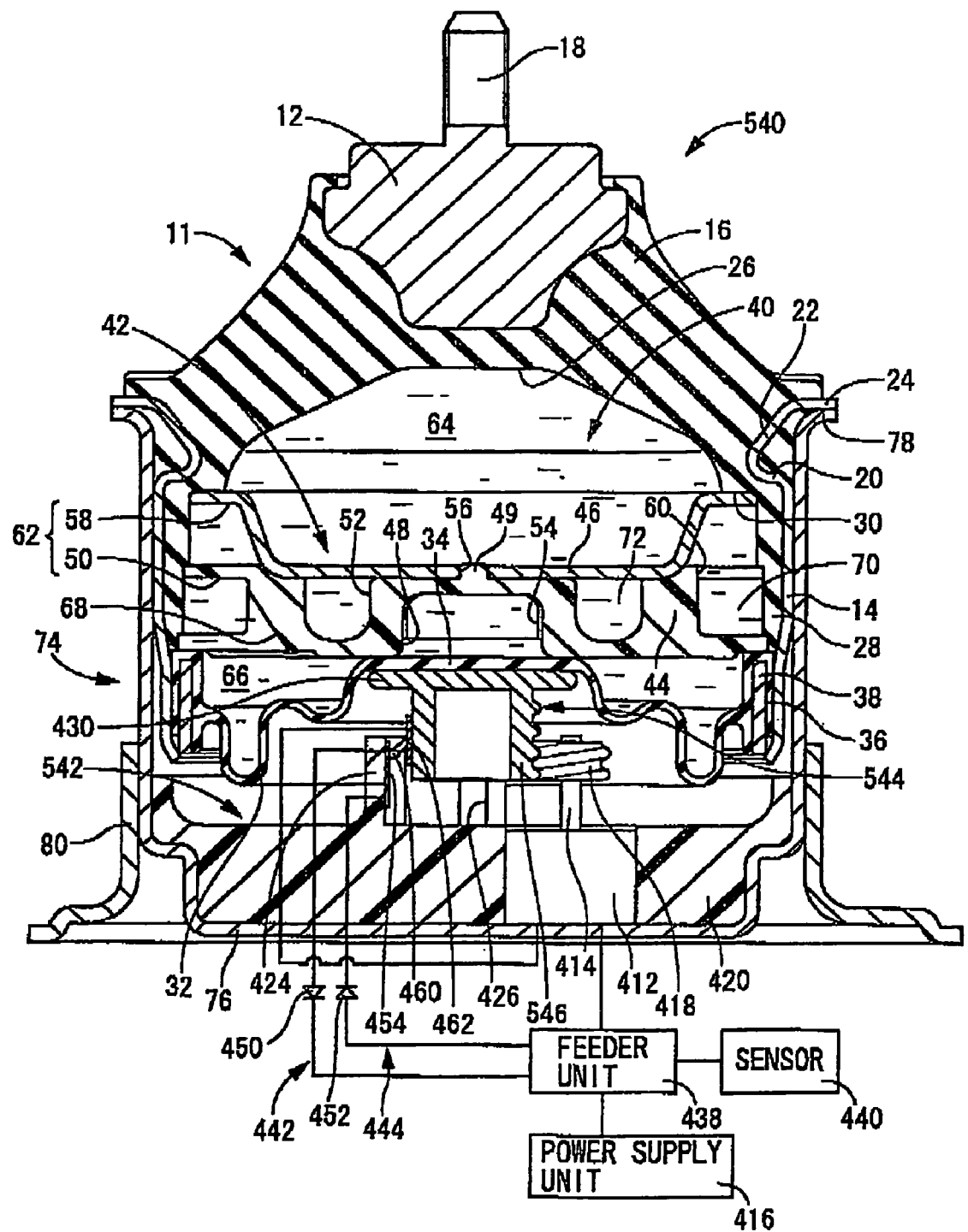
FIG. 23 is a cross sectional view of an engine mount according to another embodiment of the invention.

More specifically described, FIG. 23 shows an automotive engine mount 540 wherein an electric actuator 542 comprises a movable member 544 having a threaded portion extending a given circumferential length at its outer peripheral face and serving as a gear portion 546. In this embodiment, the movable member 544 serves as the movable valve body. In the following description, elements that are substantially the same as those in the preceding embodiments will be assigned like symbols in the drawing, and will not be discussed at length.

The male thread member 418 fixed to the rotating shaft 414 of the electric motor 412 is held in threaded contact with the gear portion 546 of the movable member 544. That is, the worm gear structure includes the male thread member 418 and the gear portion 546. When the electric motor 412 is energized, the rotating actuating force of the rotating shaft 414 is converted by the worm gear to the linear reciprocating actuating force, and then transmitted to the movable member 544.

By employing the worm gear structure wherein the male thread member 418 is threaded engagement with the gear portion 546 at one circumferential portion, the actuating force converter mechanism for transmitting rotational actuating force of the electric motor 412 to the movable member 428 as reciprocating actuating force, can be provided.

In the illustrated engine mount 464, the movable valve for switching the open/closed state of the second orifice passage 72 is formed by the movable member 428 as an output member of the electric actuator 410. It may be possible to provide an operating member for switching the open/closed state of the fluid passage separate from the output member. The operating member and the output member are connected together by means of rack or the like, or alternatively are connected together directly, so that the reciprocating actuating force of the output member is transmitted to the operating member. With this arrangement, the operating member can be reciprocated in accordance with the reciprocating actuating force of the output member, so that the switching control of the fluid passages can be effectively realized.

Since the present electric actuator includes the output member that is linearly reciprocated, an operating member for switching the open/closed state of the fluid passage or for applying external force to another member is not essential in the present invention. The operating member may be formed separately from the output member and attached to the output member afterward.

The illustrated engine mount 464 is one example of the fluid filled vibration damping device of the present invention, and the present invention is not limited to the details of the engine mount 464. For instance, the engine mount 464 includes the first and second orifice passages 70, 72, but alternatively it may include three or more orifice passages. Alternatively, the engine mount 464 may be provided with a movable plate or movable film formed of the rubber elastic body and partitioning the pressure receiving chamber and the equilibrium chamber from each other, so as to provide a fluid pressure absorbing mechanism for transmitting the fluid pressure in the pressure receiving chamber to the equilibrium chamber by means of slight displacement or deformation of the movable plate or movable film.

The power supply unit 416 as an power supply member to the electric motor 412 is employed in the illustrated embodiment, the electric actuator may includes in advance the power supply member.

The present invention is not limited to engine mounts, and is adaptable to implementation in various kinds of fluid filled vibration damping mounts such as member mounts, or in various kinds of fluid filled vibration damping devices used in other applications.

Nor it is the present invention necessarily limited to fluid filled vibration damping devices for automotive use, and may be implemented advantageously in fluid filled vibration damping devices for train cars, or in switchable fluid filled vibration damping devices for any of various other applications.

While the present invention has been described in detail in its presently preferred embodiment, for illustrative purpose only, it is to be understood that the invention is by no means limited to the details of the illustrated embodiment, but may be otherwise embodied. It is also to be understood that the present invention may be embodied with various changes, modifications and improvements which may occur to those skilled in the art, without departing from the spirit and scope of the invention.

What is claimed is:

1. A fluid filled vibration damping device comprising:
    a first mounting member and a second mounting member linked by a main rubber elastic body;
    a pressure receiving chamber whose wall is partially defined by the main rubber elastic body and filled with a non-compressible fluid;
    an equilibrium chamber whose wall is partly defined by a flexible film and filled with the non-compressible fluid;
    a fluid passage interconnecting the pressure receiving chamber and the equilibrium chamber;
    a movable valve body provided for switching the fluid passage between a communicating state and a blocked state through reciprocating operation;
    an electric motor employed for actuating the movable valve body; and
    an actuating force converter mechanism provided on an actuating force transmission path from the electric motor to the movable valve body,
    wherein rotational actuating force of the electric motor is transmitted as reciprocating actuating force to the movable valve body by the actuating force converter mechanism, and
    the movable valve body is formed with a hollow or solid valve stem portion that extends in a direction of reciprocating operation, a guide member is disposed fitting internally within or externally about the valve stem portion, and a rotation restricting mechanism is disposed between the guide member and the valve stem portion of the movable valve body for restricting rotation of the movable valve body about the valve stem portion extending in the direction of reciprocating operation, through engagement between the valve stem portion and the guide member.

2. The fluid filled vibration damping device according to claim 1, wherein the electric motor generates rotational actuating force in one direction.

3. The fluid filled vibration damping device according to claim 1, wherein the actuating force converter mechanism comprises at least one of a screw structure and a worm gear structure, and the rotational actuating force of the electric motor is transmitted as reciprocating actuating force to the movable valve body by at least one of the screw structure and the worm gear structure.

4. The fluid filled vibration damping device according to claim 3, wherein a drive shaft furnished with a screw portion that undergoes rotational actuation by the electric motor; a threadable contact portion disposed in threadable contact with the screw portion is formed on the movable valve body; and at least one of the screw structure and the worm gear structure is constituted to include the screw portion and the threadable contact portion.

5. The fluid filled vibration damping device according to claim 3, wherein the pressure receiving chamber and the equilibrium chamber are defined to either side of a partition member that is supported by the second mounting member; the fluid passage includes a first orifice passage that is formed in the partition member and a second orifice passage that is formed in the partition member and that is tuned to a higher frequency than the first orifice passage; and the second orifice passage is switchable between the communicating state and the blocked state by the movable valve body.

6. The fluid filled vibration damping device according to claim 5, wherein an opening of the second orifice passage on an equilibrium chamber side thereof is formed in a center section of the partition member; the movable valve body and the opening of the second orifice passage on the equilibrium chamber side are situated in opposition to either side of the flexible film, with the movable valve body unattached to the flexible film; rotational actuating force of the electric motor is exerted on the movable valve body via at least one of the screw structure and the worm gear structure so as to induce the movable valve body to undergo reciprocating operation so that the movable valve body separates from the flexible film to place the second orifice passage in the communicating state; and the movable valve body is positioned in abutment against the flexible film so that the flexible film becomes pushed against the opening of the second orifice passage on the equilibrium chamber side, to place the second orifice passage in the blocked state.

7. A fluid filled vibration damping device comprising:
    a first mounting member and a second mounting member linked by a main rubber elastic body;

a pressure receiving chamber whose wall is partially defined by the main rubber elastic body and filled with a non-compressible fluid;

an equilibrium chamber whose wall is partly defined by a flexible film and filled with the non-compressible fluid;

a fluid passage interconnecting the pressure receiving chamber and the equilibrium chamber;

a movable valve body provided for switching the fluid passage between a communicating state and a blocked state through reciprocating operation;

an electric motor employed for actuating the movable valve body; and an actuating force converter mechanism provided on an actuating force transmission path from the electric motor to the movable valve body, wherein rotational actuating force of the electric motor is transmitted as reciprocating actuating force to the movable valve body by the actuating force converter mechanism, the actuating force converter mechanism comprises a cam mechanism, and the cam mechanism includes a cam face disposed on one of the movable valve body and a drive shaft to which the rotational actuating force of the electric motor is transmitted, and a sliding portion disposed on another of the movable valve body and the drive shaft, and adapted to slide along the cam face; the cam face is defined by a cam slot that has been formed in a medial section viewed in a direction of reciprocating operation of the movable valve body, of either the movable valve body or the drive shaft of the electric motor; and the sliding portion is fitted into the cam slot.

8. The fluid filled vibration damping device according to claim 7, wherein the cam mechanism includes a cam face disposed on one of the movable valve body and a drive shaft to which the rotational actuating force of the electric motor is transmitted, and a sliding portion disposed on another of the movable valve body and the drive shaft and adapted to slide on the cam face, the cam mechanism being provided with urging member for urging the cam face towards a direction of abutment against the sliding portion.

9. The fluid filled vibration damping device according to claim 8, wherein the urging member is composed of a coil spring fitting externally onto an outside peripheral face of the movable valve body.

10. The fluid filled vibration damping device according to claim 7, wherein the pressure receiving chamber and the equilibrium chamber are defined to either side of a partition member that is supported by the second mounting member, the fluid passage includes a first orifice passage that is formed in the partition member and a second orifice passage that is formed in the partition member and that is tuned to a higher frequency than the first orifice passage, and the second orifice passage is switchable between the communicating state and the blocked state by the movable valve body.

11. The fluid filled vibration damping device according to claim 10, wherein an opening of the second orifice passage on an equilibrium chamber side thereof is formed in a center section of the partition member; the movable valve body and the opening of the second orifice passage on the equilibrium chamber side are situated in opposition to either side of the flexible film, with the movable valve body unattached to the flexible film; rotational actuating force of the electric motor is exerted on the movable valve body via the cam mechanism so as to induce the movable valve body to undergo reciprocating operation so that the movable valve body separates from the flexible film to place the second orifice passage in the communicating state; and the movable valve body is positioned in abutment against the flexible film so that the flexible film becomes pushed against the opening of the second orifice passage on the equilibrium chamber side, to place the second orifice passage in the blocked state.

12. The fluid filled vibration damping device according to claim 7, wherein the movable valve body has a tubular portion that extends in the direction of reciprocating operation, with the tubular portion positioned encircling an outside perimeter of the drive shaft; and the sliding portion disposed on the drive shaft fits into and slide through the cam slot formed opening onto an inside peripheral face of the tubular portion in an axially medial section of the tubular portion in order to constitute the cam mechanism.

13. The fluid filled vibration damping device according to claim 7, wherein the cam mechanism includes a cam face disposed on one of the movable valve body and a drive shaft to which the rotational actuating force of the electric motor is transmitted, and a sliding portion disposed on another of the movable valve body and the drive shaft and adapted to slide on the cam face; the cam face is formed on either the movable valve body or the drive shaft at one end face thereof in a direction of reciprocating operation; and the sliding portion, which is disposed on the other of the movable valve body and the drive shaft, is juxtaposed against the cam face in a state of abutment therewith.

14. The fluid filled vibration damping device according to claim 7, wherein the cam mechanism includes a cam face disposed on one of the movable valve body and a drive shaft to which the rotational actuating force of the electric motor is transmitted, and a sliding portion disposed on the other of the movable valve body and the drive shaft and adapted to slide on the cam face; and a retainer portion that extends at a right angle to a direction of reciprocating operation of the movable valve body is formed on at least one edge of the cam face in the direction of reciprocating operation of the movable valve body.

15. An electric actuator comprising:
an output member that undergoes linear reciprocating actuation through conversion of rotational actuating force of an electric motor that is driven by DC power, into linear actuating force by an actuating force converter mechanism, wherein a switching member is provided for switching a polarity of the DC power that is supplied to the electric motor, and through switching operation of the switching member a rotation direction of the electric motor is changed to switch an actuation direction of an output member between an outbound direction and a return direction, on a first power supply path for supplying the electric motor with DC power of polarity that actuates the output member in the outbound direction, a first switching member is disposed and has a first electrode and a first brush that undergo relative displacement in a state of contact in association with displacement of the output member, with the first brush separating from the first electrode to break the state of contact and cut off the first power supply path, for regulating a displacement terminus of the output member in the outbound direction;

on a second power supply path for supplying the electric motor with DC power of polarity that actuates the output member in the return direction, a second switching member is disposed and has a second electrode and a second brush that undergo relative displacement in a state of contact in association with displacement of the output member, with the second brush separating from the second electrode to break the state of contact and cut off the second power supply path, for regulating a displacement terminus of the output member in the return direction, and the second switching member is maintained in a state of contact at the cutoff position of the first switching member, while the first switching member is maintained in a state of contact at the cutoff position of the second switching member.

16. The electric actuator according to claim 15, wherein the first power supply path is provided with a first commutating member disposed thereon for allowing DC power of polarity driving the output member in the outbound direction to be supplied to the electric motor and for preventing DC power of polarity driving the output member in the return direction from being supplied to the electric motor; the second power supply path is provided with a second commutating member disposed thereon for allowing DC power of polarity driving the output member in the return direction to be supplied to the electric motor and for preventing DC power of polarity driving the output member in the outbound direction from being supplied to the electric motor; and the switching member is constituted to include the first commutating member and the second commutating member.

17. The electric actuator according to claim 15, wherein the actuating force converter mechanism includes an actuating force transmitting mechanism, the actuating force transmitting mechanism being provided with either the first electrode and the second electrode, or the first brush and the second brush, wherein the first electrode and the second electrode are arranged so as to extend in the operating direction of the actuating force transmitting mechanism with respect to reciprocating operation of the output member, with ends of the first electrode and ends of the second electrode offset from one another in an operating direction of the actuating force transmitting mechanism; and wherein the first brush and the second brush are disposed at identical locations to one another in the operating direction of the actuating force transmitting mechanism.

18. The electric actuator according to claim 15, wherein either the first electrode and the second electrode, or the first brush and the second brush, are provided to the output member, the first electrode and the second electrode being disposed so as to extend linearly in a direction of reciprocating operation of the output member, and with ends of the first electrode and the second electrode offset from one another in the direction of reciprocating operation of the output member.

19. The electric actuator according to claim 15, wherein at least one of a screw structure and a worm gear structure is provided on a transmission path of actuating force from the electric motor to the output member; and the actuating force converter mechanism that transmits rotational actuating force of the electric motor to the output member as reciprocating actuating force includes at least one of the screw structure and the worm gear structure.

* * * * *